(12) United States Patent
Holub et al.

(10) Patent No.: US 11,308,571 B2
(45) Date of Patent: Apr. 19, 2022

(54) SPARSE MODULATION FOR ROBUST SIGNALING AND SYNCHRONIZATION

(71) Applicant: Digimarc Corporation, Beaverton, OR (US)

(72) Inventors: Vojtech Holub, Portland, OR (US);
Donald Haaga, Portland, OR (US);
Ravi K. Sharma, Portland, OR (US);
Jeffrey B. Schulte, Portland, OR (US);
Eric D. Evans, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/579,667

(22) Filed: Sep. 23, 2019

(65) Prior Publication Data

US 2020/0226709 A1  Jul. 16, 2020

Related U.S. Application Data

(63) Continuation of application No. 15/072,884, filed on Mar. 17, 2016, now Pat. No. 10,424,038, which is a
(Continued)

(51) Int. Cl.
*G06T 1/00* (2006.01)
*H04N 1/32* (2006.01)
*H04N 19/467* (2014.01)

(52) U.S. Cl.
CPC ............ *G06T 1/005* (2013.01); *G06T 1/0028* (2013.01); *H04N 1/3232* (2013.01);
(Continued)

(58) Field of Classification Search
CPC .................. G06T 1/0028; G06T 1/005; G06T 2201/0051; G06T 2201/0061;
(Continued)

(56) References Cited

U.S. PATENT DOCUMENTS 3,628,271 A   12/1971  Carrell
5,206,490 A    4/1993  Petigrew
(Continued)

FOREIGN PATENT DOCUMENTS

EP     0240078 A1   10/1987
EP     0638614 A1    2/1995
(Continued)

OTHER PUBLICATIONS

Aug. 22, 2016 International Search Report and Written Opinion, including search strategy, from PCT/US2016/022836 (published as WO 2016/153911) (23 pages).
(Continued)

*Primary Examiner* — Katrina R Fujita
(74) *Attorney, Agent, or Firm* — Digimarc Corporation

(57) ABSTRACT

The present disclosure relates to advanced image processing and encoded signal processing. One claim currently recites an image processing method comprising the acts: receiving a digital representation of artwork, the artwork having an area of uniform color; generating a two-dimensional data signal that redundantly encodes a plural-bit message, the data signal comprising plural elements, each of which has a single bit value; receiving a two-dimensional synchronization signal comprising plural elements, each of which has a plural-bit value, each element of said data signal having an element of the synchronization signal corresponding thereto; processing the two-dimensional data signal with the two-dimensional synchronization signal and with a gradient function to yield a two-dimensional gradient marking signal; and printing an ink counterpart of the gradient marking signal on a medium with the artwork, said printing comprising printing plural dithered two-dimensional blocks of at least four contiguous elements each, in which one or more
(Continued)

elements of each block are printed to be dark. Of course, other claims and combinations are described as well.

14 Claims, 26 Drawing Sheets

Related U.S. Application Data continuation-in-part of application No. 14/725,399, filed on May 29, 2015, now Pat. No. 9,635,378.

(60) Provisional application No. 62/308,057, filed on Mar. 14, 2016, provisional application No. 62/303,320, filed on Mar. 3, 2016, provisional application No. 62/136,146, filed on Mar. 20, 2015.

(52) U.S. Cl.
CPC . *H04N 1/32309* (2013.01); *G06T 2201/0051* (2013.01); *G06T 2201/0061* (2013.01); *G06T 2201/0065* (2013.01); *G06T 2201/0202* (2013.01); *H04N 19/467* (2014.11); *H04N 2201/327* (2013.01); *H04N 2201/3236* (2013.01)

(58) Field of Classification Search
CPC .... G06T 2201/0065; G06T 2201/0202; H04N 1/32309; H04N 1/3232; H04N 19/467; H04N 2201/3236; H04N 2201/327
See application file for complete search history.

(56) References Cited

U.S. PATENT DOCUMENTS

| | | | |
|---|---|---|---|
| 5,329,108 | A | 7/1994 | Lamoure |
| 5,383,995 | A | 1/1995 | Phillips |
| 5,396,559 | A | 3/1995 | McGrew |
| 5,416,312 | A | 5/1995 | Lamoure |
| 5,444,779 | A | 8/1995 | Daniele |
| 5,453,605 | A | 9/1995 | Hecht |
| 5,481,377 | A | 1/1996 | Udagawa |
| 5,492,222 | A | 2/1996 | Weaver |
| 5,521,372 | A | 5/1996 | Hecht |
| 5,542,971 | A | 8/1996 | Auslander |
| 5,576,532 | A | 11/1996 | Hecht |
| 5,745,604 | A | 4/1998 | Rhoads |
| 5,752,152 | A | 5/1998 | Gasper |
| 5,790,703 | A | 8/1998 | Wang |
| 5,843,564 | A | 12/1998 | Gasper |
| 5,859,920 | A | 1/1999 | Daly |
| 5,862,260 | A | 1/1999 | Rhoads |
| 5,919,730 | A | 7/1999 | Gasper |
| 5,998,609 | A | 12/1999 | Aoki |
| 6,011,857 | A | 1/2000 | Sowell |
| 6,076,738 | A | 6/2000 | Bloomberg |
| 6,122,392 | A | 9/2000 | Rhoads |
| 6,122,403 | A | 9/2000 | Rhoads |
| 6,149,719 | A | 11/2000 | Houle |
| 6,168,081 | B1 | 1/2001 | Urano |
| 6,177,683 | B1 | 1/2001 | Kolesar |
| 6,246,778 | B1 | 6/2001 | Moore |
| 6,345,104 | B1 | 2/2002 | Rhoads |
| 6,361,916 | B1 | 3/2002 | Chen |
| 6,373,965 | B1 | 4/2002 | Liang |
| 6,441,380 | B1 | 8/2002 | Lawandy |
| 6,449,377 | B1 | 9/2002 | Rhoads |
| 6,456,729 | B1 | 9/2002 | Moore |
| 6,522,767 | B1 | 2/2003 | Moskowitz |
| 6,567,532 | B1 | 5/2003 | Honsinger |
| 6,590,996 | B1 | 7/2003 | Reed |
| 6,603,864 | B1 | 8/2003 | Matsunoshita |
| 6,614,914 | B1 | 9/2003 | Rhoads |
| 6,625,297 | B1 | 9/2003 | Bradley |
| 6,683,966 | B1 | 1/2004 | Tian |
| 6,692,031 | B2 | 2/2004 | McGrew |
| 6,698,860 | B2 | 3/2004 | Berns |
| 6,706,460 | B1 | 3/2004 | Williams |
| 6,718,046 | B2 | 4/2004 | Reed |
| 6,775,391 | B2 | 8/2004 | Hosaka |
| 6,786,397 | B2 | 9/2004 | Silverbrook |
| 6,804,377 | B2 | 10/2004 | Reed |
| 6,829,063 | B1 | 12/2004 | Allebach |
| 6,912,674 | B2 | 6/2005 | Trelewicz |
| 6,940,993 | B2 | 9/2005 | Jones |
| 6,947,571 | B1 | 9/2005 | Rhoads |
| 6,961,442 | B2 | 11/2005 | Hannigan |
| 6,993,152 | B2 | 1/2006 | Patterson |
| 6,995,859 | B1 | 2/2006 | Silverbrook |
| 6,996,252 | B2 | 2/2006 | Reed |
| 7,072,490 | B2 | 7/2006 | Stach |
| 7,076,082 | B2 | 7/2006 | Sharma |
| 7,114,657 | B2 | 10/2006 | Auslander |
| 7,127,112 | B2 | 10/2006 | Sharma |
| 7,152,021 | B2 | 12/2006 | Alattar |
| 7,218,750 | B1 | 5/2007 | Hiraishi |
| 7,280,672 | B2 | 10/2007 | Powell |
| 7,321,667 | B2 | 1/2008 | Stach |
| 7,340,076 | B2 | 3/2008 | Stach |
| 7,352,878 | B2 | 4/2008 | Reed |
| 7,412,072 | B2 | 8/2008 | Sharma |
| 7,529,385 | B2 | 5/2009 | Lawandy |
| 7,532,741 | B2 | 5/2009 | Stach |
| 7,536,553 | B2 | 5/2009 | Auslander |
| 7,559,983 | B2 | 7/2009 | Starling |
| 7,684,088 | B2 | 3/2010 | Jordan |
| 7,721,879 | B2 | 5/2010 | Weaver |
| 7,738,673 | B2 | 6/2010 | Reed |
| 7,757,952 | B2 | 7/2010 | Tuschel |
| 7,800,785 | B2 | 9/2010 | Bala |
| 7,892,338 | B2 | 2/2011 | Degott |
| 7,926,730 | B2 | 4/2011 | Auslander |
| 7,965,862 | B2 | 6/2011 | Jordan |
| 7,986,807 | B2 | 7/2011 | Stach |
| 8,064,100 | B2 | 11/2011 | Braun |
| 8,144,368 | B2 | 3/2012 | Rodriguez |
| 8,157,293 | B2 | 4/2012 | Bhatt |
| 8,159,657 | B2 | 4/2012 | Degott |
| 8,180,174 | B2 | 5/2012 | Di |
| 8,194,919 | B2 | 6/2012 | Rodriguez |
| 8,223,380 | B2 | 7/2012 | Lapstun |
| 8,227,637 | B2 | 7/2012 | Cohen |
| 8,301,893 | B2 | 10/2012 | Brundage |
| 8,345,315 | B2 | 1/2013 | Sagan |
| 8,360,323 | B2 | 1/2013 | Widzinski |
| 8,412,577 | B2 | 4/2013 | Rodriguez |
| 8,515,121 | B2 | 8/2013 | Stach |
| 8,593,696 | B2 | 11/2013 | Picard |
| 8,620,021 | B2 | 12/2013 | Knudson |
| 8,675,987 | B2 | 3/2014 | Agarwala |
| 8,687,839 | B2 | 4/2014 | Sharma |
| 8,699,089 | B2 | 4/2014 | Eschbach |
| 8,730,527 | B2 | 5/2014 | Chapman |
| 8,805,110 | B2 | 8/2014 | Rodriguez |
| 8,840,029 | B2 | 9/2014 | Lawandy |
| 8,867,782 | B2 | 10/2014 | Kurtz |
| 8,879,735 | B2 | 11/2014 | Lord |
| 8,913,299 | B2 | 12/2014 | Picard |
| 8,947,744 | B2 | 2/2015 | Kurtz |
| 9,008,315 | B2 | 4/2015 | Lord |
| 9,013,501 | B2 | 4/2015 | Scheibe |
| 9,055,239 | B2 | 6/2015 | Tehranchi |
| 9,064,228 | B2 | 6/2015 | Woerz |
| 9,070,132 | B1 | 6/2015 | Durst |
| 9,087,376 | B2 | 7/2015 | Rodriguez |
| 9,269,022 | B2 | 2/2016 | Rhoads |
| 9,275,428 | B2 | 3/2016 | Chapman |
| 9,319,557 | B2 | 4/2016 | Chapman |
| 9,380,186 | B2 | 6/2016 | Reed |
| 9,400,951 | B2 | 7/2016 | Yoshida |
| 9,401,001 | B2 | 7/2016 | Reed |
| 9,449,357 | B1 | 9/2016 | Lyons |
| 9,562,998 | B2 | 2/2017 | Edmonds |
| 9,593,982 | B2 | 3/2017 | Rhoads |

(56) References Cited

U.S. PATENT DOCUMENTS

| | | |
|---|---|---|
| 9,635,378 B2 | 4/2017 | Holub |
| 9,658,373 B2 | 5/2017 | Downing |
| 9,690,967 B1 | 6/2017 | Brundage |
| 9,747,656 B2 | 8/2017 | Stach |
| 9,749,607 B2 | 8/2017 | Boles |
| 9,754,341 B2 | 9/2017 | Falkenstern |
| 10,204,253 B1 | 2/2019 | Long |
| 10,223,560 B2 | 3/2019 | Boles |
| 10,304,151 B2 | 5/2019 | Falkenstern |
| 10,424,038 B2 | 9/2019 | Holub |
| 2001/0037455 A1 | 11/2001 | Lawandy |
| 2002/0054356 A1 | 5/2002 | Kurita |
| 2002/0080396 A1 | 6/2002 | Silverbrook |
| 2002/0085736 A1 | 7/2002 | Kalker |
| 2002/0136429 A1 | 9/2002 | Stach |
| 2002/0147910 A1 | 10/2002 | Brundage |
| 2002/0169962 A1 | 11/2002 | Brundage |
| 2003/0005304 A1 | 1/2003 | Lawandy |
| 2003/0012548 A1 | 1/2003 | Levy |
| 2003/0012569 A1 | 1/2003 | Lowe |
| 2003/0039376 A1 | 2/2003 | Stach |
| 2003/0053654 A1 | 3/2003 | Patterson |
| 2003/0063319 A1 | 4/2003 | Umeda |
| 2003/0116747 A1 | 6/2003 | Lem |
| 2003/0156733 A1 | 8/2003 | Zeller |
| 2003/0174863 A1 | 9/2003 | Brundage |
| 2004/0023397 A1 | 2/2004 | Vig |
| 2004/0032972 A1 | 2/2004 | Stach |
| 2004/0037448 A1 | 2/2004 | Brundage |
| 2004/0044436 A1 | 3/2004 | Arleth |
| 2004/0046032 A1 | 3/2004 | Urano |
| 2004/0146177 A1 | 7/2004 | Kalker |
| 2004/0149830 A1 | 8/2004 | Allen |
| 2005/0127176 A1 | 6/2005 | Dickinson |
| 2006/0017957 A1 | 1/2006 | Degott |
| 2006/0022059 A1 | 2/2006 | Juds |
| 2006/0078159 A1 | 4/2006 | Hamatake |
| 2006/0115110 A1 | 6/2006 | Rodrigufz |
| 2006/0147082 A1 | 7/2006 | Jordan |
| 2006/0165311 A1 | 7/2006 | Watson |
| 2007/0102920 A1 | 5/2007 | Bi |
| 2007/0152032 A1 | 7/2007 | Tuschel |
| 2007/0152056 A1 | 7/2007 | Tuschel |
| 2007/0210164 A1 | 9/2007 | Conlon |
| 2007/0221732 A1 | 9/2007 | Tuschel |
| 2007/0262154 A1 | 11/2007 | Zazzu |
| 2007/0262579 A1 | 11/2007 | Bala |
| 2008/0149820 A1 | 6/2008 | Jordan |
| 2008/0159615 A1 | 7/2008 | Rudaz |
| 2008/0164689 A1 | 7/2008 | Jordan |
| 2008/0205697 A1* | 8/2008 | Sakai ................ H04N 1/32352 382/100 |
| 2008/0277626 A1 | 11/2008 | Yang |
| 2009/0040022 A1 | 2/2009 | Finkenzeller |
| 2009/0059299 A1 | 3/2009 | Yoshida |
| 2009/0158318 A1 | 6/2009 | Levy |
| 2009/0251536 A1 | 10/2009 | Sinram |
| 2009/0266877 A1 | 10/2009 | VonWiller |
| 2010/0025476 A1 | 2/2010 | Widzinski |
| 2010/0048242 A1 | 2/2010 | Rhoads |
| 2010/0062194 A1 | 3/2010 | Sun |
| 2010/0150434 A1 | 6/2010 | Reed |
| 2010/0213250 A1 | 8/2010 | Mallett |
| 2010/0317399 A1 | 12/2010 | Rodriguez |
| 2011/0007092 A1 | 1/2011 | Ihara |
| 2011/0008606 A1 | 1/2011 | Sun |
| 2011/0051989 A1 | 3/2011 | Gao |
| 2011/0085209 A1 | 4/2011 | Man |
| 2011/0111210 A1 | 5/2011 | Matsunami |
| 2011/0127331 A1 | 6/2011 | Zhao |
| 2011/0249051 A1 | 10/2011 | Chretien |
| 2011/0249332 A1 | 10/2011 | Merrill |
| 2011/0255163 A1 | 10/2011 | Merrill |
| 2012/0014557 A1 | 1/2012 | Reed |
| 2012/0065313 A1 | 3/2012 | Demartin |
| 2012/0074220 A1 | 3/2012 | Rodriguez |
| 2012/0078989 A1 | 3/2012 | Sharma |
| 2012/0163653 A1* | 6/2012 | Anan ................ G06T 1/0085 382/100 |
| 2012/0205435 A1 | 8/2012 | Woerz |
| 2012/0214515 A1 | 8/2012 | Davis |
| 2012/0218608 A1 | 8/2012 | Maltz |
| 2012/0224743 A1 | 9/2012 | Rodriguez |
| 2012/0243797 A1 | 9/2012 | Di |
| 2012/0275642 A1 | 11/2012 | Aller |
| 2012/0311623 A1 | 12/2012 | Davis |
| 2013/0223673 A1 | 8/2013 | Davis |
| 2013/0259297 A1 | 10/2013 | Knudson |
| 2013/0260727 A1 | 10/2013 | Knudson |
| 2013/0286443 A1 | 10/2013 | Massicot |
| 2013/0329006 A1 | 12/2013 | Boles |
| 2013/0335783 A1 | 12/2013 | Kurtz |
| 2014/0022603 A1 | 1/2014 | Eschbach |
| 2014/0052555 A1 | 2/2014 | MacIntosh |
| 2014/0084069 A1 | 3/2014 | Mizukoshi |
| 2014/0108020 A1 | 4/2014 | Sharma |
| 2014/0245463 A1 | 8/2014 | Suryanarayanan |
| 2014/0293091 A1 | 10/2014 | Rhoads |
| 2014/0325656 A1 | 10/2014 | Sallam |
| 2014/0339296 A1 | 11/2014 | McAdams |
| 2015/0002928 A1 | 1/2015 | Kiyoto |
| 2015/0071485 A1 | 3/2015 | Rhoads |
| 2015/0153284 A1 | 6/2015 | Naya |
| 2015/0156369 A1 | 6/2015 | Reed |
| 2015/0168620 A1 | 6/2015 | Hakuta |
| 2015/0187039 A1 | 7/2015 | Reed |
| 2015/0254828 A1 | 9/2015 | Beach |
| 2015/0286873 A1 | 10/2015 | Davis |
| 2015/0317923 A1 | 11/2015 | Edmonds |
| 2016/0000141 A1 | 1/2016 | Nappi |
| 2016/0180207 A1 | 6/2016 | Rodriguez |
| 2016/0196630 A1 | 7/2016 | Blesser |
| 2016/0217546 A1 | 7/2016 | Ryu |
| 2016/0217547 A1 | 7/2016 | Stach |
| 2016/0225116 A1 | 8/2016 | Tehranchi |
| 2016/0267620 A1 | 9/2016 | Calhoon |
| 2016/0291207 A1 | 10/2016 | Yasuda |
| 2017/0024840 A1 | 1/2017 | Holub |
| 2017/0230533 A1 | 8/2017 | Holub |
| 2019/0266369 A1 | 8/2019 | Boles |
| 2019/0306385 A1 | 10/2019 | Sharma |

FOREIGN PATENT DOCUMENTS

| | | | |
|---|---|---|---|
| EP | 1367810 | A2 | 12/2003 |
| EP | 1370062 | A1 | 12/2003 |
| JP | 2017073696 | A | 4/2017 |
| NL | 1006668 | C2 | 1/1999 |
| WO | 2010075357 | | 7/2010 |
| WO | 2010075363 | | 7/2010 |
| WO | 2011029845 | A2 | 3/2011 |
| WO | 2015077493 | A1 | 5/2015 |
| WO | 2016153911 | A1 | 9/2016 |
| WO | 2016153936 | | 9/2016 |
| WO | 2016204619 | A2 | 12/2016 |

OTHER PUBLICATIONS

Caldelli et al., "Geometric-Invariant Robust Watermarking Through Constellation Matching in the Frequency Domain," IEEE Proc. Int. Conf. on Image Processing, vol. 2, Sep. 2000, pp. 65-68.

Cheng, et al., "Colloidal silicon quantum dots: from preparation to the modification of self-assembled monolayers (SAMs) for bio-applications," Chem. Soc. Rev., 2014, 43, 2680-2700. (21 pgs.).

European Patent Office Communication pursuant to Article 94(3) EPC for Application No. 16769366.2, which is the regional phase of PCT/US2016/022836 (published as WO 2016/153911), dated May 24, 2019, 7 pages.

Feb. 26, 2018 Response and Claim amendments in European patent application No. 16769366.2, which is the regional phase of PCT/US2016/022836 (published as WO 2016/153911) (8 pages).

(56) References Cited

OTHER PUBLICATIONS

International Search Report and Written Opinion for Application No. PCT/US2019/019410, dated Aug. 12, 2019, 19 pages, (published as WO2019/165364).

International Search Report and Written Opinion in PCT/US2016/22967 dated Jul. 11, 2016. (17 pgs.) (published as WO2016/153936).

J. Collins et al., "Intelligent Material Solutions, Covert Tagging and Serialization Systems", Proc. IS&T's NIP 29 International Conference on Digital Printing Technologies, pp. 153-157 (2013). (5 pgs.).

Kiyoto et al., Development of a Near-Infrared Reflective Film Using Disk-Shaped Nanoparticles, Fujifilm Research and Development Report No. 58-2013, 2013. (4 pgs.).

Machine Translation of JP2017-073696A, generated Aug. 28, 2018. (54 pages).

Park et al.; Invisible Marker Based Augmented Reality System, SPIE Proc., vol. 5960, 2005, pp. 501-508. (9 pgs.).

PCT Patent Application No. PCT/US2016/22967, filed Mar. 17, 2016. (99 pgs.).

Petersen et al., "Upconverting Nanoparticle Security Inks Based on Hansen Solubility Parameters", Proc. IS&T's NIP 29 International Conference on Digital Printing Technologies, pp. 383-385 (2014). (3 pgs.).

R. Steiger et al., "Photochemical Studies on the Lightfastness of Ink-Jet Systems," Proc. IS&T's NIP 14 conference, pp. 114-117 (1998). (4 pgs.).

Rongen et al., 'Digital Image Watermarking by Salient Point Modification Practical Results,' Proc. SPIE vol. 3657: Security and Watermarking of Multimedia Contents, Jan. 1999, pp. 273-282.

U.S. Appl. No. 13/975,919, filed Aug. 26, 2013. (59 pgs.).
U.S. Appl. No. 14/724,729, filed May 28, 2015. (89 pgs.).
U.S. Appl. No. 14/725,399, filed May 29, 2015. (74 pgs.).
U.S. Appl. No. 15/072,884, filed Mar. 17, 2016. (118 pgs.).
U.S. Appl. No. 13/975,919, filed Aug. 26, 2013, 58 pages.

Yousaf et al.; Formulation of an Invisible Infrared Printing Ink, Dyes and Pigments, vol. 27, No. 4, 1995, pp. 297-303. (7 pgs.).

Hyper Spectral Imaging (HSI) for Separation of PET bottles from PET Trays, Steinhert Press Release, Mar. 23, 2016.

Lukac et al, Color Imaging Processing, Chapter 17: Spectral Imaging and Applications, CRC Press, 2007.

Packnews.tv: "Digital watermarks in pastics for waste sorting", Youtube, Dec. 13, 2018, p. 1, XP054982005, retrieved from the internet: URL:https//www.youtube.com/watch?v=5di90y1QKoc (retrieved on Jul. 1, 2021).

* cited by examiner

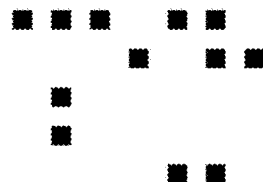 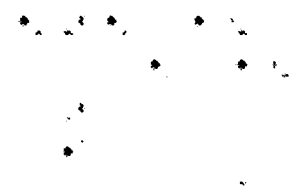
Fig. 11                    Fig. 12
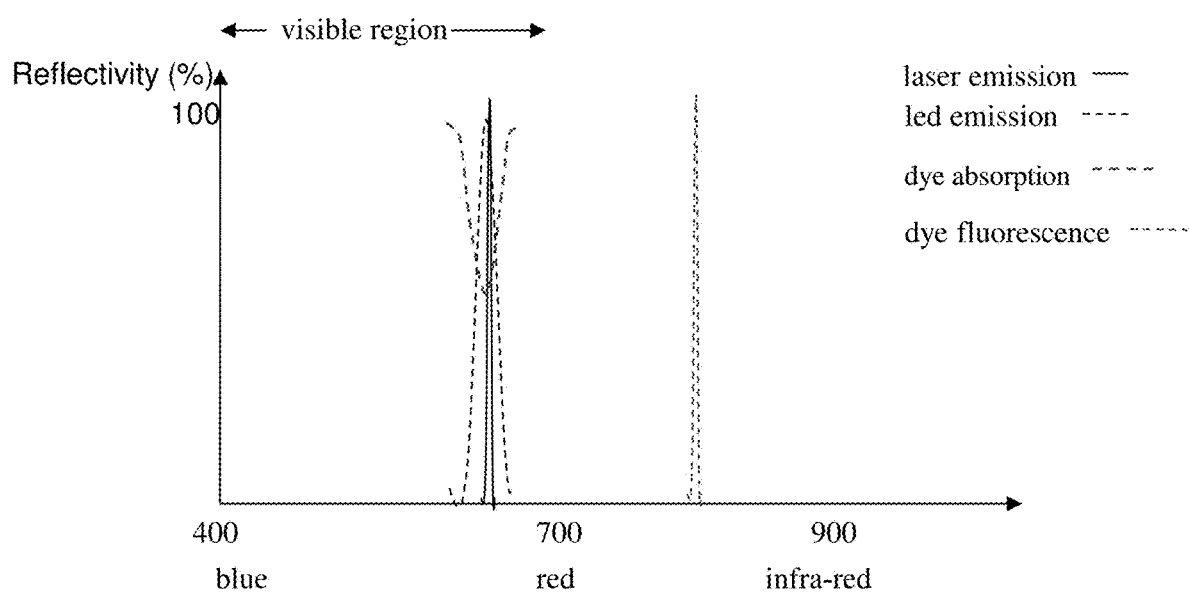
Fig. 15

| Sync Element Value | Cumulative % |
|---|---|
| 0-92 | nil |
| 93 | 0.2% |
| 94 | 0.3% |
| 95 | 0.4% |
| 96 | 0.6% |
| 97 | 0.7% |
| 98 | 0.8% |
| 99 | 1.0% |
| 100 | 1.2% |
| 101 | 1.5% |
| 102 | 1.8% |
| 103 | 2.3% |
| 104 | 2.7% |
| 105 | 3.2% |
| 106 | 3.9% |
| 107 | 4.6% |
| 108 | 5.4% |
| 109 | 6.4% |
| 110 | 7.5% |
| 111 | 8.9% |
| 112 | 10.3% |
| 113 | 11.8% |
| 114 | 13.7% |
| 115 | 15.3% |
| 116 | 17.3% |
| 117 | 19.8% |
| 118 | 21.9% |
| 119 | 24.4% |
| 120 | 27.1% |
| 121 | 29.5% |
| 122 | 32.4% |
| 123 | 35.3% |
| 124 | 38.3% |
| 125 | 41.5% |
| 126 | 44.8% |
| 127 | 48.1% |
| 128 | 51.5% |
| 129 | 54.4% |
| ... | ... |

FIG. 24A

| Sync Element Value | Cumulative % |
|---|---|
| 0-11 | nil |
| 12 | 0.21% |
| 13 | 0.27% |
| 14 | 0.31% |
| 15 | 0.34% |
| 16 | 0.38% |
| 17 | 0.40% |
| 18 | 0.45% |
| 19 | 0.53% |
| 20 | 0.58% |
| 21 | 0.61% |
| 22 | 0.63% |
| 23 | 0.68% |
| 24 | 0.79% |
| 25 | 0.87% |
| 26 | 0.93% |
| 27 | 0.99% |
| 28 | 1.12% |
| 29 | 1.21% |
| 30 | 1.29% |
| 31 | 1.49% |
| 32 | 1.59% |
| 33 | 1.70% |
| 34 | 1.82% |
| 35 | 1.93% |
| 36 | 2.03% |
| 37 | 2.17% |
| 38 | 2.27% |
| 39 | 2.39% |
| 40 | 2.54% |
| 41 | 2.65% |
| 42 | 2.83% |
| 43 | 3.00% |
| 44 | 3.18% |
| 45 | 3.34% |
| 46 | 3.52% |
| 47 | 3.78% |
| 48 | 4.00% |
| 49 | 4.18% |
| 50 | 4.41% |
| 51 | 4.56% |
| 52 | 4.75% |
| 53 | 4.94% |
| 54 | 5.18% |
| 55 | 5.38% |
| 56 | 5.58% |
| 57 | 5.83% |
| 58 | 6.10% |
| 59 | 6.28% |
| 60 | 6.59% |
| 61 | 6.97% |
| 62 | 7.27% |
| 63 | 7.68% |
| 64 | 8.04% |
| 65 | 8.33% |
| 66 | 8.69% |
| 67 | 9.09% |
| 68 | 9.51% |
| 69 | 9.86% |
| 70 | 10.36% |

FIG. 24B

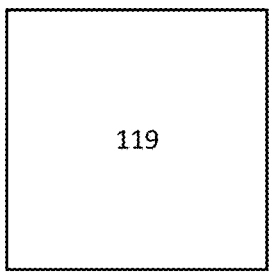
FIG. 32A
```
A=55    I=159
B=81    J=166
C=84    K=179
D=94    L=189a
E=108   M=189b
F=130   N=192
G=131   O=193
H=149   P=218
```
FIG. 33
| 179 | 84 | 131 | 159 |
|-----|-----|-----|-----|
| 189 | 192 | 193 | 108 |
| 81 | 166 | 189 | 218 |
| 130 | 55 | 94 | 149 |
FIG. 32B
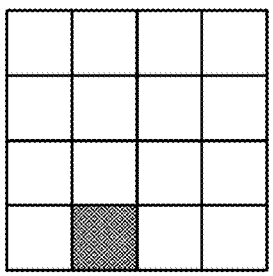
FIG. 34A
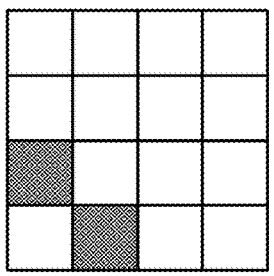
FIG. 34B
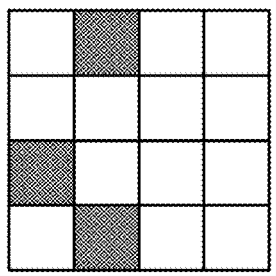
FIG. 34C
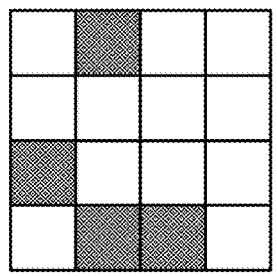
FIG. 34D
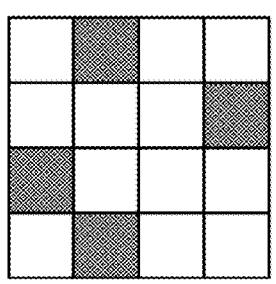
FIG. 35
| 179 | 84 | 131 | 159 |
|-----|-----|-----|-----|
| 189 | 192 | 149 | 108 |
| 81 | 166 | 189 | 218 |
| 130 | 55 | 94 | 149 |
FIG. 36
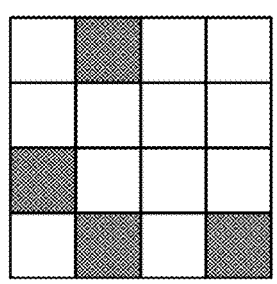
FIG. 37

| 179 | 84 | 131 | 159 | 217 | 85 | 123 | 95 |
|---|---|---|---|---|---|---|---|
| 189 | 192 | 193 | 108 | 57 | 138 | 67 | 74 |
| 81 | 166 | 189 | 218 | 115 | 166 | 83 | 176 |
| 130 | 55 | 94 | 149 | 96 | 174 | 190 | 164 |
FIG. 38
A=57   I=123
B=67   J=138
C=74   K=164
D=83   L=166
E=85   M=174
F=95   N=176
G=96   O=190
H=115  P=217
FIG. 39
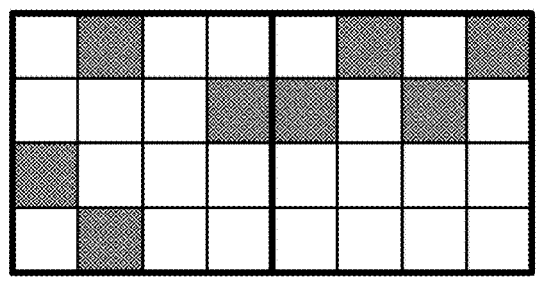
FIG. 40
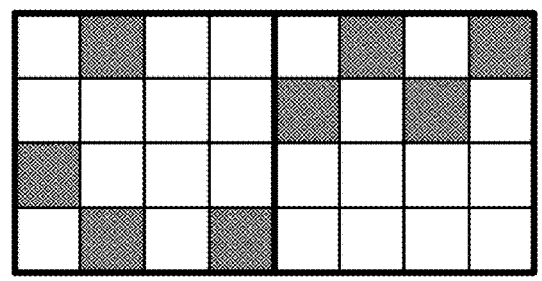
FIG. 41
| 179 | 84 | 131 | 159 |
|---|---|---|---|
| 189 | 192 | 193 | 108 |
| 81 | 166 | 189 | 218 |
| 130 | 55 | 94 | 149 |
FIG. 42
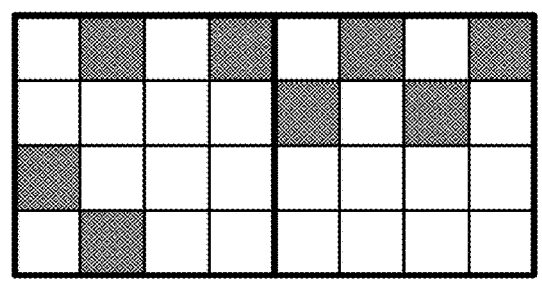
FIG. 43

SPARSE MODULATION FOR ROBUST SIGNALING AND SYNCHRONIZATION

RELATED APPLICATION DATA

This application is a continuation of U.S. patent application Ser. No. 15/072,884, filed Mar. 17, 2016 (U.S. Pat. No. 10,424,038), which claims the benefit of US Provisional Patent Application Nos. 62/308,057, filed Mar. 14, 2016; 62/303,320, filed Mar. 3, 2016, and 62/136,146, filed Mar. 20, 2015. Application Ser. No. 15/072,884 is also a continuation in part of U.S. patent application Ser. No. 14/725,399, filed May 29, 2015 (U.S. Pat. No. 9,635,378), which claims the benefit of U.S. Provisional Patent Application No. 62/136,146, filed Mar. 20, 2015. The patent documents in this paragraph are each incorporated herein by reference in its entirety.

TECHNICAL FIELD

The disclosure relates to signal communication in noisy environments, and in particular to robust signal communication within host media signals, such as digital watermarking.

BACKGROUND AND SUMMARY

Many approaches have been developed for encoding machine readable information on objects. Perhaps the most well-known technique is the ubiquitous barcode. Over the years, various barcode types have been created, which differ significantly from the name-sake pattern of dark linear bars on a lighter background. Now, the term barcode has been used to encompass machine symbols in various shapes, sizes, patterns and colors.

These types of codes were primarily developed to be reliable data carriers that could be applied with a wide array of print and marking techniques on many types of objects. They were not designed, in most cases, to be aesthetically pleasing, or to be weaved into other imagery, whether it be graphical designs, text etc. on product packaging, labels, or displays. As such, in most applications, these codes occupy a dedicated location on an object, where no other information is located. This approach has worked well to reliably apply identifying information to objects, including packaging, parts ("Direct Part Marking"), etc. Nevertheless, placing the code at a dedicated location limits the ability to find and read the code. When used on consumer goods, it is often located on the back or bottom of the item so as not to interfere with consumer messaging and product aesthetics. This placement of the code tends to slow down code reading or increase scanner cost by requiring additional components to capture multiple views of an object. It also increases risk of injury due to the need for workers to re-position the object to scan the code for auto-identification. Obviously, this undermines the theoretical speed and reliability advantages of auto-identification.

Data signaling techniques have been developed that have promise in addressing these drawbacks while providing additional advantages. One such technique is referred to as digital watermarking. Digital watermarking provides a method of encoding information within image content or object surface topology. As such, it can be applied over the entire surface of the object within minimal cost and changes to workflow, addressing the drawbacks of barcodes while being fully compatible with them. Additionally, the digital watermarking applies to many different types of media, including analog and digital forms of images (including video) and audio. This enables enterprises to implement auto-identification and auxiliary data encoding across all of their assets, including physical and digital media.

Watermarking advantageously exploits the existing image or audio information as a carrier of additional information. This additional information is often referred to as the "watermark payload," a variable sequence of message symbols inserted per unit of host content. There are, of course, limits to the extent to which this payload can be inserted in existing image or audio (the host signal) without impacting the perceptual quality of the host. Generally speaking, host signals with more variable information provide greater opportunity to insert the payload, whereas host signals with uniform or solid tones provide less opportunity for insertion of the payload. In cases where there is little host signal content, it may not be possible to encode the payload, or if it is encoded, it is done so with a greater impact on perceptual quality.

Perceptual quality relates to the extent to which a human perceives a change in an image. This is a challenging metric, as it has a significant subjective component. Nevertheless, the human visual system has been modeled, and data from user tests can be used to construct a classifier that measures in a quantitative way, whether a change to an image or video will be visible or deemed objectionable. Human visual system models and classifiers based on them provide a measure of whether a change made to an image is likely to be visible, and also, can quantify visibility in units such as Just Noticeable Difference (JND) units. For applications where images are modified to insert a data signal, the perceptual quality is a constraint on data signal design and encoding strategy. The importance of this constraint on signal design and encoding methodology varies with the application. The flexibility of the watermark signal allows it to be transformed into visual elements of the object's design in various ways, and as such, provides many options for adapting the signal to satisfy perceptual quality constraints for different types of images and applications.

Literature documenting our earlier work describes various ways to deal with host signal types that lack signal content compatible with data encoding. We refer to one approach as "sparse" marking as the data carrying signal is formed as a sparse array of signal elements. For visual media, the sparse array of elements works well on portions of a host image that are uniform or solid tones or appear largely blank. With greater sophistication in the signaling, it also is effective in encoding blank areas around text of a document, label, visual display or package, as our signaling schemes employ robust data encoding strategies to mitigate impact of interference from the text. In one embodiment, a sparse mark is comprised of a pattern of spatial locations where ink is deposited or not. For example, the sparse signal may be comprised of ink dots on a light background, such that the signal forms a pattern of subtly darker spatial locations. The signal is designed to be sparse by the spacing apart of the darker locations on the light background. Conversely, the signal may be designed as an array of lighter "holes" on a relatively darker background. See, for example, U.S. Pat. Nos. 6,345,104, 6,993,152 and 7,340,076, which are hereby incorporated by reference in their entirety.

As described in U.S. Pat. No. 6,345,104, this strategy of forming patterns of light and dark elements is consistent with our earlier digital watermarking strategies that modulate luminance. For example, a lighter element encodes a first message symbol (e.g., binary one), while a darker element encodes a second symbol (e.g., binary zero).

The sparse signal has minimal impact on visual quality due to its sparse arrangement. However, the trade-off for applications like automatic object identification is that more sophistication is required in the data signaling methodology to ensure that the data carried within the sparse signal may be reliably and efficiently recovered in many different and challenging environments. The sparse nature of the signal dictates that less payload may be encoded per unit of object surface area. Further, within the sparse signal, there is a trade-off between allocating signal for payload capacity versus signal for robustness. In the latter category of robustness, the signaling scheme must support recovery in environments of geometric distortion, which occurs when the sparse signal is imaged from various angles, perspectives and distances, in the presence of noise of various types that tends to interfere with the data signal.

There are various sources of geometric distortion that need to be addressed to reliably recover the payload in the sparse signal. Examples of geometric distortion include signal cropping and warping. Cropping truncates portions of the sparse signal, e.g., in cases where only a portion is captured due to occlusion by other objects or incomplete capture by a scanner. Warping occurs when the surface on which the sparse signal is applied is curved (on cups or cans) or wrinkled (on bags and flexible plastic or foil pouches) and when the sparse signal is imaged from a surface at various perspectives.

The design of a signaling scheme must also account for practical challenges posed by constraints on digital circuitry, processors and memory for encoding and decoding. These include computational efficiency, power consumption, memory consumption, memory bandwidth, use of network bandwidth, cost of hardware circuitry or programmable processors/circuitry, cost of designing and integrating encoders and decoders within signal transmitter and receiver, equipment, etc. For example, some encoding schemes may provide optimized encoding or decoding, but may not be applicable because they are too slow for encoding or decoding in real time, e.g., as the host signal is being transmitted, received, updated, or being processed with multiple other signal processing operations concurrently.

The design must also account for practical challenges of the marking technology. The printing technology must be able to reproduce the signal reliably. This includes transformation of the data signal in the Raster Image Processor as well as application of an image to an object.

The design must also account for practical challenges posed by image capture and associated optics. Scanners at Point of Sale (POS), for example, tend to be tuned to detect black and white bar codes (e.g., with a spectral range that focuses on image capture around image content at a wavelength at or around 660 nm), and as such, the illumination type and sensors may have a much more limited range of spectral bands and resolutions that the device can sense.

Sparse signaling is particularly challenging in that the sparse nature of the signal provides less opportunity to include signal for payload and robustness. In particular, there is less opportunity to include payload and synchronization. The strategy for synchronization may rely on an explicit synchronization ("sync") component or an implicit synchronization component. In the latter case, the encoding of the payload may be arranged in a manner that provides a pattern that facilitates detection and synchronization.

Another important consideration for some applications is compatibility and inter-operability with other messaging protocols. For example, in the case of applying identification over the surface of objects, the signal encoding and decoding strategy should preferably support various protocols to deal with various image types, printing technologies, and scanner technologies. This design consideration dictates that sparse signaling should be compatible with encoding and decoding other signaling, like legacy encoding schemes on older objects and dense watermark signaling strategies and barcodes of various types. Preferably, the installed base of decoder technology should be able to efficiently decode signals from various signaling types, including new sparse signal arrangements.

One aspect of the disclosure is a method for inserting a sparse, variable data carrying signal into an image. This method provides a first signal component, which facilitates a synchronization function of the sparse signal. It also provides a second signal component that is modulated to carry a variable data signal. The first and second signal components have values located at coordinates within a two-dimensional block. The method combines the first signal component and the second signal component to produce the sparse, variable data carrying signal by setting sparse elements at coordinates within the two-dimensional block where the first and second component signal values provide compatible modulation of the image. The method inserts the sparse, variable data carrying signal into at least a first image layer or channel of an image design.

In this method, the sparse signal elements are set at coordinates where the signal components provide compatible modulation. Compatible modulation is where the signals of the two components comply with a consistency rule. For example, the signals have a consistent direction of modulation of an optical property at a coordinate within the two-dimensional block. One optical property is brightness or lightness and it may be modulated in a darker or lighter direction. Other examples of optical properties are chrominance and hue. Components that modulate an image in the same direction, e.g., both darker or both lighter, have a compatible modulation direction.

The consistency rule may also be determined by consistency in amount of modulation. For instance, modulation of the components is compatible if the value of signal components fall within a common range bounded by at least one threshold. In some cases, components are multi-valued, and then quantized to quantization levels or bins (multi-dimensional values falling in a bin space are quantized to a bin). This may be implemented by applying a threshold, in which values within a range are set to a particular value. Multi-valued components are converted into binary levels (e.g., 1 or 0) or more than two levels (e.g., 1, 0, −1), for example. The consistency rule is evaluated on the output of this process by comparing the values of the signal components at a coordinate and setting sparse element or not at the coordinate based on the consistency. A logical AND operation or like comparison may be used to determine whether the signal components satisfy the consistency rule, e.g., quantize to a common quantization level or range bounded by a threshold.

The quantizing of a signal can be used to determine a distribution of sparse elements in a block. In one embodiment, for example, a signal component (e.g., sync component) is quantized to provide a sparse distribution within a block. The sparse signal is then formed based on where the signal components comply with a consistency rule. The consistency rule evaluates signal components at these locations and sets a sparse element at the coordinate where they are consistent.

Another aspect of the disclosure is a method for inserting a sparse, variable data carrying signal into an image that employs orthogonal signal components. First and second orthogonal components are provided, with at least one of them modulated with variable data. The orthogonal components are combined to produce a sparse, variable data carrying signal by selecting a subset of the first and second orthogonal components. This sparse signal is then inserted into at least a first image layer of an image design. The components may be quantized into sparse signals, and then combined. Alternatively, they may be combined and then quantized into a sparse signal.

Another aspect of the disclosure is an alternative method for inserting a sparse, variable data carrying signal into an image. In this method, a sparse pattern of elements at coordinates within a two-dimensional block is provided, along with a signal component that is modulated to carry a variable data signal. The method generates a sparse, variable data carrying signal by distributing the signal component within the two-dimensional block based on the location of the sparse pattern of elements. In one such approach, the signal component is converted to a sparse, variable data carrying signal by removing signal elements of the signal component at coordinates where the signal component does not coincide with coordinates of the sparse pattern. The signal component is repeated in two-dimensional blocks within the image. Different sparse patterns may be used to distribute the signal component differently in the blocks.

In this document, we detail various sparse signaling schemes, including schemes for generating signals, and encoding and decoding them in various object types and object marking technologies. We describe schemes that encode a sparse signal within host signal carrier in a manner that is robust, flexible to achieve perceptual quality constraints, and provides improved data capacity.

BRIEF DESCRIPTION OF THE DRAWINGS

FIG. 11 illustrates a portion of a sparse signal.

FIG. 12 illustrates the sparse signal of FIG. 11, modified to reduce the signal using a line screen approach.

FIG. 15 is a diagram depicting properties of additives used to enhance detection of encoded data signals.

FIGS. 24A and 24B tabulate percentages of sync signal elements that have values below different thresholds, for two different embodiments.

FIG. 32A shows an element of a sync signal block in the spatial domain.

FIG. 32B shows a higher resolution counterpart to the sync element of FIG. 32A.

FIG. 33 details a ranking of the cells in the sync element of FIG. 32B.

FIGS. 34A, 34B, 34C and 34D show, respectively sync element blocks in which the lowest-valued one, two, three and four cells in FIG. 32B are darkened.

FIG. 35 shows how the block of FIG. 34D can be adjusted to avoid edge-adjoining dark cells.

FIG. 36 helps explain another method for adjusting the signal element block of FIG. 34D to avoid edge-adjoining dark cells.

FIG. 37 shows the block of FIG. 34D after adjustment by a process involving FIG. 36.

FIG. 38 shows two adjoining sync signal element blocks.

FIG. 39 details a ranking of cells in the right-most of the sync elements of FIG. 38.

FIG. 40 shows how signal element blocks that—individually—lack edge-adjoining dark cells, may present edge-adjoining dark cells when juxtaposed with each other.

FIG. 41 shows the signal element blocks of FIG. 40 after adjustment to avoid edge-adjoining dark cells.

FIG. 42 helps explain another method for adjusting the paired element blocks of FIG. 40 to avoid edge-adjoining dark cells.

FIG. 43 shows the paired signal element blocks of FIG. 40 after adjustment by a process involving FIG. 42 to avoid edge-adjoining dark cells.

DETAILED DESCRIPTION

Signal Encoder and Decoder

Figure 1:
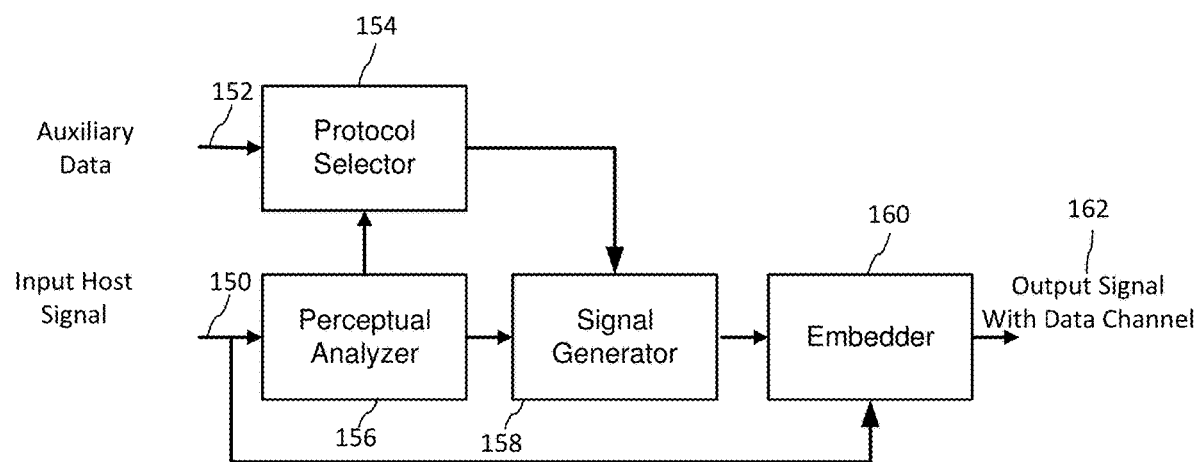
FIG. 1 is a block diagram of a signal encoder for encoding a data signal into a host signal.
Figure 2:
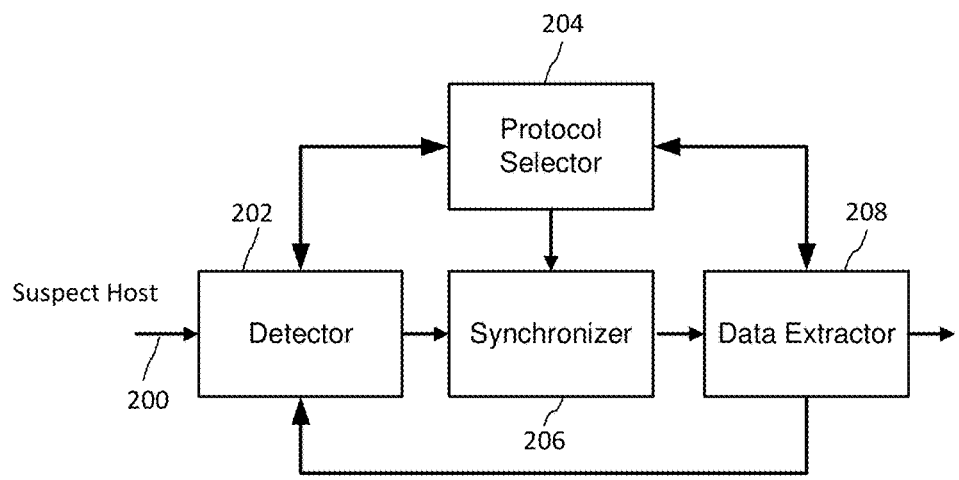
FIG. 2 is a block diagram of a signal decoder for extracting a data signal from a host signal.

FIG. 1 is a block diagram of a signal encoder for encoding a sparse signal. FIG. 2 is a block diagram of a compatible signal decoder for extracting a payload from a sparse signal encoded on an object or within an image displayed on a video display.

Encoding and decoding is typically applied digitally, yet the signal is expected to survive digital to analog transformation and analog to digital transformation. For example, the encoder generates an image including the sparse signal that is converted to a rendered form, such as a printed image, displayed image or video. We use the term "printing" to encompass a wide variety of marking technologies, including engraving, etching, stamping, etc. as there are a variety of ways to impart the image carrying the sparse signal to an object. Prior to decoding, a receiving device captures an image or stream of images of the object through its image sensor such as a camera (e.g., CMOS or CCD), and converts it to an electronic signal, which is digitized and processed by signal decoding modules.

Inputs to the signal encoder include a host signal 150 and auxiliary data 152. The objectives of the encoder include encoding a robust signal with desired capacity per unit of host signal, while maintaining perceptual quality within a perceptual quality constraint. In some cases, there may be very little variability or presence of a host signal, in which case, there is little host interference, on the one hand, yet little host content in which to mask the presence of the data channel visually. Some examples include a region of a package design that is devoid of much image variability (e.g., a single, uniform color), the surface of a part, a label or receipt, or video display without natural imagery (e.g., just simple graphics, uniform or solid tones and text).

The auxiliary data 152 includes the variable data information (e.g., payload) to be conveyed in the data channel, possibly along with other protocol data used to facilitate the communication.

The protocol defines the manner in which the signal is structured and encoded for robustness, perceptual quality or data capacity. For any given application, there may be a single protocol, or more than one protocol. Examples of multiple protocols include cases where there are different versions of the channel, different channel types (e.g., several sparse signal layers within a host). An example is a package design or document, in which rich imagery are encoded with dense watermark signal protocols, and blank or uniform or solid tone areas are encoded with tints or sparse signal protocols. Different protocol versions may employ different robustness encoding techniques or different data capacity. Protocol selector module 154 determines the protocol to be used by the encoder for generating a data signal. It may be programmed to employ a particular protocol depending on the input variables, such as user control, application specific parameters, or derivation based on analysis of the host signal.

Perceptual analyzer module 156 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 may be used to ascertain color content and masking capability of the host image.

The sparse mark may be included in one of the layers or channels of the image file, e.g., corresponding to:
- a color channel of the image, e.g., Red Green Blue (RGB);
- components of a color model (Lab, HSV, HSL, etc.);
- inks of the printer (Cyan, Magenta, Yellow, or Black (CMYK)), a spot color layer (e.g., corresponding to a Pantone color), which are specified to be used to print the image;
- a coating (varnish, UV layer, lacquer);
- other material layer (metallic substance, e.g., metallic ink or stamped foil where the sparse signal is formed by stamping holes in the foil or removing foil to leave sparse dots of foil); etc.

The above are typically specified in a design file, and are manipulated by our encoder. For example, our encoder is implemented as software modules of a plug-in to Adobe Photoshop image processing software. Design files in this software are specified in terms of image layers or image channels. The encoder may modify existing layers, channels or insert new ones. A plug-in can be utilized with other image processing software, e.g., Adobe Illustrator.

The perceptual analysis performed in the encoder depends on a variety of factors, including color or colors of the sparse signal, resolution of the sparse signal, dot structure and screen angle used to print image layer(s) with sparse signal, content within the layer of the sparse signal, content within layers under and over the sparse signal, etc. The perceptual analysis may lead to the selection of a color or combination of colors in which to encode the sparse signal that minimizes visual differences due to inserting the sparse signal in an ink layer or layers within the image. This selection may vary per embedding location of each sparse signal element. Likewise, the amount of signal at each location may also vary to control visual quality. The encoder can, depending on the associated print technology in which it is employed, vary sparse signal by controlling parameters such as:
- dot shape,
- signal amplitude at a dot,
- ink quantity at a dot (e.g., dilute the ink concentration to reduce percentage of ink),
- structure and arrangement of dot cluster or "bump" shape at a location of a sparse signal element or region of elements. An arrangement of ink applied to an x-by-y two dimensional array of neighboring locations can be used to form a "bump" of varying shape or signal amplitude, as explained further below.

The ability to control printed dot size and shape is a particularly challenging issue and varies with print technology. Dot size can vary due to an effect referred to as dot gain. The ability of a printer to reliably reproduce dots below a particular size is also a constraint.

The sparse signal may also be adapted according to a blend model which indicates the effects of blending the ink of the sparse signal layer with other layers and the substrate.

In some cases, a designer may specify that the sparse signal be inserted into a particular layer. In other cases, the encoder may select the layer or layers in which it is encoded to achieve desired robustness and visibility (visual quality of the image in which it is inserted).

The output of this analysis, along with the rendering method (display or printing device) and rendered output form (e.g., ink and substrate) may be used to specify encoding channels (e.g., one or more color channels), perceptual models, and signal protocols to be used with those channels. Please see, e.g., our work on visibility and color models used in perceptual analysis in our U.S. application Ser. Nos. 14/616,686, 14/588,636 and 13/975,919, Patent Application Publication 20100150434, and U.S. Pat. No. 7,352,878, which are each hereby incorporated by reference in its entirety.

The signal generator module 158 operates on the auxiliary data and generates a data signal according to the protocol. It may also employ information derived from the host signal, such as that provided by perceptual analyzer module 156, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 160 takes the data signal and modulates it onto a channel by combining it with the host signal. The operation of combining may be an entirely digital signal processing operation, such as where the data signal modulates the host signal digitally, may be a mixed digital and analog process or may be purely an analog process (e.g., where rendered output images are combined). As noted, a sparse signal may occupy a separate layer or channel of the design file. This layer or channel may get combined into an image in the Raster Image Processor (RIP) prior to printing or may be combined as the layer is printed under or over other image layers on a substrate.

There are a variety of different functions for combining the data and host in digital operations. One approach is to adjust the host signal value as a function of the corresponding data signal value at an embedding location, which is controlled according to the perceptual model and a robustness model for that embedding location. The adjustment may alter the host channel by adding a scaled data signal or multiplying a host value by a scale factor dictated by the data signal value corresponding to the embedding location, with weights or thresholds set on the amount of the adjustment according to perceptual model, robustness model, available dynamic range, and available adjustments to elemental ink structures (e.g., controlling halftone dot structures generated by the RIP). The adjustment may also be altering by setting or quantizing the value of a pixel to particular sparse signal element value.

As detailed further below, the signal generator produces a data signal with data elements that are mapped to embedding locations in the data channel. These data elements are modulated onto the channel at the embedding locations. Again please see the documents incorporated herein for more information on variations.

The operation of combining a sparse signal with other imagery may include one or more iterations of adjustments to optimize the modulated host for perceptual quality or robustness constraints. One approach, for example, is to modulate the host so that it satisfies a perceptual quality metric as determined by perceptual model (e.g., visibility model) for embedding locations across the signal. Another approach is to modulate the host so that it satisfies a robustness metric across the signal. Yet another is to modulate the host according to both the robustness metric and perceptual quality metric derived for each embedding location. The incorporated documents provide examples of these techniques. Below, we highlight a few examples.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The rendering process may be modeled digitally to produce a modeled version of the sparse signal as it will appear when rendered. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequences of operations. See, e.g., our U.S. application Ser. Nos. 14/616,686, 14/588,636 and 13/975,919, Patent Application Publication 20100150434, and U.S. Pat. No. 7,352,878.

The embedder also computes a robustness model in some embodiments. The computing a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship between a sparse dot and neighboring content to recover the data signal in the presence of noise and host signal interference. At this stage of encoding, the host interference is derivable by applying an extraction filter to the modulated host. The extraction filter models data signal extraction from the modulated host and assesses whether a detection metric is sufficient for reliable decoding. If not, the sparse signal may be re-inserted with different embedding parameters so that the detection metric is satisfied for each region within the host image where the sparse signal is applied.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish sufficient detection metrics for both the payload and synchronization components of the sparse signal within a particular region of the host image.

The robustness model may also model distortion expected to be incurred by the modulated host, apply the distortion to the modulated host, and repeat the above process of measuring visibility and detection metrics and adjusting the amount of alterations so that the data signal will withstand the distortion. See, e.g., Ser. Nos. 14/616,686, 14/588,636 and 13/975,919 for image related processing; each of these patent documents is hereby incorporated herein by reference.

This modulated host is then output as an output signal 162, with an embedded data channel. The operation of combining also may occur in the analog realm where the data signal is transformed to a rendered form, such as a layer of ink, including an overprint or under print, or a stamped, etched or engraved surface marking. In the case of video display, one example is a data signal that is combined as a graphic overlay to other video content on a video display by a display driver. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host signals and adapts signal strength and configuration of the data pattern to be more reliable to the classes of noise sources and host signals.

The output 162 from the embedder signal typically incurs various forms of distortion through its distribution or use. This distortion is what necessitates robust encoding and complementary decoding operations to recover the data reliably.

Turning to FIG. 2, a signal decoder receives a suspect host signal 200 and operates on it with one or more processing stages to detect a data signal, synchronize it, and extract data. The detector is paired with input device in which a sensor or other form of signal receiver captures an analog form of the signal and an analog to digital converter converts it to a digital form for digital signal processing. Though aspects of the detector may be implemented as analog components, e.g., such as preprocessing filters that seek to isolate or amplify the data channel relative to noise, much of the signal decoder is implemented as digital signal processing modules.

The detector 202 is a module that detects presence of the sparse signal and other signaling layers. The incoming image is referred to as a suspect host because it may not have a data channel or may be so distorted as to render the data channel undetectable. The detector is in communication with a protocol selector 204 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 204.

The synchronizer module 206 synchronizes the incoming signal to enable data extraction. Synchronizing includes, for example, determining the distortion to the host signal and compensating for it. This process provides the location and arrangement of encoded data elements of a sparse signal within an image.

The data extractor module 208 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory, such as a RAM memory.

Signal Generator

Figure 3:
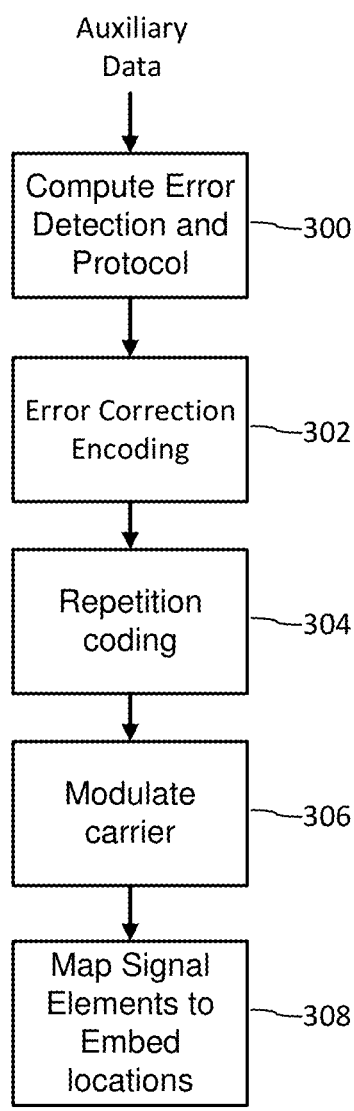
FIG. 3 is a flow diagram illustrating operations of a signal generator.

FIG. 3 is a flow diagram illustrating operations of a signal generator. Each of the blocks in the diagram depict processing modules that transform the input auxiliary data (e.g., the payload) into a data signal structure. For a given protocol, each block provides one or more processing stage options selected according to the protocol. In processing module 300, the auxiliary data is processed to compute error detection bits, e.g., such as a Cyclic Redundancy Check, Parity, or like error detection message symbols. Additional fixed and variable messages used in identifying the protocol and facilitating detection, such as synchronization signals may be added at this stage or subsequent stages.

Error correction encoding module 302 transforms the message symbols into an array of encoded message elements (e.g., binary or M-ary elements) using an error correction method. Example include block codes, convolutional codes, etc.

Repetition encoding module 304 repeats the string of symbols from the prior stage to improve robustness. For example, certain message symbols may be repeated at the same or different rates by mapping them to multiple locations within a unit area of the data channel (e.g., one unit area being a tile of bit cells, bumps or "waxels," as described further below).

Next, carrier modulation module 306 takes message elements of the previous stage and modulates them onto corresponding carrier signals. For example, a carrier might be an array of pseudorandom signal elements. For a sparse signal, this may include equal number of binary one and binary zero elements. These may correspond to "ink" and "no ink" elements of the sparse signal. The data elements of a sparse signal may also be multi-valued. In this case, M-ary or multi-valued encoding is possible at each sparse signal element, through use of different colors, ink quantity, dot patterns or shapes. Sparse signal application is not confined to lightening or darkening an object at a sparse element location (e.g., luminance or brightness change). Various adjustments may be made to effect a change in an optical property, like luminance. These include modulating thickness of a layer, surface shape (surface depression or peak), translucency of a layer, etc. Other optical properties may be modified to represent the sparse element, such as chromaticity shift, change in reflectance angle, polarization angle, or other forms optical variation. As noted, limiting factors include both the limits of the marking or rendering technology and ability of a capture device to detect changes in optical properties encoded in the sparse signal. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features at which the sparse signal element is inserted.

Various detailed examples of protocols and processing stages of these protocols are provided in our prior work, such as our U.S. Pat. Nos. 6,614,914, 5,862,260, 6,345,104, 6,993,152 and 7,340,076, which are hereby incorporated by reference in their entirety, and US Patent Publication 20100150434, previously incorporated. More background on signaling protocols, and schemes for managing compatibility among protocols, is provided in U.S. Pat. No. 7,412,072, which is hereby incorporated by reference in its entirety.

The above description of signal generator module options demonstrates that the form of the sparse signal used to convey the auxiliary data varies with the needs of the application. As introduced at the beginning of this document, signal design involves a balancing of required robustness, data capacity, and perceptual quality. It also involves addressing many other design considerations, including compatibility, print constraints, scanner constraints, etc. We now turn to examine signal generation schemes, and in particular, schemes that employ sparse signaling, and schemes for facilitating detection, synchronization and data extraction of a data signal in a host channel.

One signaling approach, which is detailed in U.S. Pat. Nos. 6,614,914, and 5,862,260, is to map signal elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 3. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by adjusting host signal values at these locations for each error correction coded bit according to the values of the corresponding elements of the modulated carrier signal for that bit.

The signal decoder estimates each coded bit by accumulating evidence across the pseudo-random locations obtained after non-linear filtering a suspect host image. Estimates of coded bits at the sparse signal element level are obtained by applying an extraction filter that estimates the sparse signal element at particular embedding location or region. The estimates are aggregated through de-modulating the carrier signal, performing error correction decoding, and then reconstructing the payload, which is validated with error detection.

This pseudo-random arrangement spreads the data signal such that it has a uniform spectrum across the tile. However, this uniform spectrum may not be the best choice from a signal communication perspective since energy of a host image may concentrated around DC. Similarly, an auxiliary data channel in high frequency components tends to be more disturbed by blur or other low pass filtering type distortion than other frequency components. We detail a variety of signal arrangements in our co-pending U.S. patent application Ser. No. 14/724,729, filed May 28, 2015, entitled DIFFERENTIAL MODULATION FOR ROBUST SIGNALING AND SYNCHRONIZATION, which is hereby incorporated by reference in its entirety. This application details several signaling strategies that may be leveraged in the design of sparse signals, in conjunction with the techniques in this document. Differential encoding applies to sparse elements by encoding in the differential relationship between a sparse element and other signal, such as a background, host image, or other signal components (e.g., a sync component).

Our U.S. Pat. No. 6,345,104, building on the disclosure of U.S. Pat. No. 5,862,260, describes that an embedding location may be modulated by inserting ink droplets at the location to decrease luminance at the region, or modulating thickness or presence of line art. Additionally, increases in luminance may be made by removing ink or applying a lighter ink relative to neighboring ink. It also teaches that a synchronization pattern may act as a carrier pattern for variable data elements of a message payload. The synchronization component may be a visible design, within which a sparse or dense data signal is merged. Also, the synchronization component may be designed to be imperceptible, using the methodology disclosed in U.S. Pat. No. 5,862,260.

In this document, we further revisit the design, encoding and decoding of sparse signals in more detail. As introduced above, one consideration in the design of a sparse signal is the allocation of signal for data carrying and for synchronization. Another consideration is compatibility with other signaling schemes in terms of both encoder and decoder processing flow. With respect to the encoder, the sparse encoder should be compatible with various signaling schemes, including dense signaling, so that it each signaling scheme may be adaptively applied to different regions of an image design, as represented in an image design file, according to the characteristics of those regions. This adaptive approach enables the user of the encoder tool to select different methods for different regions and/or the encoder tool to be programmed to select automatically a signaling strategy that will provide the most robust signal, yet maintain the highest quality image, for the different regions.

One example of the advantage of this adaptive approach is in product packaging where a package design has different regions requiring different encoding strategies. One region may be blank, another blank with text, another with a graphic in solid tones, another with a particular spot color, and another with variable image content.

With respect to the decoder, this approach simplifies decoder deployment, as a common decoder can be deployed that decodes various types of data signals, including both dense and sparse signals.

One approach to sparse signal design is to construct the signal to have optimal allocation of payload and synchronization components, without regard to compatibility with legacy dense signaling protocols. In such an approach, the signaling techniques for data and synchronization are developed to minimize interference between the variable data carrying and synchronization functions of the sparse signal. For example, if the sparse signal is being designed without needing to be compatible with a dense signaling strategy, it can be designed from the start to be comprised as an array of sparse elements, with variable data and sync functions. One advantage is that there is no need to apply a threshold or quantizer to remove aspects of a signal to convert it into a sparse format.

Another approach is to design a sparse signal to be compatible with a legacy signaling scheme. Within this type of an approach, one can employ techniques to convert a legacy signaling scheme into a sparse signal. In particular, in one such approach, the process of generating a sparse signal begins with a dense watermark signal, and selectively removes elements of it to produce a sparse signal, while retaining sufficient amounts of data and synchronization functionality.

As we detail further below, there are several ways to convert dense signals to sparse signals. Before exploring these methods, we start by further considering properties of dense signals relative to sparse signal. In some cases, the dense signal is comprised of a multi-valued watermark tile (e.g., eight bit per pixel image approximating a continuous signal), which is a block of m by n embedding locations, where m and n are the integer coordinates of embedding locations in a tile (e.g., m=n=128, 256, 512, etc.). The value at each tile corresponds to an adjustment to be made to a corresponding location in a host image to encode the watermark. The tile is repeated contiguously in horizontal and vertical directions over a region of the host image, possibly the entire image. The signal is considered "dense" relative to a sparse signal, when the adjustments are densely spaced, in contrast to a sparse signal, where its signal elements are spread apart in the tile. Dense signals are preferred for host signals that are similarly dense, varying, and multi-valued, enabling embedding by adjusting the values of the host signal at the embedding locations. A dense embedding enables higher capacity embedding for both data and sync functions within a tile.

Converting a dense signal to a sparse signal still achieves the objective of reliable signaling due to a couple of characteristics of the signal and host. First, the signal is redundant in the tile and across repeated tiles, so removing a portion of it from each tile leaves sufficient signal for reliable and complete recovery of the payload. Signal detection is aggregated across tiles to further assist in reliable recovery, as detailed, for example in U.S. Pat. No. 6,614,914. Second, sparse signaling is adaptively applied where there is less likely to be interference with host signal content, and as such, its sparse property is relatively less impacted by interference.

Some approaches to converting dense to sparse signals include, but are not limited to:

Quantizing the array of multi-valued signal to produce a sparse array of elements by quantizing some sub-set of the values to zero;

Selecting a sub-set of a dense signal, with selection being adapted to retain data signal and sync function within a tile (keeping in mind that such selection may be implemented across tile boundaries in a manner that reliable detection can be made with the aid of extraction from an area larger than that of a single tile);

Selecting locations to retain based on a particular signal pattern, which may be variable or fixed per tile;

Selection or locations based on a pattern of the data signal or a synchronization signal; and Combinations of the above, where, for example, quantizing inherently acts to select values to retain and sets the value of the sparse element.

These methods are not mutually exclusive and may be combined in various ways. The case of using quantization may also include applying a fixed or adaptive threshold operation to convert a multi-valued dense signal to a sparse signal. Use of a threshold operation to generate a sparse signal is described, for example, in U.S. Pat. No. 6,993,152, which is incorporated by reference above. Below, we describe further details through examples illustrating various methods.

Whether one starts with a sparse signal or generates one by converting a dense signal, it should be noted that techniques for modulating variable data into the sparse signal can vary quite a bit. Our U.S. Pat. Nos. 5,862,260, 6,614,914, and 6,345,104 describe several examples of modulation for carrying variable data in image content, and U.S. patent application Ser. No. 14/724,729, describes yet additional examples, including differential modulation methods. These documents also describe explicit and implicit synchronization signals.

As introduced above with reference to FIG. 3, there are stages of modulation/demodulation in the encoder, so it is instructive to clarify different types of modulation. One stage is where a data symbol is modulated onto an intermediate carrier signal. Another stage is where that modulated carrier is inserted into the host by modulating elements of the host. In the first case, the carrier might be pattern, e.g., a pattern in a spatial domain or a transform domain (e.g., frequency domain). The carrier may be modulated in amplitude, phase, frequency, etc. The carrier may be, as noted, a pseudorandom string of 1's and 0's or multi-valued elements that is inverted or not (e.g., XOR, or flipped in sign) to carry a payload or sync symbol.

As noted in our application Ser. No. 14/724,729, carrier signals may have structures that facilitate both synchronization and variable data carrying capacity. Both functions may be encoded by arranging signal elements in a host channel so that the data is encoded in the relationship among signal elements in the host. Application Ser. No. 14/724,729 specifically elaborates on a technique for modulating, called differential modulation. In differential modulation, data is modulated into the differential relationship among elements of the signal. In some watermarking implementations, this differential relationship is particularly advantageous because the differential relationship enables the decoder to minimize interference of the host signal by computing differences among differentially encoded elements. In sparse signaling, there may be little host interference to begin with, as the host signal may lack information at the embedding location.

Nevertheless, differential modulation may be exploited or the scheme may be adapted to allow it to be exploited for sparse signaling. For example, sparse elements may be designed such that they have a differential relationship to other elements, either within the sparse signal (e.g. the sync component), or within the host signal (e.g., neighboring background of each sparse element). A sparse element where a dot of ink is applied, for example, has a differential relationship with neighbors, where no ink is applied. Data and sync signals may be interleaved so that they have such differential relationships. A sparse signal may be encoded differentially relative to a uniform or solid tone, where some sparse elements darken the tone (e.g., darker dots), and others lighten it (e.g., lighter holes).

Differential schemes may further be employed as a preliminary stage to generate a dense multi-valued signal, which in turn is converted to a sparse signal using the above described schemes for conversion. The encoder then converts this dense signal to a sparse signal, maintaining where possible, differential relationships.

Another form of modulating data is through selection of different carrier signals to carry distinct data symbols. One such example is a set of frequency domain peaks (e.g., impulses in the Fourier magnitude domain of the signal) or sine waves. In such an arrangement, each set carries a message symbol. Variable data is encoded by inserting several sets of signal components corresponding to the data symbols to be encoded. The decoder extracts the message by correlating with different carrier signals or filtering the received signal with filter banks corresponding to each message carrier to ascertain which sets of message symbols are encoded at embedding locations.

Having now illustrated methods to modulate data into the watermark (either dense or sparse), we now turn to the issue of designing for synchronization. For the sake of explanation, we categorize synchronization as explicit or implicit. An explicit synchronization signal is one where the signal is distinct from a data signal and designed to facilitate synchronization. Signals formed from a pattern of impulse functions, frequency domain peaks or sine waves is one such example. An implicit synchronization signal is one that is inherent in the structure of the data signal.

An implicit synchronization signal may be formed by arrangement of a data signal. For example, in one encoding protocol, the signal generator repeats the pattern of bit cells representing a data element. We sometimes refer to repetition of a bit cell pattern as "tiling" as it connotes a contiguous repetition of elemental blocks adjacent to each other along at least one dimension in a coordinate system of an embedding domain. The repetition of a pattern of data tiles or patterns of data across tiles (e.g., the patterning of bit cells in our U.S. Pat. No. 5,862,260) create structure in a transform domain that forms a synchronization template. For example, redundant patterns can create peaks in a frequency domain or autocorrelation domain, or some other transform domain, and those peaks constitute a template for registration. See, for example, our U.S. Pat. No. 7,152,021, which is hereby incorporated by reference in its entirety.

The concepts of explicit and implicit signaling readily merge as both techniques may be included in a design, and ultimately, both provide an expected signal structure that the signal decoder detects to determine geometric distortion.

In one arrangement for synchronization, the synchronization signal forms a carrier for variable data. In such arrangement, the synchronization signal is modulated with variable data. Examples include sync patterns modulated with data.

Conversely, in another arrangement, that modulated data signal is arranged to form a synchronization signal. Examples include repetition of bit cell patterns or tiles.

These techniques may be further exploited in sparse signal design because the common structure for carrying a variable payload and synchronizing in the decoder is retained in the sparse design, while minimizing interference between the signal components that provide these functions. We have developed techniques in which one signal component is a carrier of the other component, and in these techniques, the process of generating a sparse signal produce a signal that performs both functions.

The variable data and sync components of the sparse signal may be chosen so as to be conveyed through orthogonal vectors. This approach limits interference between data carrying elements and sync components. In such an arrangement, the decoder correlates the received signal with the orthogonal sync component to detect the signal and determine the geometric distortion. The sync component is then filtered out. Next, the data carrying elements are sampled, e.g., by correlating with the orthogonal data carrier or filtering with a filter adapted to extract data elements from the orthogonal data carrier. Signal encoding and decoding, including decoder strategies employing correlation and filtering are described in our co-pending application Ser. No. 14/724,729, and these strategies may be employed to implement this approach for sparse signaling.

Additional examples of explicit and implicit synchronization signals are provided in our previously cited U.S. Pat. Nos. 6,614,914, and 5,862,260. In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Publication 20120078989, which is hereby incorporated by reference in its entirety, provides additional methods for detecting an embedded signal with this type of structure and recovering rotation, scale and translation from these methods.

Additional examples of implicit synchronization signals, and their use, are provided in U.S. Pat. Nos. 6,614,914, 5,862,260, and application Ser. No. 14/724,729 as well as U.S. Pat. Nos. 6,625,297 and 7,072,490, which are hereby incorporated by reference in their entirety.

Figure 4:
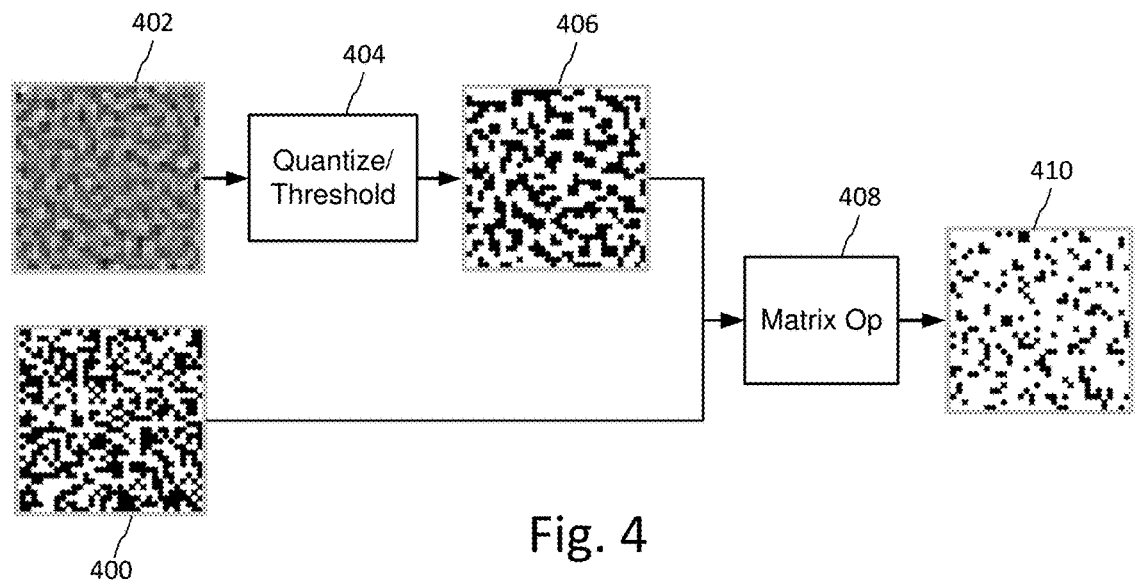
FIG. 4 is a diagram illustrating an example of a sparse signal generator.

Returning now to sparse signal design, we now provide detailed examples of sparse signaling techniques. FIG. 4 is a diagram illustrating an embodiment of a sparse signal generator. The signal generator starts with tiles of two signal components, one carrying variable data 400, and one providing a synchronization function 402. The synchronization signal is multi-valued per pixel (e.g., 0-255), and it is passed through a quantizer 404 to convert it to a signal with fewer levels per pixel. In its simplest form, the quantizer converts the multi-valued signal into a binary signal, represented as black and white pixels, by a threshold operation. The threshold operation for each pixel within a tile compares each value with a threshold. For binary signals, elements below the threshold are shown as black here, while elements above the threshold are white. As noted, this is simply representative of a modulation state of an optical property at a sparse element, such as darker or lighter relative to background, and is not particularly limited to rendering black and white pixels.

The variable data signal 400 is comprised of elements having one of two values (e.g., 1 or 0, A, −A). As explained previously, a payload signal may be transformed into a robust data signal through one or more modulation stages, e.g., error correction and modulating the error correction coded signal onto a binary carrier signal, which is the approach used in this embodiment. This modulated carrier is mapped to pixel locations within the tile to form data tile 400.

The signal generator of FIG. 4 produces a sparse signal by selectively combining elements of data tile 400 with the quantized synchronization signal 406. In the embodiment illustrated here, the signal generator performs a matrix operation 408 that selectively retains components of the data and synchronization tiles, while producing a sparse signal output 410. One particular matrix operation to generate dark sparse elements on a lighter background, as shown here, is to compute a logical AND operation between corresponding pixel locations within the data and synchronization tiles, such that pixels that are both black at the same coordinates in each tile remain black in the output. For other inputs (white AND white, black AND white, or white AND black), the output pixel is white at that coordinate.

In this approach, the black pixels of the message signal are retained at all coordinates in the tile where the synchronization signal also has a black pixel. This technique distributes sparse message elements within a tile according the spatial distribution of the synchronization signal. It ensures that there sufficient signal energy to carry the payload robustly, while preserving sufficient signal energy for synchronization. It also ensures that the sync signal does not interfere with the sparse message elements. This approach may be reversed in the case where the objective is to generate a sparse signal with light holes against a darker background, with quantization level set appropriately (see later illustrations of setting thresholds for holes in dark background).

This approach also demonstrates a signal generation method in which a multi-valued component is effectively merged with a binary component. The multi-valued synchronization tile is a spatial domain representation of synchronization template formed by peaks in the frequency domain. The binary valued payload carrying component is redundantly encoded and distributed over the tile. In particular, modulated carrier elements, with an equal number of binary 0 and 1 values are spread evenly over the spatial locations within a tile.

The principles of the method may be applied to alternative signal component inputs. The sync and data components may both be multi-valued and selectively quantized to a binary or M-ary form prior to merging with a selective combination of the components per tile location. Alternatively, both the sync and data components may be binary valued and merged with a logic operation. Finally, the data component may be multi-valued and the sync component binary valued, with the data component being quantized prior to merging with the sync component. The matrix operation to combine elements at tile coordinates may be adapted to retain sync and data components that are compatible (e.g., consistently valued or falling within the same quantization bin). This approach allows the generator to form sparse marks with dark elements on lighter background, lighter elements on darker background, or a combination of lighter and darker sparse elements against a mid-level tone background.

Quantization level (including threshold) and merging function may be set with adaptive parameters to bias the sparse signal toward data or sync elements.

Figure 5:
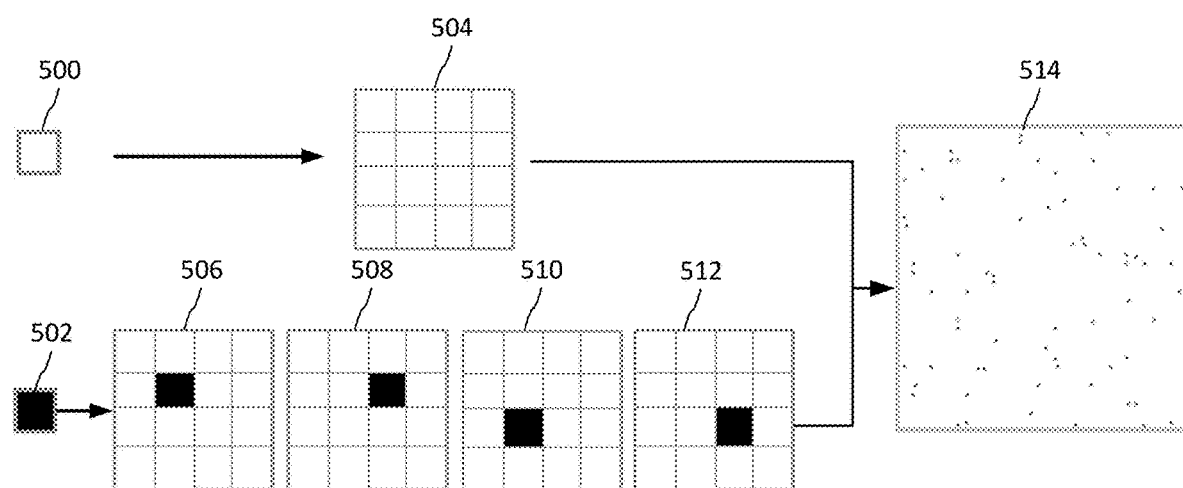
FIG. 5 is a diagram illustrating a refinement of a sparse signal generator like the one in FIG. 4.

FIG. 5 is a diagram illustrating a refinement of a sparse signal generator like the one in FIG. 4. In this refinement, the output of the sparse signal generator is further processed to transform the sparse signal elements. The sparse signal tile output from the generator has dimensions of m by n, where m and n are integer coordinates. For the sake of illustration, we use the example of m=n=128. In preparation for application to an object, the tile coordinates are mapped to coordinates in a target spatial resolution, which is typically expressed in Dots Per Inch (DPI). In FIG. 5, the mapping of a tile coordinate corresponds to a 4 by 4 block, which means that the effective DPI of the tile is one-fourth the DPI of the target image resolution. For example, the sparse mark tile may be generated to be 75 DPI for insertion into an image at 300 DPI, which translates to each tile coordinate (called a waxel) being a 4 by 4 block (waxel region) of pixels in the image coordinate system at 300 DPI. We refer to the region as the "bump" and ratio of target image resolution to waxel resolution as the bump size.

In the refinement of FIG. 5, light and dark waxels (500, 502) of the sparse tile are converted to the higher output resolution. This conversion enables additional flexibility in the shaping and location of each sparse element. Light elements 500 simply convert to 4×4 regions of light elements (504) at the waxel coordinates. In this example of dark sparse elements on light background, the flexibility is in the selection of the location of the dark element. In the technique of FIG. 5 the location of the dark element is pseudo-randomly selected from among 4 locations within the center 2×2 square within the 4×4 pixel region of a waxel. These four alternative locations are depicted in blocks 506, 508, 510 and 512. The resulting converted sparse signal output is shown as output tile 514. This conversion of the sparse input signal (e.g., at 75 DPI) to sparse output image signal at the target resolution (e.g., 300 DPI) does the following:

It makes the sparse signal more sparse;
It varies the location of the sparse element per embedding location so that sparse elements are not consistently falling on horizontal rows and vertical columns of the tile to make the sparse signal less visually perceptible;
It provides some protection against errors introduced by dot gain of the printing process. Even with errors in dot size and location due to dot gain, the resulting sparse element is still located within the correct tile region.

As we explain further below, this sparse output signal may also be converted further in the RIP process and as applied when printed or marked onto an object surface, or rendered for display on a screen or projected image.

Figure 6:
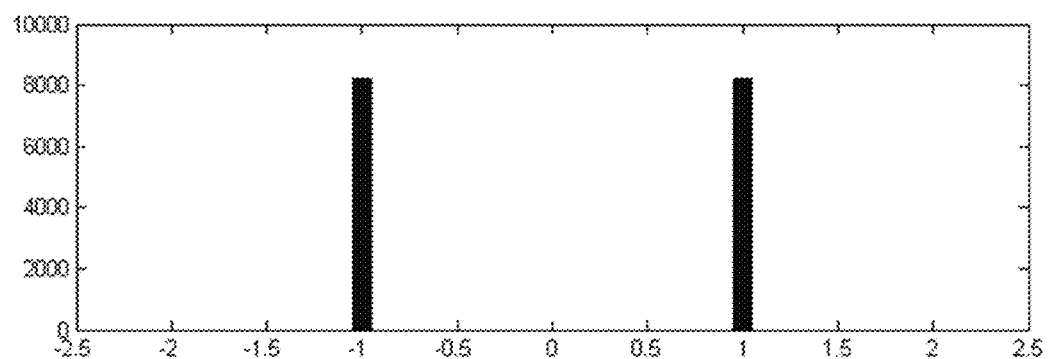
FIG. 6 is a histogram of a digital watermark signal component.
Figure 7:
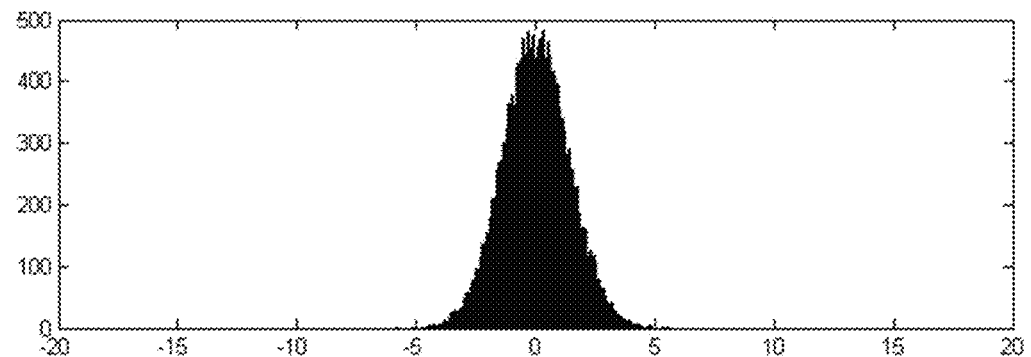
FIG. 7 is a histogram of another digital watermark signal component.
Figure 8:
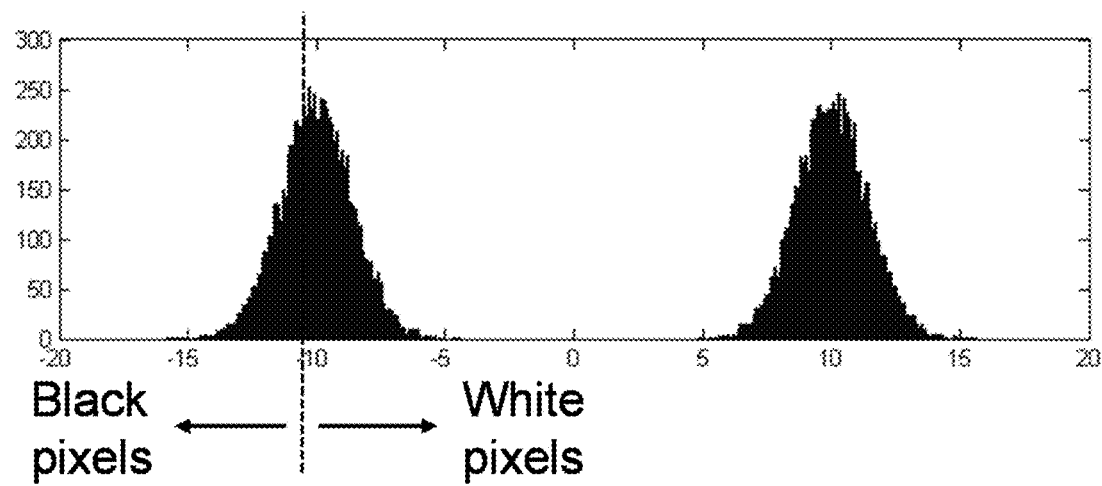
FIG. 8 is a histogram of a combination of the digital watermark signal components of FIGS. 6 and 7, and also depicts examples of different thresholds used to generate a binary image comprising black and white pixels from an image comprised of multi-valued pixels.

FIGS. 6-8 depict histograms of signal components to help illustrate aspects of sparse signal generation from different types of signals. FIG. 6 is a histogram of a digital watermark signal component, with waxel values that are at one of two different levels (−1, 1). This is an example of a histogram of a binary antipodal watermark tile, generated by modulating symbols onto binary antipodal carriers (e.g., a chipping sequence) to create message chips which are mapped pseudo-randomly into locations across the tile.

FIG. 7 is a histogram of another digital watermark signal component with multi-level values. This is an example of a spatial domain conversion of a sync signal tile formed as frequency domain peaks with pseudorandom phase.

FIG. 8 is a histogram of a combination of the digital watermark signal components of FIGS. 6 and 7, also depicting an example of a threshold operation to generate a binary image comprising black and white pixels from an image comprised of multi-valued pixels. In this example, the binary anti-podal signal elements are multiplied by a scale factor of 10 and then added to the multi-valued signal component with the distribution of FIG. 7. To create a sparse signal of darker dots on a lighter background, a threshold operation is applied, for example at the threshold level of the dashed line. Tile elements with a value below the threshold are set to dark ("black") and tile elements with a value above the threshold are set to light ("white"). This diagram provides a graphical depiction of the sparse signal generation process, which retains signal of both data carrying and sync components. The manner in which the payload is modulated onto carriers with half positive and half negative values ensures that the complete signal can be recovered from waxels of negative values or waxels of positive values. Here, for dark on light background, the negatively valued waxels are retained. Additionally, sufficient signal energy of the sync signal is also retained.

Figure 9:
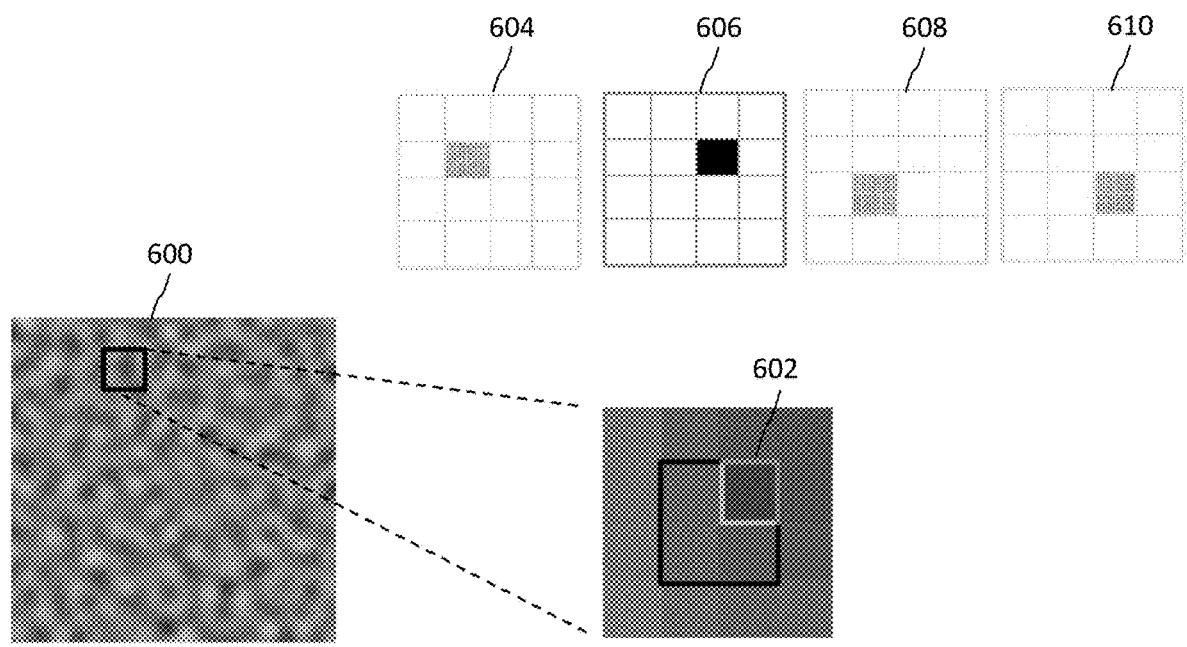
FIG. 9 is a diagram illustrating another refinement of the sparse signal generator of FIG. 4.

FIG. 9 is a diagram illustrating another refinement of the sparse signal generator of FIG. 4. This refinement leverages the same flexibility discussed in connection with FIG. 5 in establishing the sparse dot in a bump region. In this case, the sparse dot is located in the bump region where the sync signal level is at its lowest (for dark on light background sparse marks). A similar approach may be used for sparse holes in a darker background, with the sparse hole located where the synch signal level is highest within the bump region. Because of possible dot gain errors, this approach, like the one in FIG. 5, limits the selection of dot location to the center four pixels of the bump region.

In this variant of the sparse signal generation, the multi-valued sync tile (600) is provided at the resolution of the target image (e.g., 300 DPI in the continuing example, where waxels are at resolution of 75 DPI). The low point within the center 4×4 region of the waxel is at location 602. The signal generator places the sparse dot at this location 602, which is one (606) of the four candidate locations, 604, 606, 608, 610, selectable by the signal generator. This variant provides more sync signal strength as the sparse signal is generated based on a more detailed analysis of the sync signal level within the waxel.

Figure 10:
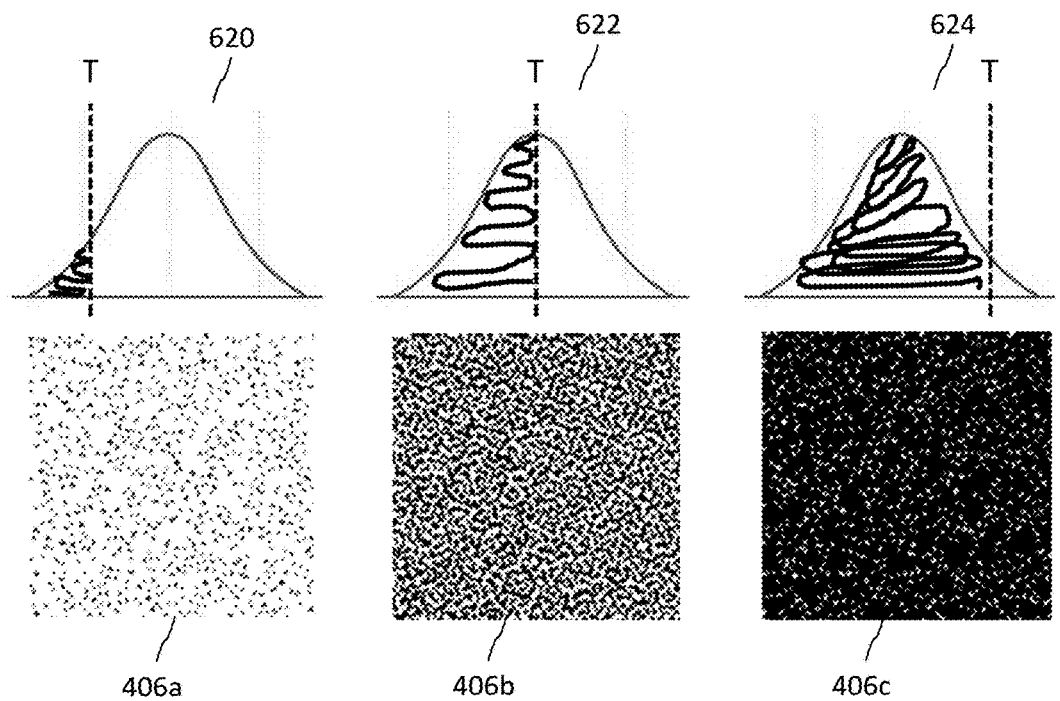
FIG. 10 is a diagram illustrating application of a threshold to a watermark signal, and the resulting output for three different thresholds.

FIG. 10 is a diagram illustrating application of a threshold to a continuous watermark signal, and the resulting output for three different thresholds. The top three plots 620, 622 and 624, illustrate histograms of a continuous watermark signal (here the sync signal), with three different threshold settings "T," shown as the dashed lines. Waxels with values below the threshold are set to black (darker pixels), while values above are set to white (lighter pixels). The selection of thresholds at these three different settings corresponds to the binary image signals 406a, 406b and 406c shown below each histogram. These diagrams illustrate how the threshold T may be adjusted to control the distribution (sparseness) of the quantized continuous signal (which in turn controls the sparseness of the final output signal). The strongest signal output for the quantized continuous signal is where the threshold T is set to the mid-point of the continuous signal.

The combination of the binary data signal and the continuous sync signal using a logical AND operation has the effect of distributing the data signal according to the sync signal.

The detailed arrangement is advantageous in several respects. For example, no expression of one of the two signal components (sync and binary data) undermines the other. Wherever a dark pixel is formed, it aids representation of both signal components.

Relatedly, the sync signal is expressed without adding any noise to the binary data signal.

Moreover, for any given number of dark pixels, it is not possible to embed the binary data signal any stronger.

FIG. 11 illustrates a portion of a sparse signal in magnified state to show dot structure in more detail and set up our explanation of an additional transformation of the sparse signal. In this particular example, the image resolution is 300 DPI, and the black squares are 2×2 black pixels at the center of the 4×4 waxel region (the "bump" region of a waxel, where waxels are at 75 DPI). In contrast to the examples of FIGS. 5 and 9 where a sparse dot is selected from among the 4 pixels of the center 2×2 pixels, here all four of the 2×2 pixels are set to black.

FIG. 12 illustrates the sparse signal of FIG. 11, modified to reduce the signal using a line screen approach. The sparse signal of FIG. 12 is derived from the signal of FIG. 11 by screening back the black dots from 100% to 15% with a 175 line screen. This is just one example of how the sparse signal can be made less perceptible by reducing the sparse elements. In this case, the signal is screened back. Another alternative is to reduce the sparse elements by diluting the ink used to print it (e.g., diluting the ink to create a 15% ink dot).

While we illustrate several examples with black or dark pixels on a light background, the same approach may be applied in different color inks, including spot colors. Applying the sparse signal with Cyan ink is particularly effective where the signal is captured with a scanner that predominantly captures image signal around a 660 nm wavelength, like most commercial barcode scanners. The sparse elements may be reduced by screening, diluted ink, or other reduction techniques applied in the RIP and/or at the time of applying the sparse element to a substrate.

The above examples also show sparse signals are constructed from continuous or multivalued signal components and binary signal components. One component is a variable data carrier while another is a sync signal. The functions of the components may be reversed. Alternatively, both the data and sync components may be continuous signals that are selectively quantized and combined.

An alternative sparse signal generation process, for example, is a process that begins with sync and data components that are peaks in the frequency domain. The sync peaks are fixed to form a sync template, whereas the data peaks vary in location in frequency coordinates according to data symbols being encoded. These signal components form a continuous spatial domain signal when the combined peak signals are transformed to the spatial domain. This continuous signal is then converted to a sparse signal with a threshold operation using the above-explained approach to generate sparse image signals with both data and sync components. This approach enables the frequency components for sync and data to be selected so as to minimize interference between the two components.

In particular, the frequencies may be chosen to be orthogonal carrier signals, with some for sync, some for data, and some for both sync and data. The carriers may be modulated with variable data, e.g., using frequency shifting, phase shifting, etc.

One benefit of the above techniques is that they are compatible with signal decoders designed for dense watermark signal counterparts to the sparse signal. For details on decoders, including synchronization methods, please see our decoders detailed in U.S. Pat. Nos. 6,614,914, 5,862,260, and 6,345,104, and synchronization methods in 20120078989. Synchronization methods and variable data demodulation operate in a similar fashion as in dense watermark schemes. However, as noted, the extraction filters may be adapted to be optimized for sparse mark extraction.

Binary, multi-valued and continuous watermark signal components may also be generated using various techniques describe in our co-pending application Ser. No. 14/724,729, which describes various watermark signal arrangements, differential modulation strategies, and synchronization approaches. These binary and multi-valued signal components may then be converted to sparse signals using the techniques described in this document. Though the decoding of such sparse signals follows the dense decoding counterparts, we provide an example of the processing flow below.

Figure 13:
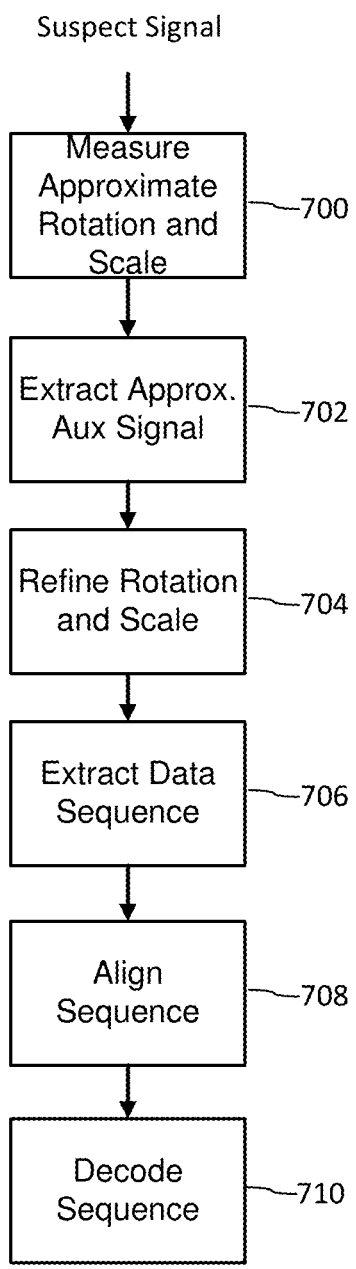
FIG. 13 is a diagram illustrating a method of decoding a watermark signal or sparse signal.

FIG. 13 is a flow diagram illustrating a method of decoding an embedded watermark signal and compatible sparse signals. This method was particularly designed for differentiation modulation methods in application Ser. No. 14/724,729 and the following description originates in that document.

In processing module 700, the method starts by approximating initial transform parameters, which in this case, include rotation and scale. This module includes preprocessing operations on the suspect signal to prepare it for detection. These operations include transforming the signal into the domain in which the data signal is encoded and filtering the signal to reduce interference with the host and other noise. For example, if the data channel is encoded in a particular color channel or channels at a particular resolution and frequency range, module 700 transforms the signal into the channel. This may include one or more filtering stages to remove noise and host signal content outside the channel of the sparse signal being detected.

Figure 14:
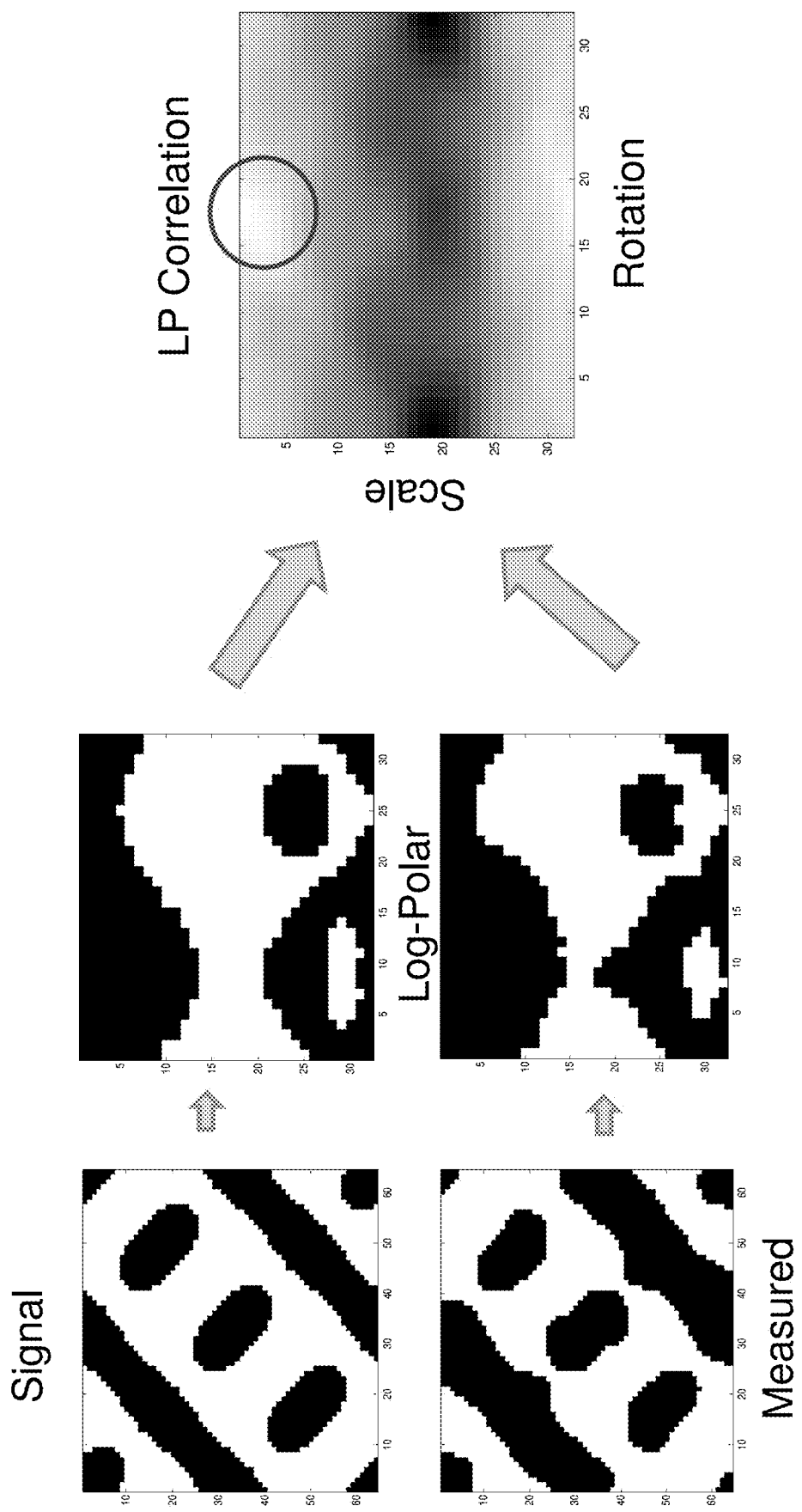
FIG. 14 illustrates one class of pattern detection methods in which a template (labeled "signal") and the filtered spectrum of a suspect signal (labeled "measured") are transformed into a log polar (LP) coordinate system and correlated with each other to produce a LP correlation.

Module 700 utilizes a pattern recognition method to approximate initial rotation and scale parameters of the encoded signal structure. The encoded signal structure has an arrangement that forms a template in the signal spectrum. There are a variety of pattern matching methods that may be employed to approximate the rotation and scale of this template in the suspect signal. FIG. 14 illustrates one class of such methods in which template (labeled "signal") and the filtered spectrum of the suspect signal (labeled "measured") are transformed into a log polar (LP) coordinate system and correlated. The maximum correlation peak in the correlation within the LP coordinate system is located. The location of this peak corresponds to the approximate rotation and scale of the template.

In one embodiment for image signaling, module 700 employs the following:

1. Bilateral and Gaussian filters to remove image content while preserving the encoded data signal;
2. Grayscale conversion, mean subtraction, and 2D FFT to estimate spatial frequencies;
3. Magnitude and Log-polar transform to equate 2D shift with rotation and scale; and
4. Clip magnitudes and Gaussian filter to remove processing artifacts and noise.

Returning to FIG. 13, signal extraction module 702 extracts an approximation of the auxiliary data signal using the initial rotation and scale estimate to compensate for rotation and scale. Module 702 includes sampling operators (e.g., interpolators) to sample embedding locations within the suspect signal, as corrected by the initial rotation and scale. Module 702 also includes an extraction filter that exploits the relationships used to encode signal elements as described previously to reconstruct an estimate of the data signal.

Module 704 accesses the reconstructed data signal and determines refined rotation and scale parameters that align it with the template. Module 704 computes the spectrum from the reconstructed estimate of the data signal. From this spectrum, the module 702 obtains a more precise estimate of rotation and scale. In particular, the location of the spectral peaks in the reconstructed data signal are used to determine the rotation and scale by determining the geometric transform that aligns them with the template. A variety of pattern matching techniques may be used for this process, including the log polar method above, and/or least squares approach of 20120078989, referenced earlier.

Additional refinement modules may be included to determine an estimate of translation of a tile in a suspect signal, as described in 20120078989 and U.S. Pat. No. 6,614,914, prior to extracting data. Translation provides the coordinates of the embedding locations within a tile of the suspect signal (e.g., start of tile and location of bit cells relative to start of tile). Oversampling may also be used to recover translation.

Data extraction module 706 now extracts a data sequence from embedding locations within a tile, which are sampled based on the refined geometric transformation parameters (refined rotation, scale, and translation). The data sequence extraction applies an extraction filter, again exploiting encoding relationships where appropriate, but this time with more precise determination of sparse embedding locations.

For payload extraction, the decoder employs a filter adapted to extract an estimate of a data element from a relationship between a sparse data element and other signal content. The filter increases the signal to noise ratio of the data signal relative to noise by leveraging the differential relationship among the signals encoding each data element. This filter may be employed both in the synchronization process as well as the data extraction process. The shape of the filter corresponds to the area from which it samples signal values and the positional relationship of the embedding locations that it evaluates to leverage relationships.

In some embodiments, the sparse signal decoder applies an extraction filter called, octaxis, to extract estimates of the sparse signal while suppressing interference. For more on such filters, see our U.S. Pat. Nos. 7,076,082 and 8,687,839, which are hereby incorporated by reference in their entirety. Oct axis compares a bit cell with eight neighbors to provide a compare value (e.g., +1 for positive difference, −1 or negative difference), and sums the compare values. Different arrangements of neighbors and weights may be applied to shape the filter according to different functions. Another is a cross shaped filter, in which a sample interest is compared with an average of horizontal neighbors and vertical neighbors, as descried in U.S. Pat. No. 6,614,914, previously incorporated herein.

The output of the extraction filter provides an estimate for each sparse element. The estimates are aggregated by demodulating the carrier signal. The demodulated payload is input to the error correction decoder process. For convolutional coded signals, this is a Viterbi decoder. The result is the variable data payload, including error check bits, used to validate the variable data field of the payload.

The above description provides a variety of techniques from which many different signaling strategies may be developed. Below, we further describe how to derive sparse signals of various types, building on the above framework.

Differential Modulation and Sparseness

When differential modulation is used in conjunction with a sync signal component, the above approaches used for generating sparse marks from sync and message components also apply.

When differential modulation of the variable data component is used by itself to provide self-sync capabilities, then there is no explicit sync component. All of the pixels carry the message signal. These pixels may be formed so as to have a binary value (−1 or +1), or multiple values (e.g., approximating a continuous signal).

In the case of binary valued pixels, a continuous sync component may be introduced to provide a means to distribute the data values within a tile.

In the case of multi valued pixels, a quantization (including threshold operation) may be used to generate a sparse signal from dense differential modulated input signal.

Orthogonal differential modulation (see, e.g., co-pending application Ser. No. 14/724,729) provides a way to generate sparseness, since the message signal values can take on many values (not just −1 or +1). Here, the thresholding approach can be used to generate sparseness.

Sparseness without Explicit Sync Component

In some embodiments, the variable data signal may have no explicit sync component and have binary valued pixels. It may be made sparse by a variety of methods, such as:

Randomly white out (or alternatively, black out) different parts of the message;
   Use a noise distribution to play a similar role as the sync signal distribution:
      Additional information could be conveyed through this noise distribution;
      The noise distribution could be different for different blocks in the image (providing some randomness to the sparse pattern);
      Which noise distribution a particular block came from can be deciphered by computing the conditional probability after detection;
   Use knowledge of the protocol (version, error correction code, error detection code, repetition code and spreading or modulating with carrier) to determine where to place the sparse signaling components (i.e., the ink spots on a lighter background) to obtain optimal SNR for a given sparseness;
   Perturb the message signal values at arbitrary locations and use an objective function (e.g., message correlation) to determine which perturbations to keep and which to discard.

General Points about Sparse Signals

Recapping, we now provide additional observations and design variations. The distribution of the multi-valued signal component in the spatial domain provides a control parameter (e.g., threshold) to adjust sparseness. This signal component plays a dominant role in determining sparseness, with amount of sparseness controlled by the threshold. The strength of this signal provides an additional parameter to control sparseness.

Sparse signals can be encoded by using multi-bit values. These could be printed using multiple inks (rather than just ink or no ink in the usual case). This can be achieved using multiple thresholds or quantization levels in the histograms (e.g., histograms of FIG. 10.

For a sparse marks in a tiled configuration, the encoder can also vary the pattern of sparse elements in different tiles by choosing a slightly different threshold per tile (or introducing some randomization into pixel location optimization techniques, e.g., FIG. 5).

The sparse mark may be encoded in one or more ink layers. The ink layer may be a spot color already in the design file, or an ink that is added, but selected to best match inks specified in the design. See, e.g., color match optimization in Ser. No. 14/616,686. In other implementations, the sparse mark disclosed in this patent document can be used as the "watermark tile" in FIG. 7 of the Ser. No. 14/616,686 application. The sparse mark may also be formed as a weighted combination of process colors, e.g., CMYK.

Sparse elements may be applied by modulating the optical property of an object at the sparse element locations according to the sparse signal element value. Above, we often noted darker or lighter modulation relative to the background, and there are many ways to make such modulation. Examples include adding or removing ink or coating, or engraving or etching the substrate surface. The shape, thickness or translucency of material at a sparse element location may be modified to apply the sparse element.

Laser marking, including laser engraving, in particular is an effective way to apply a sparse mark to a wide range of object types and materials. Such marking applies to many different industries, including mobile phone parts (e.g., keypad), plastic translucent parts, electronic components, integrated circuits (IC), electrical appliances, communication products, sanitary ware, tools, accessories, knives, eyeglasses and clocks, jewelry, auto parts, luggage buckle, cooking utensils, stainless steel products and other industries. It applies to a variety of substrate types including metals (including rare metals), engineering plastics, electroplating materials, coating materials, coating materials, plastics, rubber, epoxy resin, ceramic, plastic, ABS, PVC, PES, steel, titanium, copper and other materials.

Laser marking may be applied via handheld devices such as the handheld laser marking machine model BML-FH from Bodor. This is particularly useful in marking various types of objects with identifying information, which can then be read by handheld scanners, e.g., to extract a GTIN in a retail setting.

Sparse marks may be merged with display images via compositing in a display buffer of a display driver. They may be implemented as a graphic overlay and may be combined with other bitmapped images via bit blit (bit-boundary block transfer) operations, which are operations for combining bitmaps using a raster operator.

Sparse marks may be generated, inserted or transformed in a halftone conversion operation. Above, we illustrated an example of applying a line screen to sparse elements. Sparse elements may be generated in the halftone conversion, or may be converted into various dot structure arrangements within the halftone conversion process. Halftone conversion may be used to generate a sparse element as a cluster or pattern of dots. This conversion process may transform a sparse dot into halftone dots in a combination of colors, screen angles and dot patterns. The halftone conversion may also be adapted to insert sparse mark elements in areas of an image that are compatible with such insertion (e.g., uniform or solid tone areas, light backgrounds, dark backgrounds, areas around text fonts, etc.).

Though these operations may reduce the sparse element, as in the example of FIGS. 11-12, they are done in a manner in which signal is retained and captured using an image scanner compatible with the waxel resolution. In our examples, the sparse element is applied at a higher resolution of image rendering (e.g., 300 DPI or higher) than the waxel resolution (e.g., 75 DPI), yet the decoder can extract the sparse signal from lower resolution images because the sparse element, though blurred at lower resolution reading, is still recoverable because the basic encoding relationship of sparse element relative to background is intact.

Sparse marking is compatible with many printing technologies. While not practical to list them all, we list the following: flexography, gravure, offset (including dry offset), digital, ink jet, dye sublimation, thermal (including direct thermal and thermal transfer), laser, 3D printing, Intaglio and relief printing, embossing, photolithographic, lithographic, laser marking, including laser engraving, and laser etching.

Sparse marks are particularly effective for use in connection with label and receipt printers used in retail. These printers typically use thermal printing to print text on white labels or paper stock for receipts. Sparse marks may be integrated with text and printed with thermal printers on this type of print substrate. This allows variable information about fresh foods and deli items, such as the product SKU and weight to be encoded into the sparse mark or linked to an identifier encoded in the sparse mark and then printed with the thermal printer on an adhesive label or receipt for the item. This identifier may be dynamically linked to the variable information captured for the item so that the POS scanner can look up the item identifier and its variable information to assign a price at retail check out.

Mixing of the sparse signal with under and over printed layers is possible, and sparse signal insertion among other colors or inks is controlled by a blend model. Blend models may be used to achieve a desired output color for the sparse element, taking into account other inks in the package design. Please see our co-pending application Ser. No. 14/616,686 for more detail on blend models and use of them for watermark signal encoding. These techniques may be used for achieving desired color matching (e.g., limiting color match error) or color modification to encode sparse signal elements among other layers or channels in a design (e.g., to ensure the modification introduced by the sparse element is visible to a scanner relative to surrounding background near the sparse element).

Our sparse signal encoding may also take advantage of various spectral encoding and reading technologies, such as the ones detailed in our US Application Publication 2015-0071485, INFORMATION CODING AND DECODING IN SPECTRAL DIFFERENCES, which is hereby incorporated by reference in its entirety. Sparse signals may be encoded in spectral differences between the material used to print sparse elements or holes relative to the material of the background.

Sparse elements may also be more effectively encoded and decoded when used in conjunction with multi-spectral imagers, such as those described in our PCT application, PCT/US14/66689, published as WO2015077493, entitled SENSOR-SYNCHRONIZED SPECTRALLY-STRUCTURED-LIGHT IMAGING, and coordinated illumination as described in Us Application Publication 2013-0329006, and our application Ser. No. 14/616,686, which are all hereby incorporated by reference in their entirety. The latter documents describe imaging devices that employ pulsed light sources and/or spectral filtering to enable capture of different spectral bands. The sparse mark may be encoded in spectral bands that these devices are well adapted to detect, and further processing may also be used to process images in the different bands to amplify the sparse signal (e.g., amplify the difference between sparse elements and its neighboring background). Sparse marks may also leverage encoding of sparse signals in plural chrominance directions, as detailed in our application publication 2010-0150434, which is hereby incorporated by reference in its entirety.

Sparse marks may also be applied using materials to apply the marks to objects that enhance their detection. Sparse marks may be applied in a coating or ink layer in which additives, such as pigments are dyes are added to enhance the detectability of sparse elements relative to background. Such additives may be inserted in the layer used to apply sparse elements, the background or both. To illustrate, we describe an embodiment optimized for the spectral response of typical barcode scanning equipment, which is designed to detect barcodes at or in a spectral range around a wavelength of 660 nm. This type of scanner has difficulty detecting signal encoded in colors of low absorption at 660 nm, such as light substrates, as well as objects in white, red or yellow. In addition, it was has difficulty in artwork with no reflectance at 660 nm, such as blues, greens and blacks.

The solution is to find additives that do not add objectionable visual differences, yet either absorb at or around the narrow band of the scanner, or reflect so that the scanner sees light in dark backgrounds (e.g., to mark sparse holes in a dark background). Preferably the additives used for low absorption objects appear clear (e.g., do not dirty the light colors) yet have absorption in the narrow band of the scanner.

For this case, a narrow band absorption dye is added to the marking material which matches the central wavelength and width of the narrow band illumination of a scanner in the visible region. Typically, the narrow band illumination is created by LED illumination (e.g., red illumination) for barcode scanners. FIG. 15 is a diagram illustrating absorption characteristics of an additive (e.g., a dye) around the narrow band of the scanner.

In the other case of artwork with low reflectivity, some spot inks like process blue or saturated colors have low reflectivity at the narrow band of the scanner. In this situation, an additive can be inserted in the sparse signal marking layer or layers to produce more light under the illumination of the scanner light source. In particular, a different dye is added which absorbs at 660 nm, the illumination of the scanner, and then fluoresces at a higher wavelength as shown in FIG. 15.

Regions with dye appear lighter when printed on top of a low reflectivity region. This is well suited for applying sparse holes against a darker background. With imaging barcode devices available today, this approach works by providing an additive that has a fluorescence wavelength <900 nm.

Inks, coatings and additives with these properties may be obtained from suppliers like Gans Ink and Supply Co.

Further details on the above-described arrangements are provided in application 62/263,369, filed Dec. 4, 2015, the disclosure of which is incorporated herein by reference.

Further Disclosure

Figure 16A:
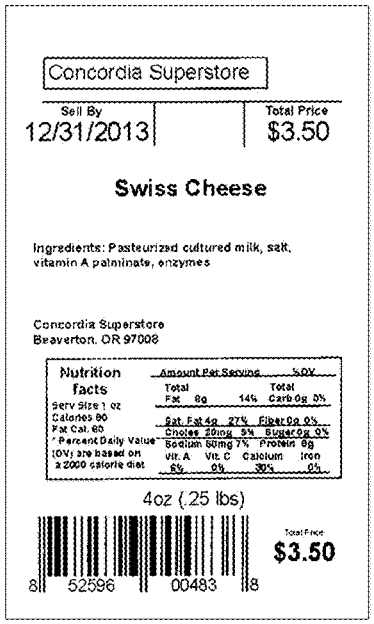
FIG. 16A shows a printed label.
Figure 16B:
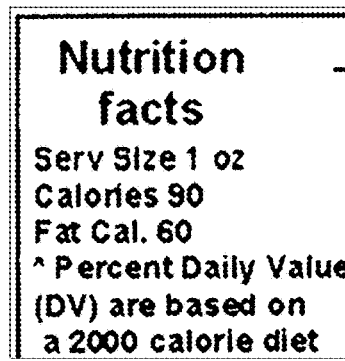
FIGS. 16B and 16C show magnified excerpts from FIG. 16A.
Figure 16C:

FIG. 16A shows a label as may be adhesively applied to deli food items, such as paper-wrapped packages of cheese or meat, or plastic tubs containing other foodstuffs. Such labels are typically printed in-store, by a thermal label printer, onto thermally-sensitive label media. An exemplary printer is the Dymo SE450. The SE450 has a horizontal linear array of elements, spaced 203 to the inch, that are selectively heated to discolor corresponding dots on a proximate label medium, as the medium is advanced in a vertical direction. FIG. 16B shows a magnified excerpt of FIG. 16A. FIG. 16C shows a magnified excerpt of FIG. 16B.

Figure 17A:
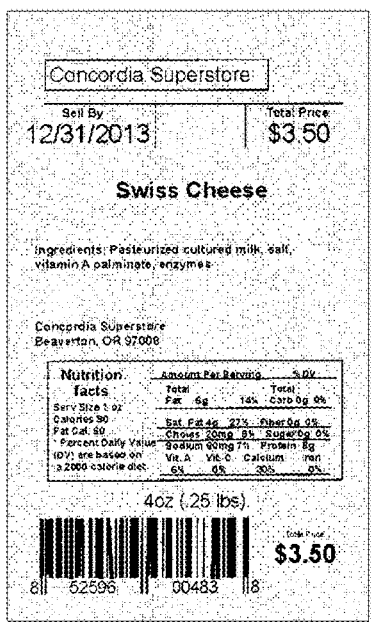
FIG. 17A shows a machine-encoded label.

Artwork printed onto label of FIG. 16A can be modified to include a sparse mark of the sort described above, redundantly encoding a plural-bit message. Such a sparsely-marked label is shown in FIG. 17A. However, as shown in enlarged FIGS. 17B and 17C, legibility of the label is impaired by the markings. (Such markings can also interfere with machine-decoding of the barcode shown at the lower left of FIG. 17A.)

In accordance with a further aspect of the present technology, a guard band is defined that surrounds text characters (and barcodes) included in the label artwork. In a simple embodiment, the sparse mark is added to the artwork only at regions outside the guard band.

Figure 18A:
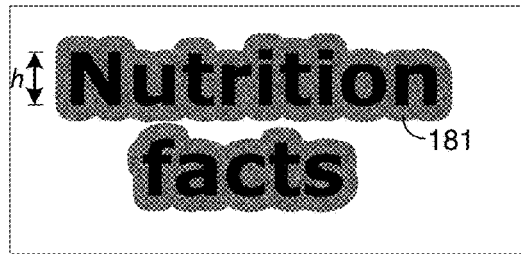
FIG. 18A shows a guard band region defined around printed text.

In one particular embodiment, a dilation process is applied to a pixel representation of the text (and barcode) artwork, such as using conventional image processing software (e.g., GIMP or Adobe Photoshop). FIG. 18A is illustrative. A region-growing process is applied, starting from each pixel of each text character. This process essentially swells each glyph of the text (and barcode)—extending a guard band (safe area) 181 around the pixels that comprise such elements of the original label file. No data marking is added within this enlarged guard band.

The width of the guard band depends on the application, and the desired aesthetics. The larger the guard band (up to a point), the easier the label text is to read. In some embodiments, the text can be swollen by just a single pixel in all directions. In other embodiments, the text can be enlarged by 3, 5, or more pixels.

In some implementations, the size of the guard band will be related to the line height (h in FIG. 18A). The guard band may be less than such height (or less than half such height), although larger guard bands are sometimes used.

Regardless of the width of the guard band, any encircled regions within the text character glyphs (e.g., inside encircled parts of the "o" and "a" of FIG. 18A) are desirably included within the guard band.

It will be noted that the boundary of the guard band in FIG. 18A is non-linear; the boundary echoes contours of the letters. While the boundary has a straight portion to the left of the "N," the boundary is non-linear along most of its extent. (In less-favored embodiments, a rectangular guard band may be used to surround an entire block of characters.)

Figure 18B:
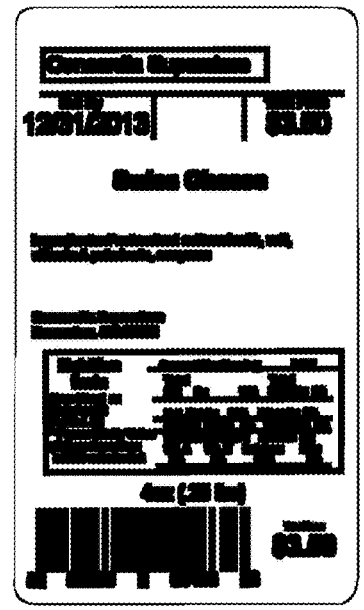
FIG. 18B shows guard band areas associated with the full label of FIG. 16A.

FIG. 18B shows guard band regions for the full label of FIG. 16A.

Figure 17B:
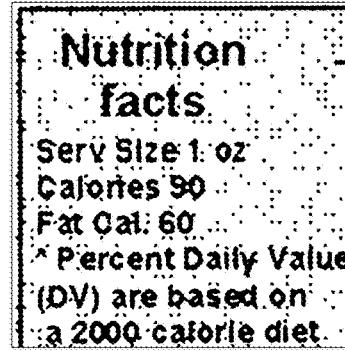
FIGS. 17B and 17C show magnified excerpts from FIG. 17A.
Figure 17C:
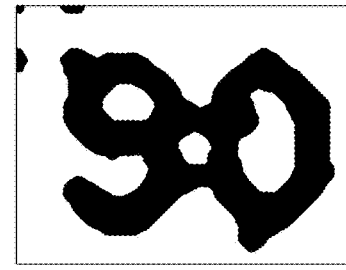
Figure 19A:
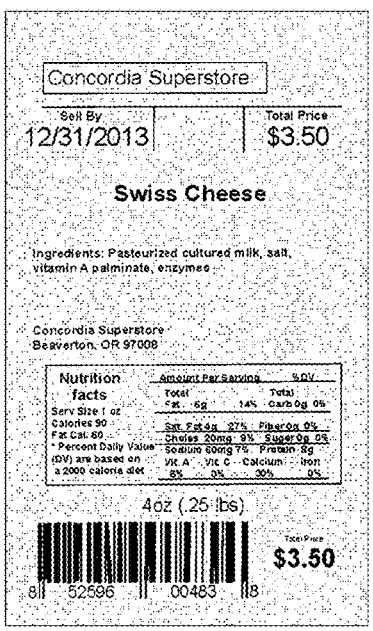
FIG. 19A shows a printed label in which machine encoding is not applied within guard band regions surrounding text.
Figure 19B:
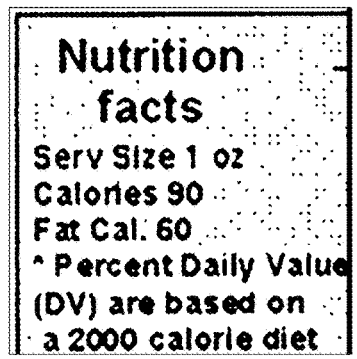
FIGS. 19B and 19C show magnified excerpts from FIG. 19A.
Figure 19C:

FIGS. 19A, 19B and 19C correspond to FIGS. 17A, 17B and 17C, but with the FIG. 18B guard band regions protected from marking as just-described.

Figure 20A:
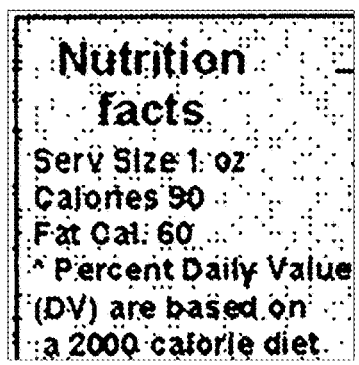
FIGS. 20A and 20B reproduce FIGS. 17B and 19B, side by side.
Figure 20B:
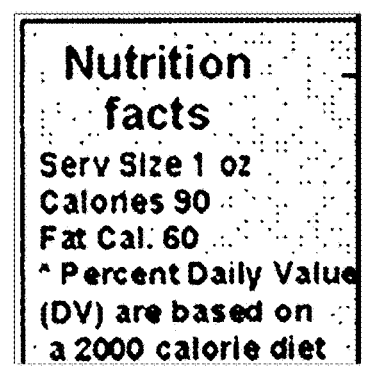

FIGS. 20A and 20B present FIGS. 17B and 19B side by side, enabling comparison of their respective legibilities.

In other embodiments, the marking is not simply applied outside the boundary, and absent within it. Rather, the marking is modulated in intensity (density). Near the text characters, the marking is more subtle. As the distance from the text characters increases, denser marking is applied.

Figure 21:
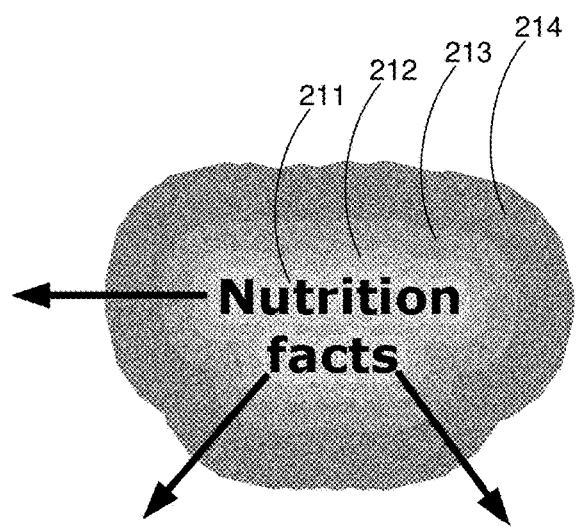
FIG. 21 shows that successively larger regions may surround printed text, enabling machine marking to be applied at different levels of intensity.

This is conceptually illustrated in FIG. 21. In a guard band region 211, no marking is applied. In region 212 (which encloses, or surrounds, the guard band region), a subtle form of marking is applied (which may be called Strength1). In region 213, (which encloses region 212) a slightly stronger marking is applied (which may be called Strength2). In region 214 (which encloses region 213), a somewhat stronger marking is applied (which may be called Strength3). Beyond region 214, the strongest marking is applied (which may be called Strength4). The strength of the marking thus increases along various gradients (shown by the dark arrows in FIG. 21).

Markings of different strengths can be achieved in various ways (some of which were discussed earlier).

Figure 22:
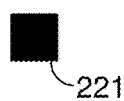
FIG. 22 shows a marking element.

One way is to vary spatial density of the markings. FIG. 22 shows a dark element 221 that can be included at each location in the label artwork where a sparse mark is to be present. With such an element (which may be a single print dot, or pixel, in the thermal printer example—or a square array of several such dark pixels, e.g., 2×2 or 3×3), markings of different strengths can be achieved by including elements 221 distributed at different spatial densities.

Figure 23:
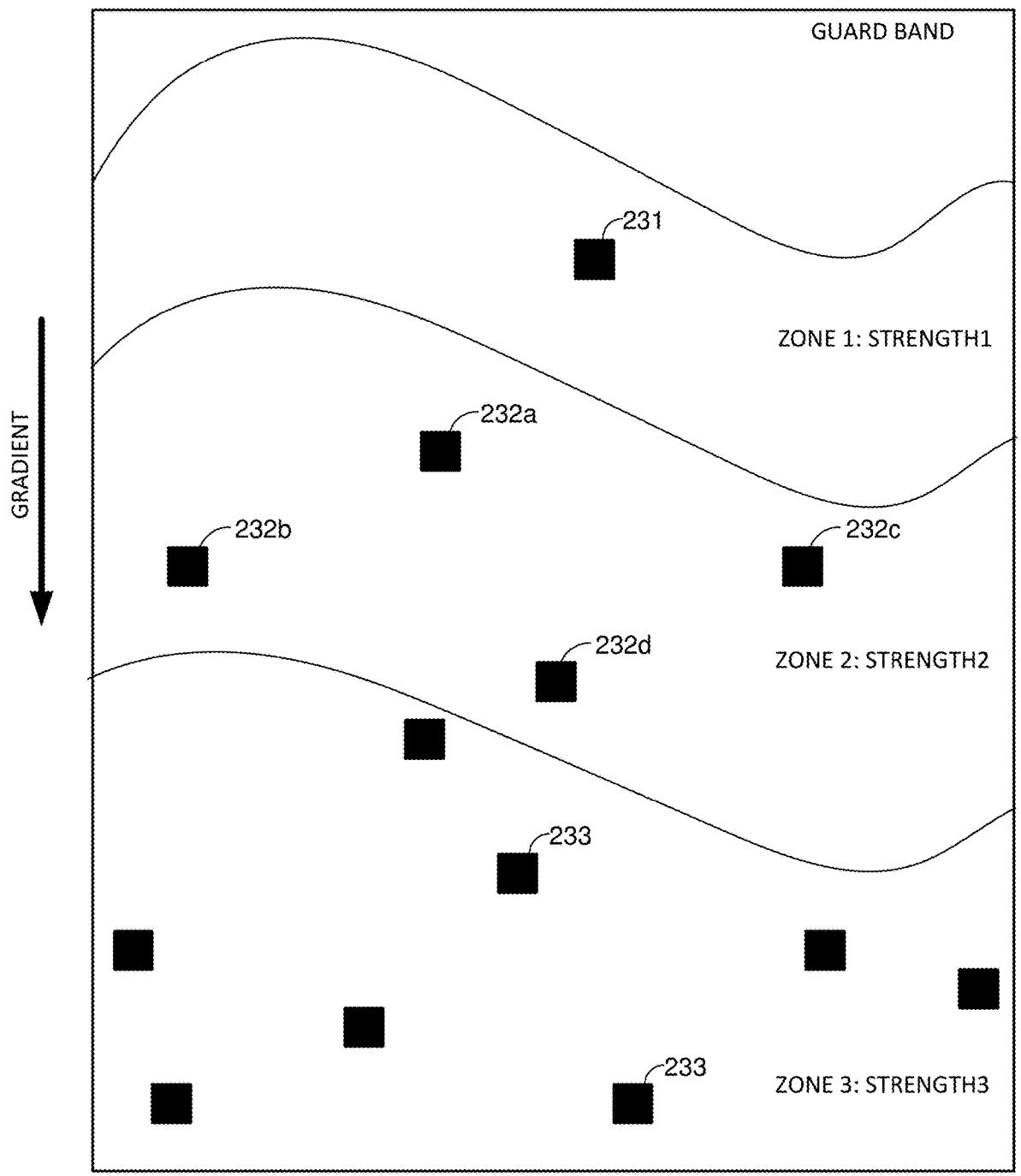
FIG. 23 shows an excerpt of label artwork, including different zones with machine encoding at different strengths.

FIG. 23 shows an excerpt of label artwork. At the top is a guard band adjacent some printed text (not shown). In this guard band, no marking element is included. Beneath, in "Zone 1," is an area in which a marking (i.e., sparse watermark) signal is represented at Strength1, e.g., a density of about 1%. That is, about 1% of the area is darkened by elements 221. Beneath that, in "Zone 2," is an area in which the watermark signal is included at Strength2, e.g., a density of about 2.5% (i.e., about 2.5% of the area is darkened by elements 221). Beneath that is "Zone 3," which is marked at Strength3, e.g., a density of about 4%.

Thus, one way of achieving markings of different strengths is by employing uniform marks, distributed spatially across the label at differing local densities.

The marks are placed within the artwork according to the locations of sparse marks resulting from the earlier-described procedure (e.g., in connection with FIGS. 4, 5, etc.). The differing densities are achieved by different thresholds T applied to the sync signal, as shown in FIG. 10.

Half of the sync signal elements that are selected by the threshold T will not result in printed dark marks, due to the ANDing with the binary data signal (elements of which are 50%-50% split between its two values). Thus, to achieve a marking with a 1% print density, the threshold T must select the 2% of the sync signal elements having the lowest values. (Likewise, to achieve a marking with 2.5% and 4% print densities, the threshold T must be set to select 5% and 8% of the sync signal elements having the lowest values, respectively.)

As noted, the sync signal is typically a 128×128 element tile, and thus comprises 16,384 elements—each having a value of between 0 and 255. An exemplary sync signal is the sum of dozens of sine functions, causing most of the sync element values to be tightly clustered between about 90 and 160.

If the statistics of the sync function are understood (as is usually the case), the numeric thresholds beneath which, e.g., 2% of its elements are valued, can be determined mathematically. But these thresholds can also be determined heuristically, by stepping a threshold through the range of 0-255 and noting the cumulative percentage of sync signal samples having values equal or lower than each such threshold. Such data collected for an exemplary 128×128 element sync signal tile is shown in FIG. 24A.

By reference to FIG. 24A, it can be seen that setting a threshold value of 102 serves to identify 1.8% of the elements in the sync signal tile (all of which have values of 102 or less). When these identified elements are set to black (as at 406a in FIG. 10) and ANDed with corresponding elements of the 128×128 data signal tile (as at 408 in FIG. 4), 0.9% of the 16,384 elements in the composite watermark block are thereby selected for darkening. The thus-identified sparse marking elements are used for printing in Zone 1 of FIG. 23.

Similarly, by setting the sync signal threshold value to 107, 4.6% of the elements in the sync signal are selected. This results in darkening of 2.3% of the elements in the composite watermark block—suitable for printing in Zone 2 of FIG. 23.

Likewise, by setting the sync signal threshold value to 110, 7.5% of the sync signal elements are identified, yielding a print density of 3.75% —suitable for printing in Zone 3 of FIG. 23.

In most embodiments, the sparse 128×128 composite watermark block is spatially mapped to the label by tiling, starting in the upper left corner of the label. Each location on the label corresponds to an element of the sparse block. (Some elements of the sparse block correspond to plural locations on the label, due to tiling.)

The sync signal is typically fixed, for all labels. Accordingly, statistics of the sync signal—once understood—can be re-used in connection with generating sparse marks for different label artworks. In some embodiments, a data structure like the table in FIG. 24A is stored in software used to generate sparse marks—and serves to identify threshold values T needed to achieve different print densities.

In FIG. 23 (as in FIG. 4), the elements that express the marking are all identical. The watermark signal is expressed in a bitonal form: it is there, or it isn't.

Such a representation cannot express any variation in values of the component elements. Sometimes it is useful to express variations in the sync signal in the sparse marking. One such arrangement employs dithered marking blocks, e.g., employing 2×2 or 3×3 blocks of elements.

Figure 25A:
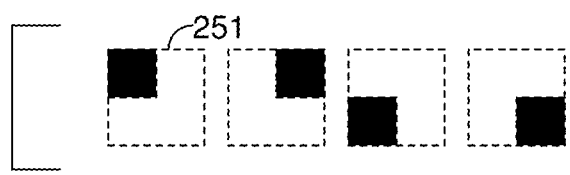
FIGS. 25A, 25B, 25C and 25D show 2×2 marking blocks.
Figure 25B:
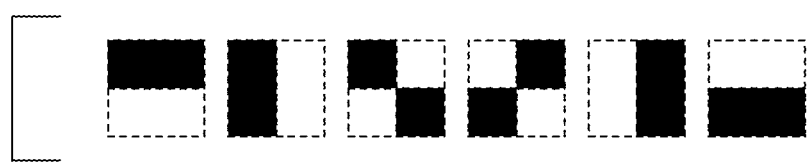
Figure 25C:
Figure 25D:

FIG. 25A shows four 2×2 blocks—each of which comprises one dark cell and three light cells. FIG. 25B shows six more such blocks—each of which comprises two dark cells. FIG. 25C shows four blocks comprising three dark cells (i.e., the inverse of FIG. 25A). FIG. 25D shows a block comprised of all dark cells. (The dashed lines serve simply to visually group blocks together; they do not form any part of the printed marking.)

Figure 26A:
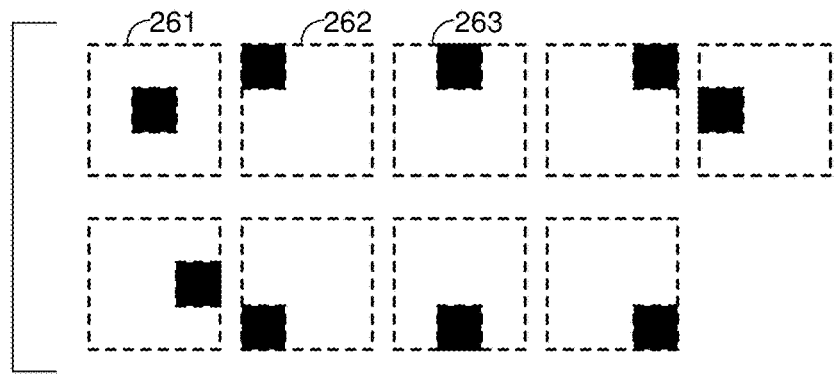
FIGS. 26A, 26B, 26C, 26D, 26E, 26F, 26G, 26H, and 26I show exemplary 3×3 marking blocks.
Figure 26B:
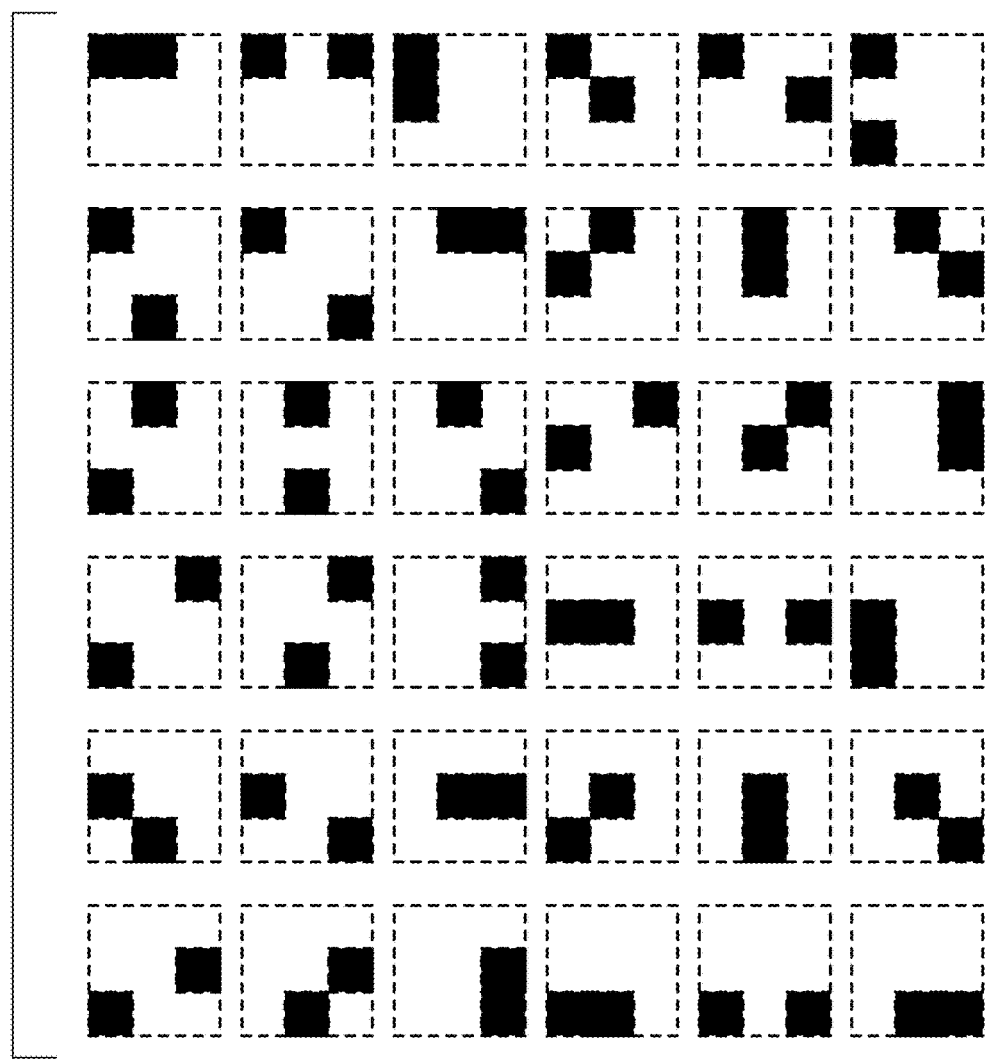

FIGS. 26A-26I show some of the blocks possible with 3×3 arrays of elements. FIG. 26A shows the nine different blocks in which a single element is darkened. FIG. 26B shows the 36 different blocks in which two elements are darkened.

Figure 26C:
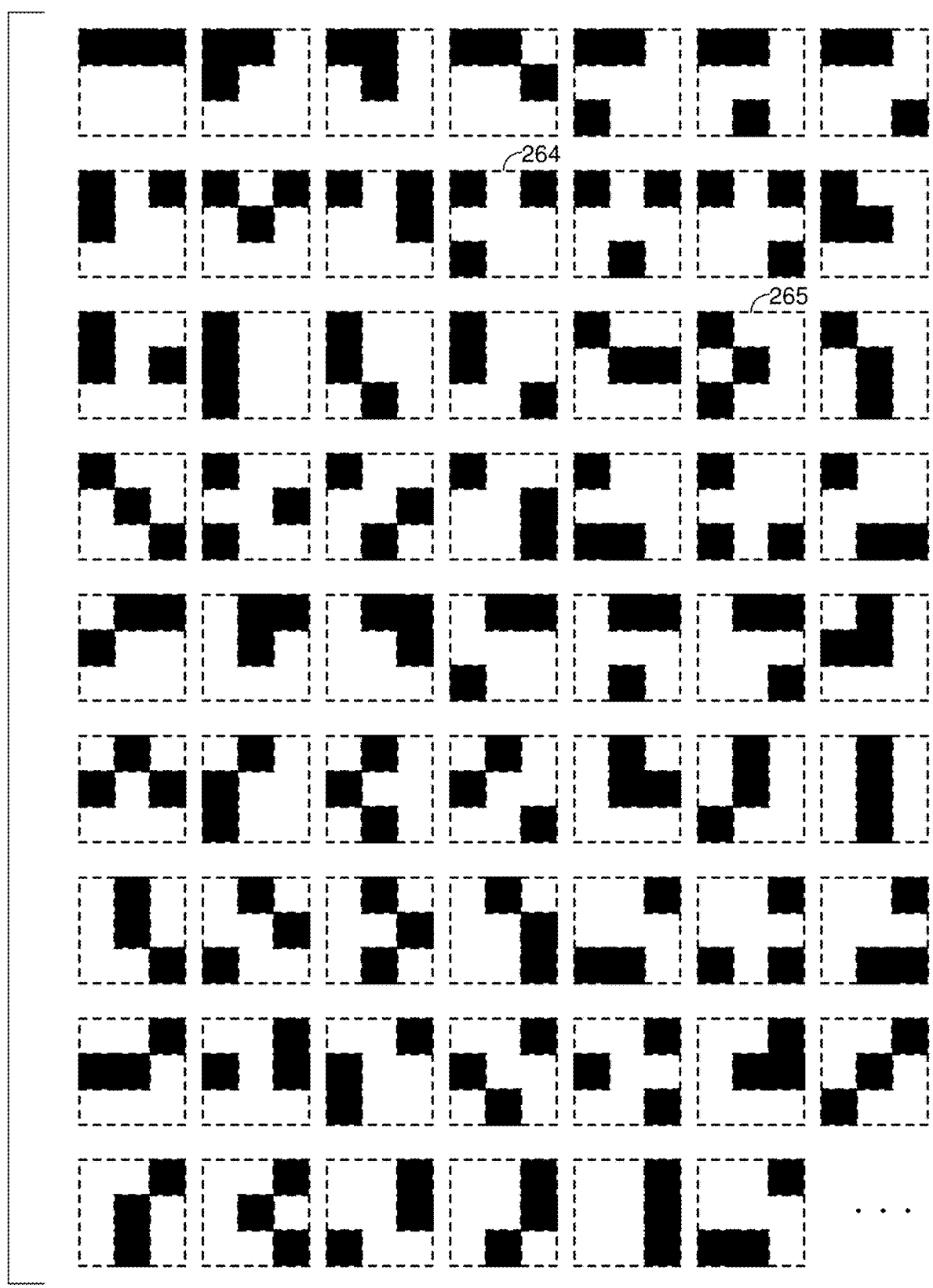
Figure 26D:
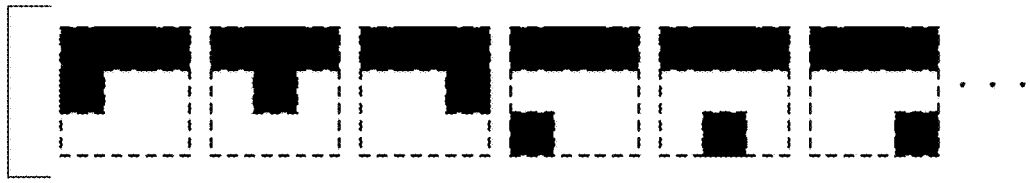
Figure 26E:
Figure 26F:
Figure 26G:
Figure 26H:
Figure 26I:

FIG. 26C shows a few of the many different 3×3 blocks in which three elements are darkened. Likewise, FIGS. 26D, 26E, 26F, 26G and 26H show exemplary blocks in which four, five, six, seven and eight elements, respectively are darkened. FIG. 26I shows the single 3×3 block in which all nine elements are darkened.

(It will be recognized that many of the possible blocks are simply rotational variants—or mirror images across horizontal, vertical or diagonal axes—of each other. For example, considering FIG. 26A, it will be recognized that the first three blocks, 261, 262 and 263, are unique, but the following six blocks are just rotational variants of blocks 262 and 263.)

The use of dithered marking blocks enables the printed label to represent some of the variation in values among different elements of the watermark signal. In the particular example illustrated, the data signal is bi-level, but the sync signal is continuous. Representing the sync signal with degrees of gradation—corresponding to variation among values of its components elements—can sometimes improve decodability of the resulting marking.

In the arrangement just-described, the sync signal elements corresponding to dark label markings typically have values ranging from about 100 to about 110. But in other embodiments, much greater variability is present. FIG. 24B shows a table like that of FIG. 24A, but corresponding to a sync signal composed of four sine waves. In such an embodiment, the sync signal elements corresponding to dark markings typically have values ranging from about 28 to 64—more than a 2:1 variation. Different markings can be used at different parts of the composite watermark signal to express some of this variation.

Figure 27:
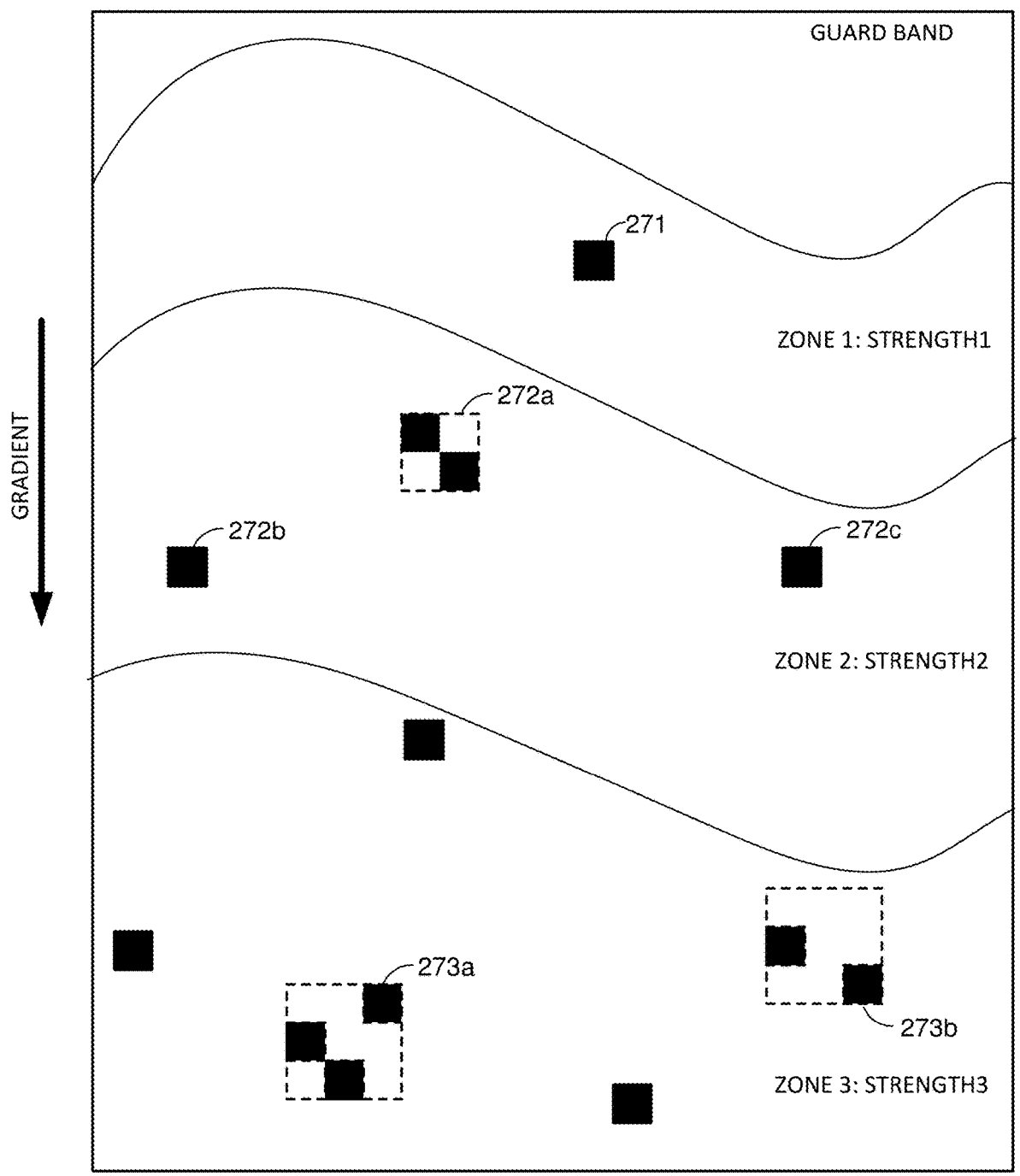
FIG. 27 shows an excerpt of label artwork, including different zones with machine encoding at different strengths.

FIG. 27 shows a label excerpt like that depicted in FIG. 23, but using dithered representations for some of the sparse signal elements.

In Zone 1 of FIG. 27, a single dark mark 271 is depicted. This may be the same element 221 as in FIG. 23. (It may also be a single darkened element within a 2×2 or 3×3 block, such as block 251 in FIG. 25A or block 261 in FIG. 26A.)

Zone 2 includes markings of different types. Some (272b, 272c) are single elements, as were used in Zone 1. There is also a 2×2 block 272a that has two diagonal cells darkened. (This may be termed a 2/4-weighted marking block, indicating 2 cells darkened out of an array of 4 cells.) This latter marking may be used in a spatial location corresponding to the ANDing of the data signal with a particularly low-valued sync signal (e.g., of value 30), whereas the former markings can be used in locations corresponding to higher-valued sync signals (e.g., of values 58 and 62).

Comparing FIGS. 23 and 27, it will be noted that mark 232d in FIG. 23 has no counterpart in FIG. 27. Because block 272a includes two darkened cells, a darkened cell may be omitted elsewhere in Zone 2 to maintain the 1% print density.

Zone 3 in FIG. 27 includes other markings of different types—here including 3×3 blocks 273a and 273b. (Block 273a may be termed a 3/9-weighted marking block, and block 273b may be termed a 2/9-weighted marking block.) Because block 273a includes three darkened elements, and block 273b includes two darkened elements, a total of three darkened elements may be omitted elsewhere in Zone 3 of FIG. 27, as compared with FIG. 23. Again, dithered blocks of different weight are used to represent watermark elements corresponding to sync signal elements of differing values.

Dithered blocks can employed for reasons other than to represent variations in watermark element values. For example, use of dithered elements can make the markings on a label less conspicuous to human viewers.

Backing up, the camera systems used to discern watermark information from printed labels are commonly also designed to read barcodes. As is familiar, a barcode typically includes an array of thin and thick lines. The thin lines may be only a few thousandths of an inch in width. To discern such lines from a typical reading distance, the camera system must have very high resolution.

Such high resolution imagery is not needed for watermark decoding. Indeed, most watermark decoders expect to receive depictions of watermarks at resolutions less than that produced by barcode-capable camera systems. To achieve such reduced resolution, captured imagery is typically down-sampled before watermark decoding. In one illustrative embodiment, a 2:1 down-sampling is applied. Thus, an original image captured at 1600×1200 resolution is converted to 800×600 resolution. This is done by combining 2×2 neighborhoods of pixels in the original image to yield a single pixel in the down-sampled image (e.g., by averaging). Other systems may employ 3:1 down-sampling, e.g., combining 3×3 neighborhoods of pixels in the original image to yield a single pixel in the down-sampled image.

Thus, the dithered 2×2 blocks of FIG. 25A-D may be down-sampled into a single pixel. Likewise with the 3×3 blocks of FIGS. 26A-I.

The signal value that results from down-sampling a 2×2 or 3×3 neighborhood of elements into a single pixel, does not depend much on the particular distribution of darkened elements within the original neighborhood; only the number of darkened elements generally matters. However, the distribution of elements matters to the human eye.

Figure 28A:
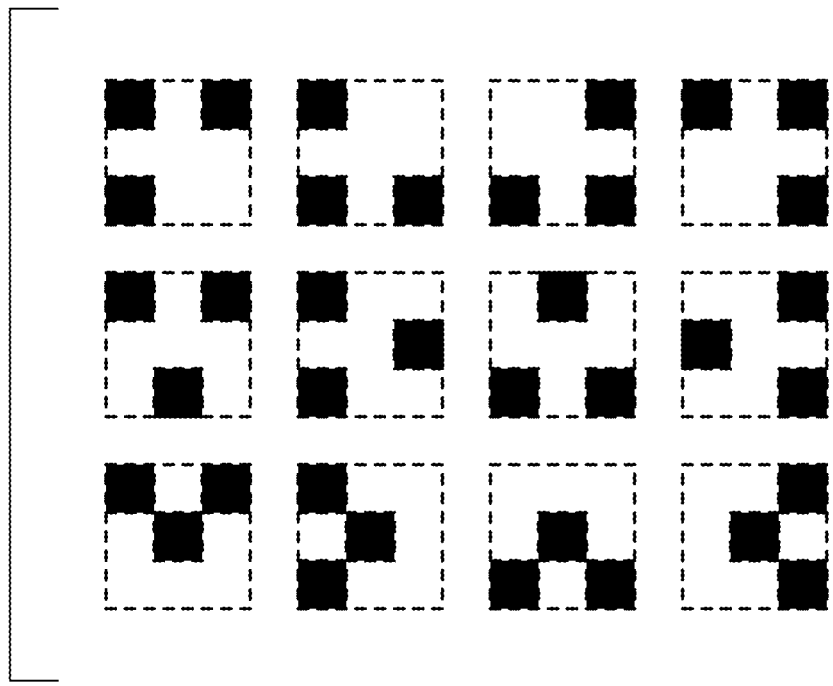
FIG. 28A shows exemplary 3×3 marking blocks in which no darkened cell is edge-adjoining with another darkened cell.
Figure 28B:
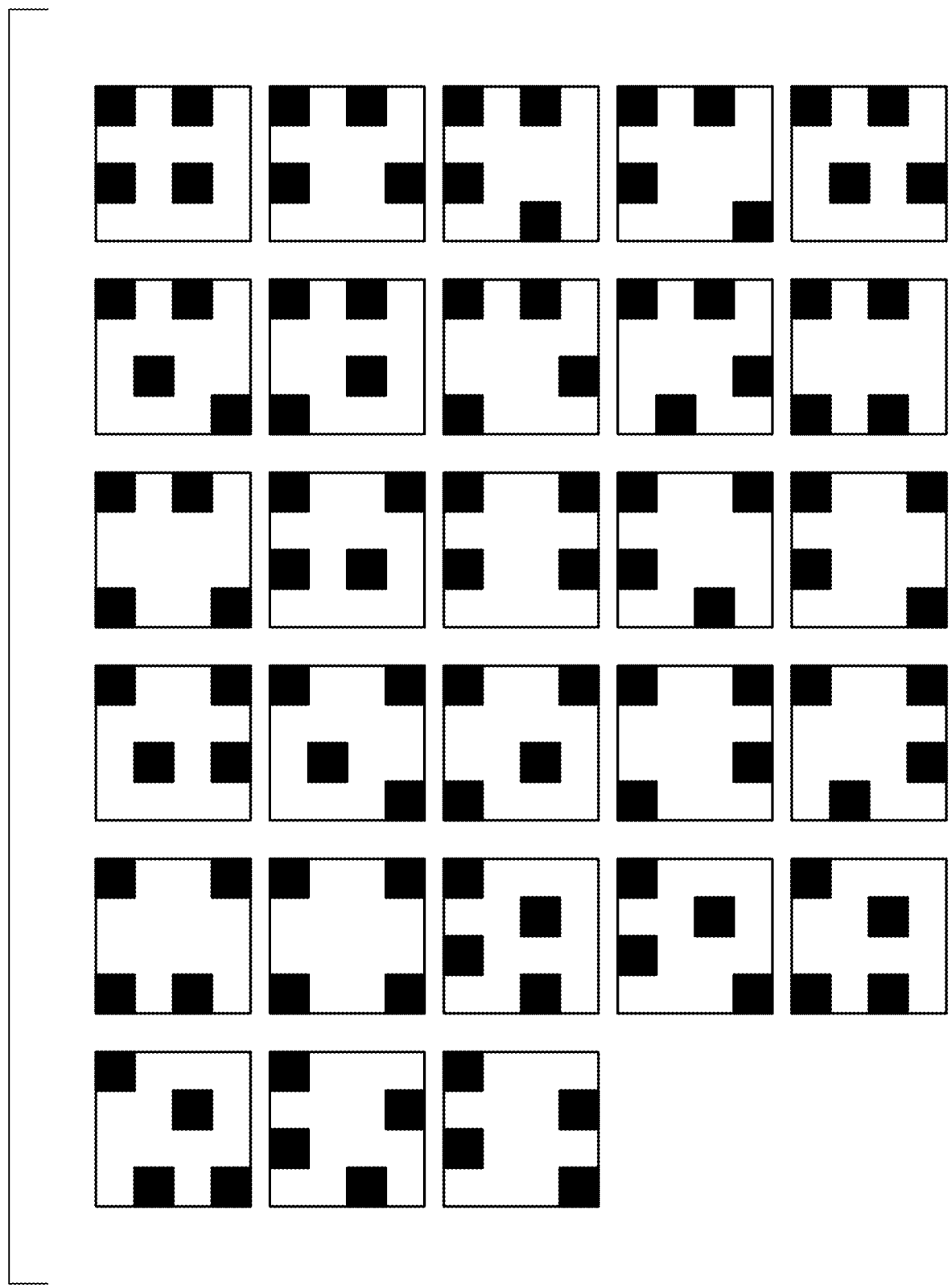
FIG. 28B is like FIG. 28A, but for exemplary 4×4 marking blocks.

FIG. 26C shows 53 different 3×3 blocks in which three cells are darkened (i.e., 3/9-weighted marking blocks). Still more 3/9-weighted marking blocks are not shown. While each effects the same aggregate dithered darkness (i.e., 1/3), applicant has found that blocks in which the darkened cells are not edge-adjoining are less conspicuous to human viewers. Blocks in which darkened cells are separated by white space are best in terms of human aesthetics (e.g., block 264 in FIG. 26C), followed by blocks in which darkened cells adjoin only diagonally (i.e., at their corners, as in block 265 in FIG. 26C). Several such blocks are shown in FIG. 28A and FIG. 28B.

Thus, dithered blocks may be used in label markings simply for better aesthetics—regardless of whether variable information is also thereby represented.

(If two dithered blocks are to be placed next to each other, they are desirably selected so that darkened cells don't adjoin across a block border. For example, the conjunction shown in FIG. 29A between a 3/9-weighted marking block and a 2/9-weighted marking block, is less preferred than the conjunction of the same blocks shown in FIG. 29B, in which the right block has been rotated clockwise 90 degrees.)

Figure 30:
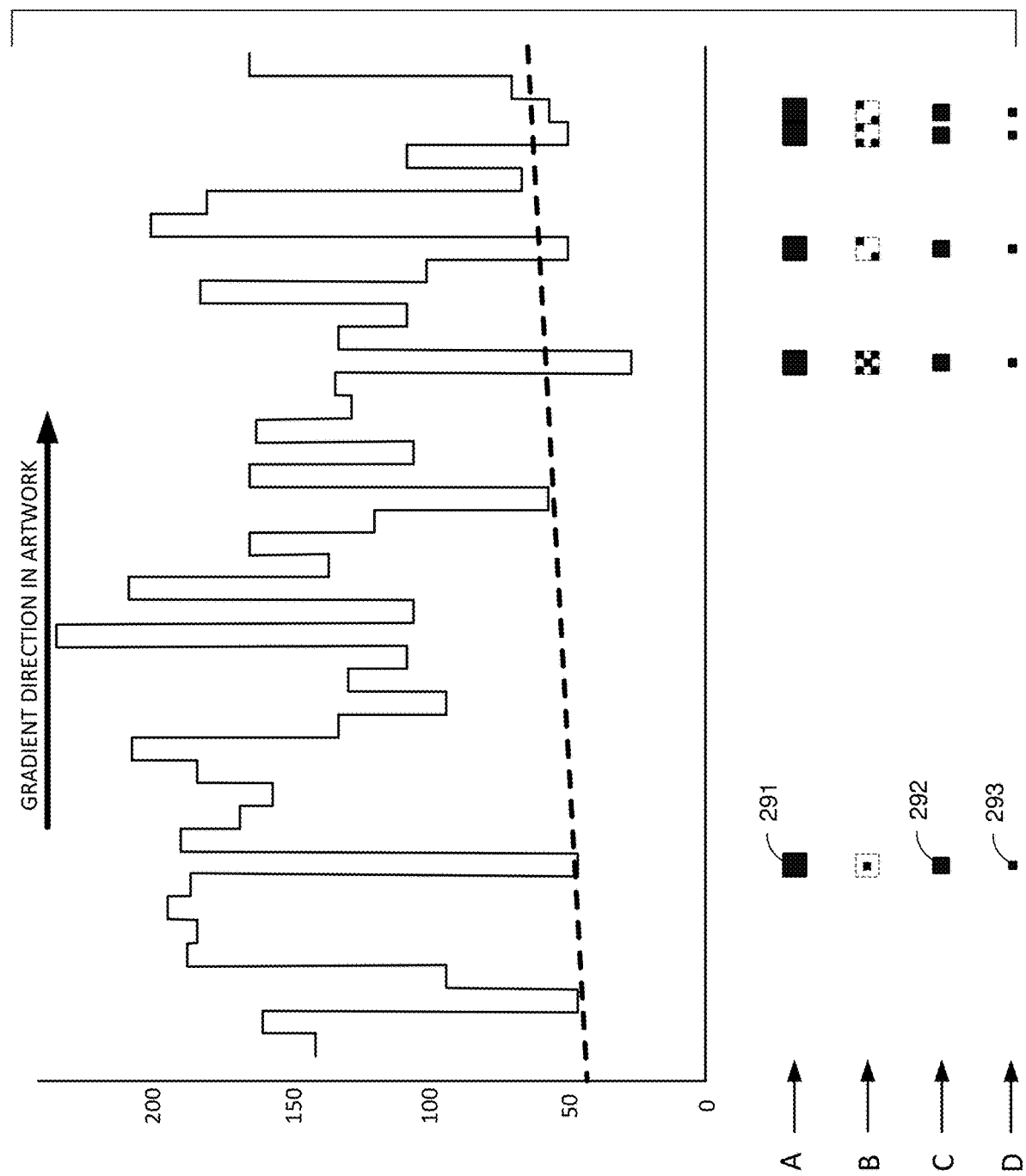
FIG. 30 illustrates how machine encoding markings can be a function of a linear gradient.

In the preceding discussion, different zones of the label were marked with different print densities, e.g., stepping from 1% to 2.5% to 4%. In other embodiments, continuous gradients can be employed. FIG. 30 helps illustrate.

FIG. 30 shows an excerpt from a single row of a sync signal. The sloping dashed line is a linearly-varying gradient. Only those elements of the sync signal whose values fall below the gradient line are candidates for marking (subject to ANDing with the data signal). At other locations, no corresponding mark appears on the label.

If uniform elements 291 are used, the process yields a corresponding row of dark markings, as shown along arrow "A." The amount by which the sync signal is below the threshold does not matter; all of the markings are the same.

If dithered marking blocks are used, a corresponding row of candidate markings results, as shown along arrow "B." Here, the amount by which the sync signal is below the gradient thresholds does matter. If the threshold is barely above the sync signal value, a 1/9-weighted marking block is used. For more substantial excursions, correspondingly denser markings blocks are used (e.g., 2/9-, 3/9-, 4/9- and 5/9-weighted marking blocks). By such arrangement, the same sync signal value may be represented differently at different locations on the label—depending on the corresponding value of the gradient at such locations.

In an alternative arrangement, density of a marking blocks does not depend on difference of a sync signal value from a threshold, but rather depends solely on the sync signal's value. In such arrangement, the same sync signal value will always be represented by the same weight marking on the label (provided a marking is made, based on the ANDing operation).

FIG. 30 also highlights the variable of print resolution. In an exemplary embodiment, a label printer with a 203 dot-per-inch resolution is employed. But, here, the corresponding watermark detector employs 3:1 down-sampling. Accordingly, each element of the sparse mark desirably is made to correspond to a 3×3 dot pattern (yielding a single element after down-sampling). That is, the sparse mark is rendered at about 67 waxels per inch.

Each element of the sparse marking signal can be represented by a dark 3×3 dot block, as shown by block 291. But alternatively, each element can be represented by a dark 2×2 dot block, or a single 1×1 dot block, as shown by blocks 292 and 293, along arrows "C" and "D."

Figure 31:
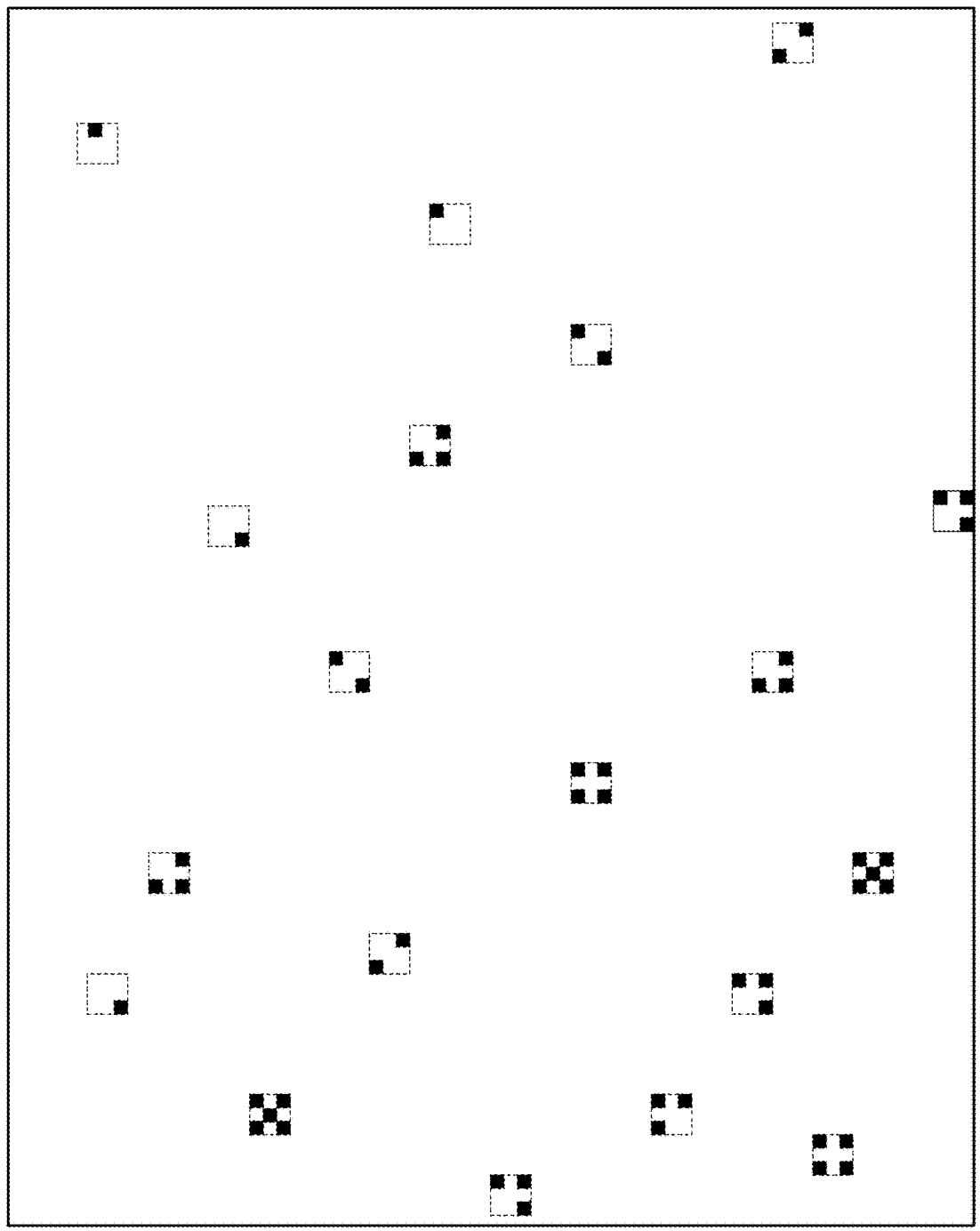
FIG. 31 shows an excerpt of label artwork, with machine encoding varying in strength in accordance with a gradient function.

FIG. 31 shows a white excerpt of label artwork on which a continuous gradient watermark has been formed, employing 3×3 dithered blocks. The spatial density at which the 3×3 blocks appear (i.e., the number of such blocks per unit area) is a function of how many watermark elements fall below the threshold gradient at that part of the artwork. The weight of each dithered block (e.g., 2/9, 3/9, etc.) depends on the amount by which the threshold gradient at that part of the label exceeds the corresponding sync signal element.

Figure 29A:
FIGS. 29A and 29B show different conjunctions of two 3×3 marking blocks.
Figure 29B:

The selection of a particular marking block of a desired weight, from among the (often) plural available options, can be made randomly. The result can be checked for edge-adjoining dark cells (such as depicted in FIG. 29A) and, if found, another marking block can be randomly selected (or the originally-selected marking block can be rotated or flipped to check if the FIG. 29A situation is avoided). Alternatively, a single marking block of each weight may be selected, and used consistently whenever such weighting is required. (Again, a check for the FIG. 29A situation can be made, and different orientations of the single marking block can be tried if found.)

Another approach to selection of a particular marking block of desired weight (from among multiple candidates) is to select the marking block that best mimics the finer detail of the ideal analog sync signal. If such selection is unsuitable (e.g., due to edge-adjoining black areas), then the block that second-best mimics the ideal analog signal, or third-best mimics the ideal signal, etc., can be used.

In the figures, the sync signal is generally described as a pixelated 2D signal. For example, the 2D signal has been referenced as a 128×128 block of 16,384 cells, each of which has a respective value. But such a representation falls short of the ideal. Such representation includes spatial areas where the signal value does not change (i.e., the spatial area of each pixel), and includes step-wise changes in signal values at pixel boundaries. Those are corruptions of the mathematical ideal.

The mathematical ideal (from which the pixelated version is derived, by spatial- and amplitude-quantization) is a signal that varies continuously in 2D. That continuous signal is the spatial domain counterpart of a signal defined in the spatial-frequency domain: namely, many (sometimes many dozen) different frequency peaks, with random phases. In the spatial domain, such signal takes the form of continuously-varying undulations in two dimensions—sort of like the (complexly-interfering) ripples that result from scattering a handful of pebbles onto a pond.

Roughly-speaking, the 2D blocks discussed above are defined by computing—at each of 128×128 uniformly-spaced locations in the spatial domain—the value of this continuously-varying ideal function. Each resulting sample value is then quantized (e.g., to an 8-bit value), and assigned as the value of a pixel that spans a small but certain spatial area. Such procedure generated, e.g., the value for each of the pixel areas in block 402 of FIG. 4.

Instead of computing sample values of the continuously-varying ideal on a grid of 128×128 points, such values may instead be computed on a grid that is 4-times as dense in both directions, i.e., 512×512. The computational burden is greater, but so is the fidelity of the resulting data.

FIG. 32A shows a single pixel in a 128×128 sync signal. It has a value of 119. This sync value resulted from summing multiple random phase peaks at known reference frequencies in the spatial-frequency domain (i.e., a continuous representation of the sync signal in the spatial-frequency domain), and then performing an inverse Fourier transform to yield a corresponding set of 128×128 values in the spatial domain (i.e., a quantized representation of the sync signal in the spatial domain). The 119 is one of those values.

FIG. 32B shows the same spatial area, but with the sync signal now quantized to a higher spatial resolution. Instead of performing a 128×128 inverse Fourier transform on the continuous representation of the sync signal in the spatial frequency domain, a 512×512 inverse Fourier transform is performed instead. The result is 16 values instead of one. Their average value is 119, but they vary around that average.

If a block of weight 1/16 is desired, the cell with the lowest value is darkened; all others can be left white. This is shown in FIG. 34A. Similarly, if a block of weight 2/16 or 3/16 is desired, the two or three cells with the lowest values can be darkened, as shown in FIGS. 34B and 34C.

If a weight of 4/16 is desired, darkening the four lowest-valued cells would result in the block shown in FIG. 34D. Such arrangement is generally undesirable due to two dark cells adjoining edge-to-edge.

Various approaches can be used in this circumstances. Explanation may be aided by identifying the different cells in the block by reference letters, A, B, C . . . , with letters assigned in order of ascending cell values. Such identification for the cells in FIG. 32B is shown in FIG. 33

One approach, in this circumstance, is to not darken the $4^{th}$ lowest value (i.e., cell D, together with cells A, B and C), but instead try the $5^{th}$ lowest value (cell E) to see if it avoids the dark edge-to-edge situation (i.e., cells A, B, C and E). It does, and this yields the 4/16-weighted block shown in FIG. 35. If selection of cell E still resulting in edge-to-edge darkened cells, then cells F, G, etc., can be tried instead.

Rather than substitute the fifth-ranked cell for the fourth-ranked, an alternative approach is to determine whether there is a cell adjoining cell D that can be darkened without violating the dark-cells-adjoining-edge-to-edge constraint.

As shown in FIG. 36, cell D has a value of 94, and five cells adjoin it. The cell to the west (with value 55) is already darkened (it is cell A), so it is not available for darkening. The cell to the northwest can't be darkened without violating the constraint.

The cell to the north can be darkened, but not the cell to the northeast—as that would again violate the constraint. Finally, the cell to the east can be darkened.

Where, as here, there are multiple neighboring candidate cells for darkening (i.e., to the north and east), the cell of lowest value is chosen, i.e., cell H with value of 149. The resulting 4/16-weighted block, comprising darkened cells A, B, C and H, is shown in FIG. 37.

The same techniques can be extended to multiple adjoining 4×4 blocks. FIG. 38 is exemplary. On the left is the same block shown in FIG. 32B and discussed above. Adjoining, to the right, is a second block. Cells in the second block are ranked as shown in FIG. 39.

Referring to FIG. 40, the first approach starts by identifying cells to darken in the first block. As discussed above, this results in darkening of its cells A, B, C and E. The same procedure is separately applied to the second block, resulting in darkening of its cells A, B, E and F. (Cells C and D are disqualified for darkening due to violation of the dark-edge-to-edge constraint.) As can be seen, two dark cells edge-adjoin across the block boundary: cell E in the first block, and cell A in the second block.

In such case, between the edge-adjoining dark cells, the one with the lowest value should be given priority, and remain where it is. In this case, cell E in the first block has value 108, whereas cell A in the second block has value 57. So cell E in the first block should be changed.

In deciding which cell in the first block to darken in lieu of cell E, either of the two approaches described above can be used. The first is to successively try next cells in the ranked ordering, i.e., starting with cell F. (Such method may be termed "trial by rank.") Cell F is in the lower left corner, and its darkening would violate the constraint. Next to try is cell G. It, too, violates the constraint. Cell H, however, is satisfactory. The adjusted pair of blocks, with cell H in the first block darkened instead of cell E, is shown in FIG. 41.

The other approach to resolving the violated constraint of FIG. 40 is to use the neighboring approach discussed above (which may be termed "trial by neighbor"). The cells neighboring the dark cell to be replaced are identified, as shown in FIG. 42. The lowest is first considered, to determine if it violates the constraint. Here, the lowest-valued neighboring cell is to the northwest (with value 131), but its darkening would put it edge-to-edge with the darkened cell of value 84. The next-lowest-valued neighboring cell is the cell to the north (with value 159). It can be darkened without violating the constraint, so is selected for darkening—in lieu of originally-darkened cell E. This results in the two blocks shown in FIG. 43.

FIGS. 38-43 assumed that the dark cells in the stand-alone first block and second block were initially chosen by the first approach, i.e., the trial by rank approach. In other embodiments, the dark cells in the stand-alone blocks can be chosen by the second, trial by neighbor, approach (e.g., which resulted in the block shown in FIG. 37, for the first block). Again, constraint violations that arise when blocks are juxtaposed can be addressed by either the trial by rank, or trial by neighbor, approach.

As the weight of the block increases (e.g., to 6/16, 10/16, etc.), the no-edge-adjoining-dark-cells constraint becomes more and more difficult—and eventually impossible—to meet.

One approach is to relax the constraint as necessary. If the constraint cannot be met by the above methods, then repeat the procedure—this time allowing one violation of the constraint. If that condition cannot be met, then allow two violations of the constraint, etc. The aim is to achieve a block of the desired weight, having the minimum possible number of constraint violations. Likewise for assemblages of plural blocks.

For a given block, if the weight requires one violation of the constraint, there may be several possible arrangements of dark cells that qualify. In such case, the favored block arrangement is often one in which the single constraint violation is between the pair of adjoining cells whose values sum to the smallest number. (If there's to be a visually conspicuous pairing of dark cells, such transgression should—in recompense—at least faithfully depict the most important part of the sync signal—the most extreme values.) Thus, in the block of FIG. 32B, if there is to be one violation of the constraint, it should be to darken both cells A and D in the bottom row (with values of 55 and 94). No other pairing of edge-adjoining cells has a lower sum.

Likewise, if two constraint violations are required to meet a block's weight requirement, the first violation should comprise the two adjoining cells with the lowest sum, and the second violation should comprise the two cells with the second-lowest sum. (If one cell is common to both pairings, then such approach yields a visual "L" of dark cells, filling 3 of 4 in a 2×2 cell area. In such case, the second violation may instead pair the two adjoining cells having the lowest sum—disqualifying the two cells that are already darkened by the first violation.)

While the constraint of primary concern is edge-adjoining dark cells, the same methods can be adapted to check for—and also redress—the secondary concern of diagonally-adjoining dark cells.

It will be recognized that the sync signal is reproduced with greatest fidelity when the lowest-valued cells are darkened—regardless of their spatial relationships with other darkened cells (e.g., edge-adjoining). Conversely, aesthetics are best served by arranging the darkened cells so that a minimum number adjoin. Signal fidelity and aesthetics are thus in tension—enhancing one often degrades the other.

The algorithms described above tend to exalt aesthetics over signal fidelity. In some cases, these methods may be pursued to the point that signal fidelity is significantly compromised. (For example, to achieve a 8/16-weight block, the optimum pattern—from an aesthetics standpoint—is a checkerboard spatial alternation of black/white. However, there are only two such patterns that are possible, and the sync signal is usually mimicked by neither.)

To moderate the signal-degrading aspect of these algorithms, the number of trial adjustments can be limited to a fixed number. For example, in the trial by rank approach to darkening cells in a single block, when a cell is found to be unsuitable for darkening (by reason of edge-adjoining another dark cell), successive ones of the remaining cells are tried. For example, if cell D can't be used with cells A, B, and C, then cells E, F, etc., are tried. These trials can be limited in number, e.g., to 2 or 4. If the constraint isn't met within that number of tries, then the original pairing of edge-adjoining dark cells is used.

Similarly, the number of cells within a block to which such methods are applied can also be limited. (As noted, if a constraint violation is to persist, it desirably involves cells of the lowest signal values, since such extreme values are generally the most important parts of the sync signal. For this reason, if the number of cells to be processed by one of the algorithms is capped, it is generally best to start with the cells having relatively higher values. For example, to obtain a 6/16-weight block, the ideal would be to darken cells A, B, C, D, E and F. If a cap of 2 is imposed on the number of cells that may be swapped for other cells, then it is generally best to start with cell F and work backwards. Any remaining constraint violation that is not addressed by the capped process will thus involve the more important sync signal values in cells A, B, etc.)

Such caps also apply to application of the algorithm to redress constrain violation across block boundaries (i.e., capping the number of relocation tries for a single cell, as well as capping the number of cells for which relocation is attempted).

Limiting the application of the algorithms in such fashion preserves some measure of signal fidelity, despite its visual impact. The limit to the number of tries (e.g., the cap) can be set by the designer, in accordance with the requirements of a particular application.

It will be recognized that the particular arrangements detailed above are exemplary and not limiting.

For example, while the discussion contemplates darkening the lowest-valued sync signal elements, it will be recognized that in other embodiments, the highest-values sync signal elements may be darkened instead. That is, extrema of either variety may be darkened.) Similarly, the element values in the variable data block (e.g., 400 in FIG. 4) that are darkened can be inverted from the arrangement described.

Similarly, while certain of the above examples concerned linear gradients, it will be recognized that non-linear gradients, e.g., following exponential and other functions, can alternatively be employed. Similarly, it will be recognized that two-dimensional gradients (e.g., that vary in both horizontal and vertical directions) can also be used.

It should be understood that the term "gradient" doesn't always refer to the direction in which density of label marking increases. The term can also be used to refer to the direction in which the density of marking decreases.

While the illustrated dithered marking features are square, this needn't be the case. Non-square features, such as rectangles or other shapes, can alternatively be used.

Speaking of squares, it will be noted that square elements with sharp corners are used in all of the figures to represent dark print markings. In actual practice, sharp-cornered squares are not produced. Instead, the printing process outputs dots of a more rounded configuration. And, as noted earlier, line screening can be applied to further reduce the visibility of the marking.

In a representative label, sparse watermark encoding of a first horizontally-printed swath, an inch wide and tall enough to span 10,000 pixels (e.g., about a quarter inch in an exemplary embodiment), may have darkened between 100 and 200 pixels—or between 1% and 2% of the swath area. Sparse watermark encoding of a second such swath on the same label may have between 225 and 350 pixels darkened. A third such swath may have between 375 and 500 pixels darkened. Different gradient functions—stepped or continuous—can be employed to achieve such differing densities of marking.

The term "watermark" is commonly used to refer to a marking that is imperceptible to human viewers. The markings discussed above are often not of this sort. For example, observers may perceive discrete printed dots, or a greyish cast, on printed labels.

The greyish cast provided by the detailed markings, and the gradient-grey markings that can also be achieved, may be among a palette of patterns from which a graphical artist can draw in composing label artwork. For example, if a blue area of artwork is to transition in luminance between a bright blue and a dark blue of the same chrominance, a gradient grey marking can be added—varying the luminance of the artwork accordingly. (So-called "signal rich art" is further detailed in applicant's published patent application 20110214044.)

Although the preferred arrangement effects thresholding of a continuous synchronization signal, followed by Boolean combination with a binary data signal, other embodiments can proceed differently. For example, some watermark signals are self-syncing, and operate without a synchronization signal component. In this and other such cases, a continuous signal encoding the binary data can be processed as described above to yield sparse markings.

The specification's reference to "continuous" data should be understood to include data represented in plural-bit quantized fashion, e.g., a synchronization signal represented as an array of 8-bit samples.

While the exemplary implementation uses a printer with 203 dots per inch resolution in horizontal and vertical directions, the technology is naturally not so limited. Thermal printers are commonly available with much higher resolutions (e.g., 300×600 dpi), and still higher resolutions are becoming available.

Moreover, the detailed arrangements are suitable for use with printing technologies other than thermal, resulting in markings other than thermally-darkened dots. For example, in alternative embodiments in which ink is deposited on a medium, a colored ink—such as red, blue, cyan or yellow—can be applied to form the detailed markings. In some embodiments, the substrate may be darker, rather than lighter, than the markings, in which case the above-described arrangements can be used in inverse.

Although the discussion particularly focused on a label printed on-demand for adhesive application to an item of deli foodstuffs, the same principles are likewise applicable to labels applied to canned foodstuffs, and printed on boxed retail items.

In one particular such arrangement, sparse markings of the form described above are ink-printed on boxes and on paper labels for cans, by an offset printing press employing multiple printing plates. For example, one plate may lay down a patterned background flood of blue ink on certain areas of the label, three other plates may define cyan, magenta and yellow layers of photographic imagery and other artwork that are printed on another area of the label. And a further plate may define a panel of nutritional information and other black-printed text. This latter plate may include the above-described sparse markings, with guard bands around the text glyphs. Alternatively, the sparse markings may be included in another of the plates, e.g., for cyan, In such latter arrangement, guard bands derived from the text layer can be applied to the cyan plate to define safe areas in which watermark markings are omitted. (Naturally, the particular plural-bit information encoded by the detailed watermark markings is not evident to human observers of such packaging.)

As is familiar, machine-readable coding can serve to instruct a corresponding machine to take certain actions, such as add an item to a checkout tally, and adjust a total by a coupon amount. The actions needn't involve customer checkout; some actions concern product testing and diagnostics. For example, a scanner can be configured to respond to decoding of certain encoded markings (e.g., instructions encoded in the payload of a printed sparse watermark) by initiating various self-check routines and diagnostic tests.

It will be recognized that the detailed arrangements enable machine encoding to be applied over large expanses of a label's area (e.g., commonly more than 50%, and sometimes 75%, 90%, or more), with negligible impact to the readability of label text. (The guard band regions depicted in FIG. 18B leave 63% of the label area available for machine encoding.) Moreover, by spatially varying the strength of the encoding, the attention of human viewers is not drawn to stark borders at which full-strength encoding suddenly begins. Absence of such distraction further aids the viewer in quickly comprehending the printed text.

Because large expanses of a label's area are encoded, the decoding of such information, e.g., at a point of sale system, is made more reliable. Compared to existing barcode markings, the large area encoded with information results in a higher percentage of single-swipe reads. Barcoded items, in contrast, must more frequently be swiped past a scanner system two or more times in order for the small barcode marking to be positioned appropriately for decoding. (The barcode in FIG. 16A spans about 7% of the label area. As noted, the watermark encoding spans over 60% of the label area.)

As point of sale scanners that are capable of decoding watermarked data proliferate (e.g., the Datalogic Magellan 9800i scanner and the Zebra MP6000 scanner), barcodes on labels will become unnecessary—enabling smaller adhesive labels to be used, and reducing material costs—all with improved performance.

Operating Environment

The components and operations of the encoder and decoder are implemented in modules. Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, state machine circuitry, or firmware that stores instructions executed by programmable circuitry.

Figure 44:
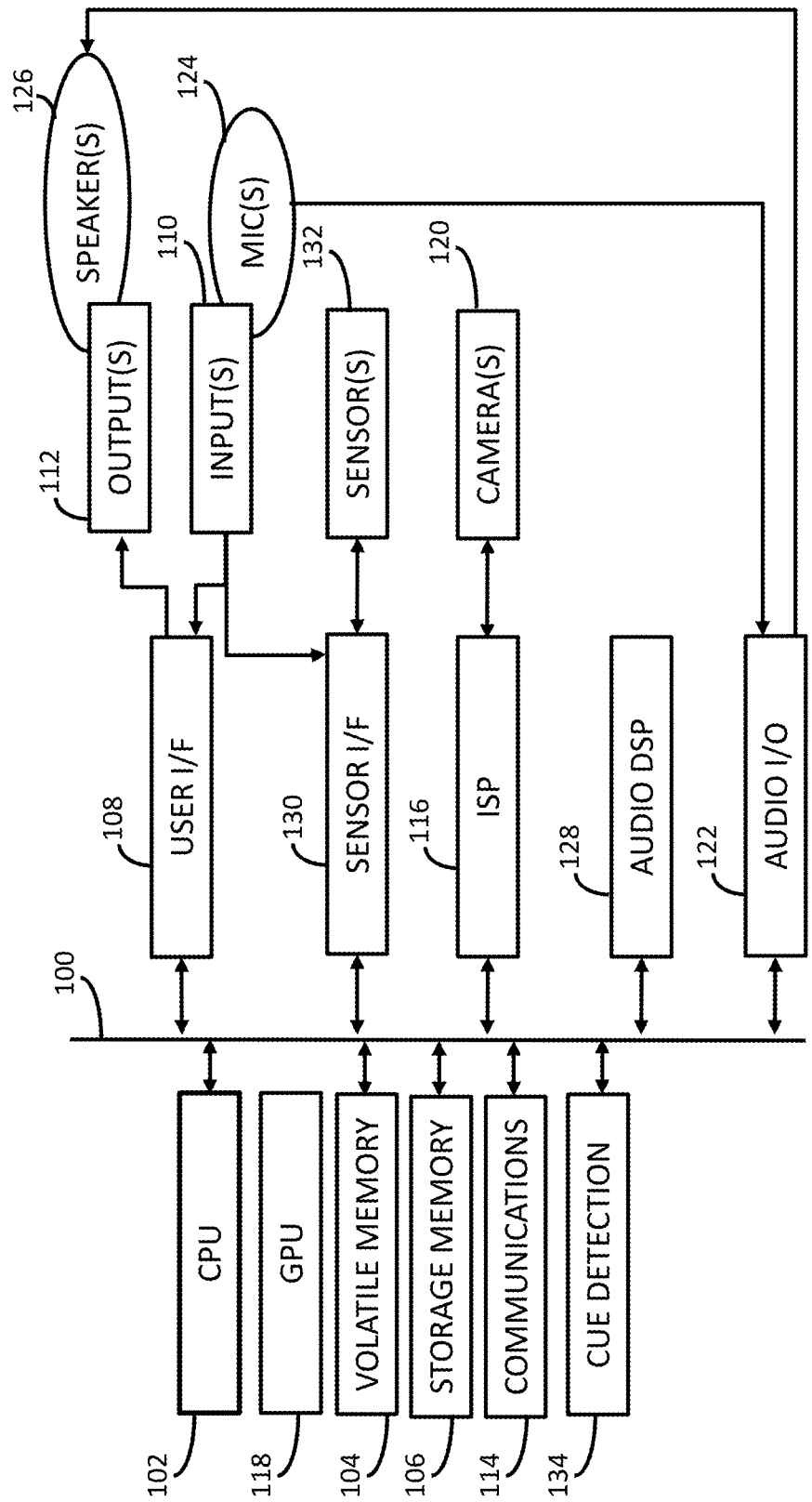
FIG. 44 illustrates an electronic device in which encoding and decoding may be implemented.

For the sake of illustration, FIG. 44 is a diagram of an electronic device in which the components of the above encoder and decoder embodiments may be implemented. It is not intended to be limiting, as the embodiments may be implemented in other device architectures or electronic circuitry.

Referring to FIG. 16, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 16 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present disclosure, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, embossing, laser marking, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously). The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 16, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Review

A few of the inventive arrangements detailed above are reviewed in the discussion that follows.

One aspect of the present technology is a method for inserting a sparse, variable data carrying signal into a digital image. Such method includes providing a first signal component that facilitates synchronization function of the sparse, variable data carrying signal, and includes first signal component values at coordinates within a two-dimensional block. A second signal component is also provided, as is modulated to carry a variable data signal. Again, this second signal includes component values at coordinates within the two-dimensional block. The first and second signal components are combined to produce the sparse, variable data carrying signal, by setting sparse elements at coordinates within the two-dimensional block where the first and second component signal values provide compatible modulation of the image. The resulting sparse, variable data carrying signal is inserted into at least a first digital image layer or first digital image channel of a digital image design.

Another aspect of the technology is a method for inserting a sparse, variable data carrying signal into an image. This method includes providing a first orthogonal signal component comprising first signal component values at coordinates within a two-dimensional block. Also provided is a second orthogonal signal component, which is modulated to carry a variable data carrying signal, and comprises second signal component values at coordinates within the two-dimensional block. The first and second signal components are combined to produce the sparse, variable data carrying signal by selecting a subset of the first and second orthogonal components. The resulting sparse, variable data carrying signal is then inserted into at least a first image layer or first image channel of an image design.

A further aspect of the technology is a method for inserting a sparse, variable data carrying signal into an image. Such method includes providing a sparse pattern of elements at coordinates within a two-dimensional block, and also providing a signal component that is modulated to carry a variable data signal. The sparse, variable data carrying signal is generated by distributing the signal component within the two-dimensional block based on the location of the sparse pattern of elements. The resulting sparse, variable data carrying signal is then inserted into at least a first image layer or first image channel of the image.

Still another aspect of the technology is a system for inserting a sparse, variable data carrying signal into a digital image. This system includes a memory for storing data representing the digital image, and one or more processors. The processor is programmed for providing a first signal component that facilitates a synchronization function of the sparse, variable data carrying signal, and includes first signal component values at coordinates within a two-dimensional block. The processor is also programmed to provide a second signal component that is modulated to carry a variable data signal. Like the first, this second signal component includes component values at coordinates within the two-dimensional block. The processor is further programmed to combine the first signal component and the second signal component to produce the sparse, variable data carrying signal by setting sparse elements at coordinates within the two-dimensional block where the first and second component signal values provide compatible modulation of the image. Finally, the processor inserts the sparse, variable data carrying signal into at least a first digital image layer or first digital image channel of the digital image.

Yet another aspect of the technology is an apparatus for inserting a sparse, variable data carrying signal into a digital image. This apparatus includes a memory for storing data representing the digital image, including a representation of a first digital image layer or a first digital image channel. The apparatus further includes means for providing a first orthogonal signal component, which comprises first signal component values at coordinates within a two-dimensional block. The apparatus also includes means for providing a second orthogonal signal component that is modulated to carry a variable data carrying signal, and comprises second signal component values at coordinates within the two-dimensional block. The apparatus also includes means for combining the first signal component and the second signal component to produce the sparse, variable data carrying signal, by selecting a subset of the first and second orthogonal components. Finally, the apparatus comprises means for inserting the sparse, variable data carrying signal into at least the first digital image layer or the first digital image channel.

A further aspect of the technology is an apparatus for inserting a sparse, variable data carrying signal into a digital image. This apparatus includes a memory for storing data representing the digital image. It further includes: means for providing a sparse pattern of elements at coordinates within a two-dimensional block; means for providing a signal component that is modulated to carry a variable data signal; means for generating the sparse, variable data carrying signal by distributing the signal component within the two-dimensional block based on the location of the sparse pattern of elements; means for inserting the sparse, variable data carrying signal into at least a first image layer or first image channel of the digital image, thereby yielding a transformed digital image; and finally a display for displaying the transformed digital image.

In each such arrangement, signal elements can be removed from the signal component at coordinates where the signal component does not coincide with coordinates of the sparse pattern.

Such arrangements can also be equipped to repeat the signal component in two-dimensional blocks within the digital image, with different sparse patterns being used to distribute the signal components in different of the two dimensional blocks.

In some embodiments, the sparse, variable data carrying signal is reduced by use of a screen—such as a line screen.

In embodiments employing compatible modulation, compatible can refer to a consistent direction of modulation of an optical property at a coordinate within the two-dimensional block. It may also refer to modulation at a coordinate in which both the value of the first and second signal components fall within a common range bounded by at least one threshold. It can also refer to modulation at a coordinate in which both the value of the first and second signal components are quantized to a common quantization value.

In embodiments in which the first and second signal components are provided in (or converted to) binary form, compatible modulation can be determined by applying a logical AND operation between binary values of the first and second components at a coordinate. In such case, compatible modulation corresponds to coordinates where the binary values of the first and second components agree. (Conversion to binary can be by applying a threshold.)

In some embodiments, at least one of the first or second components is a multi-valued signal, and is converted to a sparse signal component by applying at least a first threshold. The combining operation can then comprise setting sparse elements at coordinates where the sparse signal component and a value of other of the first or second components are consistent.

In an exemplary embodiment, the multi-valued signal component represents a synchronization template formed by a set of peaks in a transform domain.

Still another aspect of the technology starts with receiving a digital representation of product packaging artwork, comprised of pixels. A guard band region is then defined, surrounding text characters included in the artwork. The artwork is then altered to redundantly encode a machine-readable plural-bit payload across different regions of the artwork. Such altering only alters the artwork outside of the guard band.

In some such embodiments, defining the guard band involves applying a dilating process to the text characters. In some embodiments, outside the guard band, a strength of the machine readable encoding increases along a gradient extending away from text characters. In some embodiments, a first region encloses the guard band region, and a second region encloses the first region. By such arrangement, a strength of the machine readable encoding has a first value in the first region, and has a second, stronger, value in the second region.

Often the guard band defines a boundary including a portion that echoes a non-linear contour of a single one of the text characters.

In implementations in which each of the pixels has either a first or second value, corresponding to a dark and a background color, the altering comprises toggling certain of the pixels between the first and second values.

In some embodiments, the altering involves creating plural dithered blocks in the artwork, where each of the blocks comprises a contiguous two-dimensional N-element region, where N>2, where M of the elements in at least some of the blocks is dark, and where 1>M>N.

Sometimes, along a gradient direction in the artwork, M increases, yielding a greater density of darkening alteration along the gradient direction, although the contrary arrangement is possible as well.

Sometimes all of the dithered blocks in the artwork are of a common size. In other arrangements, the first and second dithered blocks in the artwork are of different sizes.

The dilating process can comprise a region-growing process that extends outward from each of the pixels by N pixels, where N is 2, 3, 4 or 5.

Often the encoded machine-readable plural-bit payload comprises a digital watermark.

Yet another aspect of the technology again begins with receiving a digital representation of product packaging artwork. A two-dimensional data signal is generated that redundantly encodes a plural-bit message. The data signal comprises plural elements, each of which has one of two values. A two-dimensional synchronization signal is received comprising plural elements, each of which has a plural-bit value. Each element of the data signal has an element of the synchronization signal corresponding thereto. The synchronization signal is quantized, including: (a) quantizing a first two-dimensional portion of the synchronization signal with a first threshold, wherein elements of the first portion having values below the first threshold are assigned a first value, and elements of the first portion having values above the first threshold are assigned a second, different, value; and (b) quantizing a second two-dimensional portion of the synchronization signal with a second threshold different than the first threshold, wherein elements of the second portion having values below the second threshold are assigned the first value, and elements of the second portion having values above the second threshold are assigned the second value. A plural-element two-dimensional marking signal is then generated, by ANDing together the value of an element of the data signal, with the value of a corresponding element in the quantized synchronization signal, where each element of the marking signal corresponds to a location in the artwork. For each location in the artwork that corresponds to an element of the marking signal having a TRUE value, the luminance or chrominance is changed to a different state.

In one such embodiment, the changing of the luminance or chrominance is effected by introducing a dithered pattern into the artwork. The dithered pattern comprises a two-dimensional array of N contiguous elements, where N is at least four, where M of the elements in at least some of the regions are dark, and where 1>M>N.

In accordance with another aspect of the technology, a digital representation of artwork is received, where the artwork has an area of uniform color. A two-dimensional data signal is generated that redundantly encodes a plural-bit message. This data signal comprises plural elements, each of which has a single bit value. A two-dimensional synchronization signal is received comprising plural elements. Each of these elements has a plural-bit value. Each element of the data signal has an element of the synchronization signal corresponding thereto. The two-dimensional data signal is processed with the two-dimensional synchronization signal and with a gradient function to yield a two-dimensional gradient marking signal. An ink counterpart of the gradient marking signal can then be printed on a medium with the artwork. Such printing can include printing plural dithered two-dimensional blocks of at least four contiguous elements each, in which one or more elements of each block are printed to be dark. In such arrangement: in a first zone of the printed medium, within the area of uniform color, M elements in a first of the blocks is printed to be dark; in a second zone of the printed medium, within the area of uniform color, P elements in a second of the blocks is printed to be dark; where P>M, and each of the blocks corresponds to a single element of the synchronization signal.

The second block may be larger than the first block. For example, the first block can be a 3×3 element block and the first block can be a 2×2 element block. Or 4×4 vs. 3×3. In most embodiments, M is at least two and P is at least three. In many embodiments, M is at least three and P is at least four.

Another aspect of the technology is a can of food comprising a cylindrical metal enclosure containing foodstuffs. The cylindrical enclosure is wrapped in a paper label bearing printing. This printing comprises a first layer of ink of a first color, deposited on the label in a first pattern, and a second layer of ink of a second color, deposited on the label in a second pattern. One of the inked patterns includes a marking block selected from FIG. 28A or FIG. 28B. The pattern encodes a plural-bit payload that, when imaged by a camera-equipped computer system, and decoded by such computer system, causes the computer system to respond thereto by taking a corresponding action.

In some implementations, one of the inked patterns includes plural different 3×3 marking blocks selected from FIG. 28A. In others, one of the inked patterns includes plural different 4×4 marking blocks elected from FIG. 28B.

Yet another aspect of the technology comprises a method of generating a signaling pattern for printing on a substrate. A 2D synchronization signal is defined in a spatial-frequency domain. An NM×NM inverse Fourier transform is applied to the synchronization signal, to yield an NM×NM array of sync signal values in a spatial domain. This NM×NM array of sync signal values in the spatial domain is logically combined with an N×N array of variable data. By such arrangement, each datum of variable data corresponds to an M×M sub-block of sync signal values, yielding an NM×NM array of composite values defining a pattern. In a single M×M sub-block within the NM×NM array of composite values, a first set of P elements is identified as candidates for darkening. This identification act includes determining the P elements whose values are most extreme among the M×M sub-block from the array of composite values. Finally, a pattern is produced including a second set of P elements that are darkened for printing.

Later, a label can be printed with the pattern.

In some embodiments, the first set of P elements and the second set of P elements are identical. In others, they are not. For example, the method can further include determining existence of edge-adjoining elements among the first set of P elements, and identifying the second set of P elements by revising the first set of P elements to avoid edge-adjoining elements.

In an exemplary embodiment, N is 128 and M is 4. If M is 4, the pattern can include at least one block selected from FIG. 28B.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. A method of generating a signaling pattern for printing on a substrate, the method comprising the acts:
    defining a 2D synchronization signal in a spatial-frequency domain;
    applying an NM×NM inverse Fourier transform to said signal, to yield an NM×NM array of sync signal values in a spatial domain;
    logically combining said NM×NM array of sync signal values with an N×N array of variable data, wherein each datum of variable data corresponds to an M×M sub-block of sync signal values, yielding an NM×NM array of composite values defining a pattern;
    in an M×M sub-block within said NM×NM array of composite values, identifying a first set of P elements as candidates for darkening, wherein said identifying comprises determining the P elements whose values are most extreme among said M×M sub-block from the array of composite values; and
    producing a pattern including a second set of P elements that are darkened for printing.

2. The method of claim 1 that further comprises printing a label with said pattern.

3. The method of claim 1 in which the first set of P elements and the second set of P elements are identical.

4. The method of claim 1 that further includes determining existence of edge-adjoining elements among the first set of P elements, and identifying the second set of P elements by revising the first set of P elements to avoid edge-adjoining elements.

5. The method of claim 1 in which N is 128 and M is 4.

6. A non-transitory computer readable medium comprising instructions stored therein that, when executed by one or more processors, cause said one or more processors to perform the following acts:
    defining a 2D synchronization signal in a spatial-frequency domain;
    applying an NM×NM inverse Fourier transform to said signal, to yield an NM×NM array of sync signal values in a spatial domain;
    logically combining said NM×NM array of sync signal values with an N×N array of variable data, wherein each datum of variable data corresponds to an M×M sub-block of sync signal values, yielding an NM×NM array of composite values defining a pattern;
    in an M×M sub-block within said NM×NM array of composite values, identifying a first set of P elements as candidates for darkening, wherein said identifying comprises determining the P elements whose values are most extreme among said M×M sub-block from the array of composite values; and
    producing a pattern including a second set of P elements that are darkened for printing.

7. The non-transitory computer readable medium of claim 6 that further comprises outputting printing instructions for a label with said pattern.

8. The non-transitory computer readable medium of claim 6 in which the first set of P elements and the second set of P elements are identical.

9. The non-transitory computer readable medium of claim 6 that further includes instructions for determining existence of edge-adjoining elements among the first set of P elements, and identifying the second set of P elements by revising the first set of P elements to avoid edge-adjoining elements.

10. The non-transitory computer readable medium of claim 6 in which N comprises 128 and M comprises 4.

11. An apparatus comprising:
    an input for receiving variable data;
    one or more electronic processors configured for:
        defining a 2D synchronization signal in a spatial-frequency domain; applying an NM×NM inverse Fourier transform to said signal, to yield an NM×NM array of sync signal values in a spatial domain;
        logically combining said NM×NM array of sync signal values with an N×N array of variable data, wherein each datum of variable data corresponds to an M×M sub-block of sync signal values, yielding an NM×NM array of composite values defining a pattern;
        in an M×M sub-block within said NM×NM array of composite values, identifying a first set of P elements as candidates for darkening, wherein said identifying comprises determining the P elements whose values are most extreme among said M×M sub-block from the array of composite values;
        producing a pattern including a second set of P elements that are darkened for printing; and
    an output for outputting the pattern.

12. The apparatus of claim 11 in which the first set of P elements and the second set of P elements are identical.

13. The apparatus of claim 11 in which said one or more electronic processors are configured for determining existence of edge-adjoining elements among the first set of P elements, and identifying the second set of P elements by revising the first set of P elements to avoid edge-adjoining elements.

14. The apparatus of claim 11 in which N comprises 128 and M comprises 4.

* * * * *